US008154964B2

(12) United States Patent
Fujinami et al.

(10) Patent No.: US 8,154,964 B2
(45) Date of Patent: Apr. 10, 2012

(54) DATA PROCESSING DEVICE, DATA PROCESSING METHOD, PROGRAM, PROGRAM RECORDING MEDIUM, DATA RECORDING MEDIUM, AND DATA STRUCTURE

(75) Inventors: Yasushi Fujinami, Tokyo (JP); Toshiya Hamada, Saitama (JP)

(73) Assignee: Sony Corporation, Tokyo (JP)

( * ) Notice: Subject to any disclaimer, the term of this patent is extended or adjusted under 35 U.S.C. 154(b) by 1488 days.

(21) Appl. No.: 11/570,082

(22) PCT Filed: May 24, 2005

(86) PCT No.: PCT/JP2005/009438
§ 371 (c)(1),
(2), (4) Date: Dec. 6, 2006

(87) PCT Pub. No.: WO2005/122170
PCT Pub. Date: Dec. 22, 2005

(65) Prior Publication Data
US 2007/0223332 A1    Sep. 27, 2007

(30) Foreign Application Priority Data

Jun. 11, 2004   (JP) ................................. 2004-174550

(51) Int. Cl.
*G11B 20/10*    (2006.01)
(52) U.S. Cl. ................. 369/47.2; 369/47.22; 369/275.1; 369/275.3
(58) Field of Classification Search ............... 369/30.09, 369/47.1, 275.3, 275.1, 47.2, 47.22; 386/1, 386/111; 707/104.1, 755
See application file for complete search history.

(56) References Cited

U.S. PATENT DOCUMENTS

| 7,565,060 B2 * | 7/2009 | Hamada et al. ............... 386/248 |
| 2005/0105896 A1 * | 5/2005 | Kochale ........................ 386/111 |
| 2005/0175313 A1 * | 8/2005 | Takakuwa et al. ............... 386/1 |
| 2005/0193010 A1 * | 9/2005 | DeShan et al. ............. 707/104.1 |

(Continued)

FOREIGN PATENT DOCUMENTS

JP       2000-41221       2/2000

(Continued)

OTHER PUBLICATIONS

Kelly, D.P. et al., "Virtual Editing of MPEG-2 Streams", IEEE, 2001, pp. 797-803.*

*Primary Examiner* — Thuy Pardo
(74) *Attorney, Agent, or Firm* — Oblon, Spivak, McClelland, Maier & Neustadt, L.L.P.

(57) ABSTRACT

A data processing device and a data processing method, a program and a program recording medium, a data recording medium, and a data structure, all enable data multiplexed into multiplexed data to be specified according to metadata irrespective of the number of pieces of data. A Clip( ) being metadata about a program stream into which a plurality of elementary streams are multiplexed includes as many stream_id/private_stream_id sets as the number of elementary streams number_of_streams. The stream_id/private_stream_id sets each consist of a stream_id, defined for each attribute of data in the MPEG-2 System (ISO/IEC 13818-1), for identifying data, and a private_stream_id for identifying data whose attribute is not defined in the MPEG-2 System. And each of the elementary streams multiplexed into the program stream is specified on the basis of the stream_id and the private_stream_id included in the Clip( ). Embodiments are applicable to, e.g., game machines using a DVD.

10 Claims, 45 Drawing Sheets

U.S. PATENT DOCUMENTS

| | | | |
|---|---|---|---|
| 2005/0254363 A1* | 11/2005 | Hamada et al. | 369/47.1 |
| 2007/0217297 A1* | 9/2007 | Kato et al. | 369/30.09 |
| 2008/0313195 A1* | 12/2008 | DeShan et al. | 707/754 |
| 2009/0300008 A1* | 12/2009 | Hangartner et al. | 707/755 |

FOREIGN PATENT DOCUMENTS

| | | |
|---|---|---|
| JP | 2003-6999 | 1/2003 |
| JP | 2003-7035 | 1/2003 |
| JP | 2003-69514 | 3/2003 |
| JP | 2003 168266 | 6/2003 |
| JP | 2003-168266 | 6/2003 |
| JP | 2003-228922 | 8/2003 |
| JP | 2003-317439 | 11/2003 |
| JP | 2003 317439 | 11/2003 |
| JP | 2004-80796 | 3/2004 |
| JP | 2005-513930 | 5/2005 |
| WO | WO 03/055233 A1 | 7/2003 |
| WO | WO 03/092007 A1 | 11/2003 |

* cited by examiner

FIG. 5

PlayList.PAT FILE

| Syntax | No.of bits | Mnemonic |
|---|---|---|
| "PLAYLIST.DAT" { | | |
|   name_length | 8 | uimsbf |
|   name_string | 8x255 | bslbf |
|   number_of_PlayLists | 16 | uimsbf |
|   for(i=0;i<number_of_PlayLists;i++){ | | |
|     PlayList(){ // A PlayList() | | |
|     PlayList_data_length | 32 | uimsbf |
|     // ATTRIBUTE INFORMATION | | |
|     reserved_for_word_alignment | 15 | bslbf |
|     capture_enable_flag_PlayList | 1 | bslbf |
|     PlayList_name_length | 8 | uimsbf |
|     PlayList_name_string | 8*255 | bslbf |
|     // | | |
|     number_of_PlayItems | 16 | uimsbf |
|     for(i=0;i<number_of_PlayItems;i++){ | | |
|       PlayItem() | | |
|     } | | |
|     PlayListMark() | | |
|   } | | |
| } | | |

FIG. 6

| Syntax | No. of bits | Mnemonic |
|---|---|---|
| PlayItem() { | | |
|   length | 16 | uimsbf |
|   Clip_Information_file_name_length | 16 | uimsbf |
|   Clip_Information_file_name | 8*Clip_Information_file_name_length | bslbf |
|   IN_time | 32 | uimsbf |
|   OUT_time | 32 | uimsbf |
| } | | |

FIG. 7

| Syntax | No. of bits | Mnemonic |
|---|---|---|
| PlayListMark() | | |
| PlayListMark() { | | |
|   length | 32 | uimsbf |
|   number_of_PlayList_marks | 16 | uimsbf |
|   for(i=0;i< number_of_PlayList_marks; i++){ | | |
|     Mark(){ | | |
|       mark_type | 8 | uimsbf |
|       mark_name_length | 8 | uimsbf |
|       ref_to_PlayItem_id | 16 | uimsbf |
|       mark_time_stamp | 32 | uimsbf |
|       entry_ES_stream_id | 8 | uimsbf |
|       entry_ES_private_stream_id | 8 | uimsbf |
|       mark_data | 32 | bslbf |
|       mark_name_string | 8*24 | bslbf |
|     } | | |
|   } | | |
| } | | |

FIG. 8

| mark_type | stream coding |
|---|---|
| 0 | reserved |
| 1 | "Chapter" MARK |
| 2 | "Index" MARK |
| 3 | "Event" MARK |
| 4~255 | reserved |

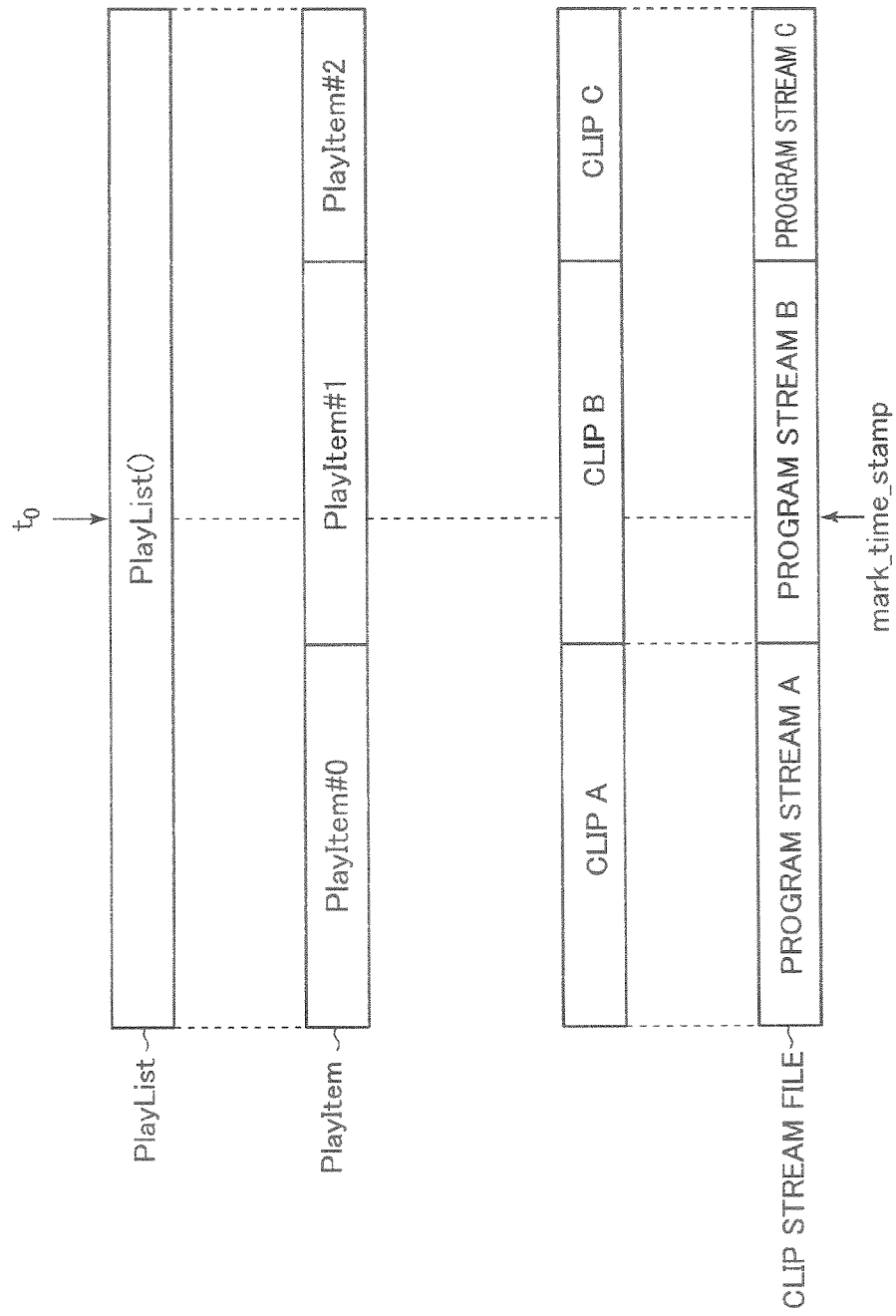

FIG. 10

| Syntax | No. of bits | Mnemonic |
|---|---|---|
| clip() Clip INFORMATION FILE (.CLP) | | |
| XXXXX.CLP{ | | |
| presentation_start_time | 32 | uimsbf |
| presentation_end_time | 32 | uimsbf |
| reserved_for_word_alignment | 7 | bslbf |
| capture_enable_flag_Clip | 1 | bslbf |
| number_of_streams | 8 | uimsbf |
| for (i=0; i <number_of_streams;i++){ | | |
| StreamInfo(){ | | |
| length | 16 | uimsbf |
| stream_id | 8 | uimsbf |
| private_stream_id | 8 | uimsbf |
| StaticInfo() | | |
| reserved_for_word_alignment | 8 | bslbf |
| number_of_DynamicInfo | 8 | uimsbf |
| for ( j=0; j <number_of_DynamicInfo;j++){ | | |
| pts_change_point | 32 | uimsbf |
| DynamicInfo() | | |
| } | | |
| } | | |
| } | | |
| EP_map() | | |
| } | | |

FIG. 11

| TYPES OF ELEMENTARY STREAMS | stream_id | private_stream_id |
|---|---|---|
| VIDEO | 0xE0~0xEF | (NONE) |
| ATRAC AUDIO | 0xBD | 0x00~0x0F |
| LPCM AUDIO | 0xBD | 0x10~0x1F |
| SUBTITLE | 0xBD | 0x80~0x9F |

FIG. 12

| Syntax | No. of bits | Mnemonic |
|---|---|---|
| StaticInfo() | | |
| StaticInfo() { | | |
|   if(stream == VIDEO) { | | |
|     reserved_for_word_alignment | 16 | bslbf |
|     picture_size | 4 | uimsbf |
|     frame_rate | 4 | uimsbf |
|     reserved_for_word_alignment | 7 | bslbf |
|     cc_flag | 1 | bslbf |
|   } else if (stream == AUDIO ) { | | |
|     audio_language_code | 16 | bslbf |
|     channel_configuration | 8 | uimsbf |
|     reserved_for_word_alignment | 3 | bslbf |
|     lfe_existence | 1 | bslbf |
|     sampling_frequency | 4 | uimsbf |
|   } else if (stream == SUBTITLE) { | | |
|     subtitle_language_code | 16 | bslbf |
|     reserved_for_word_alignment | 15 | bslbf |
|     configurable_flag | 1 | uimsbf |
|   } | | |
| } | | |

FIG. 13

| DynamicInfo | | | |
|---|---|---|---|
| Syntax | | No. of bits | Mnemonic |
| DynamicInfo(i,j) { | | | |
| | reserved_for_word_alignment | 8 | bslbf |
| | if(stream == VIDEO ) { | | |
| | reserved_for_word_alignment | 4 | bslbf |
| | display_aspect_ratio | 4 | uimsbf |
| | } else if(stream == AUDIO ) { | | |
| | reserved_for_word_alignment | 4 | bslbf |
| | channel_assignment | 4 | uimsbf |
| | } else if(stream == SUBTITLE ) { | | |
| | reserved_for_word_alignment | 8 | bslbf |
| | } | | | |
| } | | | |

FIG. 14

| Syntax | No. of bits | Mnemonic |
|---|---|---|
| EP_map() { | | |
|   reserved_for_word_alignment | 8 | bslbf |
|   number_of_stream_id_entries | 8 | uimsbf |
|   for (k=0;k<number_of_stream_id_entries;k++) { | | |
|     stream_id | 8 | bslbf |
|     private_stream_id | 8 | bslbf |
|     number_of_EP_entries | 32 | uimsbf |
|     for (i=0;i<number_of_EP_entries;i++) { | | |
|       PTS_EP_start | 32 | uimsbf |
|       RPN_EP_start | 32 | uimsbf |
|     } | | |
|   } | | |
| } | | |

FIG. 15

Table 2-31—Program Stream

| Syntax | No. of bits | Mnemonic |
|---|---|---|
| MPEG2_program_stream() {<br>    do {<br>        pack()<br>    } while(nextbits() == pack_start_code)<br>    MPEG_program_end_code<br>} | 32 | bslbf |

Table 2-32—Program Stream pack

| Syntax | No. of bits | Mnemonic |
|---|---|---|
| pack() {<br>    pack_header()<br>    while(nextbits()==packet_start_code_prefix) {<br>    PES_packet()<br>    }<br>} | | |

Table 2-33—Program Stream pack header

| Syntax | No. of bits | Mnemonic |
|---|---|---|
| pack_header() { | | |
|     pack_start_code | 32 | bslbf |
|     '01' | 2 | bslbf |
|     system_clock_reference_base[32..30] | 3 | bslbf |
|     marker_bit | 1 | bslbf |
|     system_clock_reference_base[29..15] | 15 | bslbf |
|     marker_bit | 1 | bslbf |
|     system_clock_reference_base[14..0] | 15 | bslbf |
|     marker_bit | 1 | bslbf |
|     system_clock_reference_extension | 9 | uimsbf |
|     marker_bit | 1 | bslbf |
|     program_mux_rate | 22 | uimsbf |
|     marker_bit | 1 | bslbf |
|     marker_bit | 1 | bslbf |
|     reserved | 5 | bslbf |
|     pack_stuffing_length | 3 | uimsbf |
|     for(i=0;i<pack_stuffing_length;i++) { | | |
|         stuffing_byte | 8 | bslbf |
|     } | | |
|     if(nextbits()==system_header_start_code) { | | |
|         system_header() | | |
|     } | | |
| } | | |

FIG. 16

Table 2-17—PES packet

| Syntax | No. of bits | Mnemonic |
|---|---|---|
| PES_packet() { | | |
|     packet_start_code_prefix | 24 | bslbf |
|     stream_id | 8 | uimsbf |
|     PES_packet_length | 16 | uimsbf |
|     if(stream_id !=program_stream_map | | |
|     && stream_id !=padding_stream | | |
|     && stream_id !=private_stream_2 | | |
|     && stream_id !=ECM | | |
|     && stream_id !=EMM | | |
|     && stream_id !=program_stream_directory | | |
|     && stream_id !=DSMCC_stream | | |
|     && stream_id !=ITU-T Rec. H.222.1 type E stream) { | | |
|         '10' | 2 | bslbf |
|         PES_scrambling_control | 2 | bslbf |
|         PES_priority | 1 | bslbf |
|         data_alignment_indicator | 1 | bslbf |
|         copyright | 1 | bslbf |
|         original_or_copy | 1 | bslbf |
|         PTS_DTS_flags | 2 | bslbf |
|         ESCR_flag | 1 | bslbf |
|         ES_rate_flag | 1 | bslbf |
|         DSM_trick_mode_flag | 1 | bslbf |
|         additional_copy_info_flag | 1 | bslbf |
|         PES_CRC_flag | 1 | bslbf |
|         PES_extension_flag | 1 | bslbf |
|         PES_header_data_length | 8 | uimsbf |
|         if (PTS_DTS_flags == '10') { | | |
|             '0010' 4 bslbf | 4 | bslbf |
|             PTS [32..30] | 3 | bslbf |
|             marker_bit | 1 | bslbf |
|             PTS [29..15] | 15 | bslbf |
|             marker_bit | 1 | bslbf |
|             PTS [14..0] | 15 | bslbf |
|             marker_bit | 1 | bslbf |
|         } | | |

FIG. 17

Table 2-17—PES packet (continued)

| Syntax | No. of bits | Mnemonic |
|---|---|---|
| if(PTS_DTS_flags=='11') { | | |
|     '0011' | 4 | bslbf |
|     PTS[32..30] | 3 | bslbf |
|     marker_bit | 1 | bslbf |
|     PTS [29..15] | 15 | bslbf |
|     marker_bit | 1 | bslbf |
|     PTS [14..0] | 15 | bslbf |
|     marker_bit | 1 | bslbf |
|     '0001' | 4 | bslbf |
|     DTS [32..30] | 3 | bslbf |
|     marker_bit | 1 | bslbf |
|     DTS [29..15] | 15 | bslbf |
|     marker_bit | 1 | bslbf |
|     DTS [14..0] | 15 | bslbf |
|     marker_bit | 1 | bslbf |
| } | | |
| if (ESCR_flag=='1') { | | |
|     reserved | 2 | bslbf |
|     ESCR_base[32..30] | 3 | bslbf |
|     marker_bit | 1 | bslbf |
|     ESCR_base[29..15] | 15 | bslbf |
|     marker_bit | 1 | bslbf |
|     ESCR_base[14..0] | 15 | bslbf |
|     marker_bit | 1 | bslbf |
|     ESCR_extension | 9 | uimsbf |
|     marker_bit | 1 | bslbf |
| } | | |
| if(ES_rate_flag=='1') { | | |
|     marker_bit | 1 | bslbf |
|     ES_rate | 22 | uimsbf |
|     marker_bit | 1 | bslbf |
| } | | |
| if(DSM_trick_mode_flag=='1') { | | |
|     trick_mode_control | 3 | uimsbf |
|     if(trick_mode_control==fast_forward ) { | | |
|         field_id | 2 | bslbf |
|         intra_slice_refresh | 1 | bslbf |
|         frequency_truncation | 2 | bslbf |
|     } | | |
|     else if(trick_mode_control==slow_motion ) { | | |
|         rep_cntrl | 5 | uimsbf |
|     } | | |
|     else if(trick_mode_control==freeze_frame ) { | | |
|         field_id | 2 | uimsbf |
|         reserved | 3 | bslbf |
|     } | | |
|     else if(trick_mode_control==fast_reverse ) { | | |
|         field_id | 2 | bslbf |
|         intra_slice_refresh | 1 | bslbf |
|         frequency_truncation | 2 | bslbf |
|     else if(trick_mode_control==slow_reverse) { | | |
|         rep_cntrl | 5 | uimsbf |
|     } | | |
|     else | | |
|         reserved | 5 | bslbf |
| } | | |
| if( additional_copy_info_flag=='1') { | | |
|     marker_bit | 1 | bslbf |
|     additional_copy_info | 7 | bslbf |
| } | | |
| if( PES_CRC_flag=='1') { | | |
|     previous_PES_packet_CRC | 16 | bslbf |
| } | | |

FIG. 18

Table 2-17—PES packet (concluded)

| Syntax | No. of bits | Mnemonic |
|---|---|---|
| `if(PES_extension_flag=='1') {` | | |
|     PES_private_data_flag | 1 | bslbf |
|     pack_header_field_flag | 1 | bslbf |
|     program_packet_sequence_counter_flag | 1 | bslbf |
|     P-STD_buffer_flag | 1 | bslbf |
|     reserved | 3 | bslbf |
|     PES_extension_flag_2 | 1 | bslbf |
|     `if(PES_private_data_flag=='1') {` | | |
|         PES_private_data | 128 | bslbf |
|     `}` | | |
|     `if (pack_header_field_flag == '1') {` | | |
|         pack_field_length | 8 | uimsbf |
|         pack_header () | | |
|     `}` | | |
|     `if (program_packet_sequence_counter_flag == '1') {` | | |
|         marker_bit | 1 | bslbf |
|         program_packet_sequence_counter | 7 | uimsbf |
|         marker_bit | 1 | bslbf |
|         MPEG1_MPEG2_identifier | 1 | bslbf |
|         original_stuff_length | 6 | uimsbf |
|     `}` | | |
|     `if(P-STD_buffer_flag == '1') {` | | |
|         '01' | 2 | bslbf |
|         P-STD_buffer_scale | 1 | bslbf |
|         P-STD_buffer_size | 13 | uimsbf |
|     `}` | | |
|     `if( PES_extension_flag_2 == '1') {` | | |
|         marker_bit | 1 | bslbf |
|         PES_extension_field_length | 7 | uimsbf |
|         `for(i=0;i<PES_extension_field_length;i++) {` | | |
|             reserved | 8 | bslbf |
|         `}` | | |
|     `}` | | |
| `}` | | |
| `for(i=0;i<N1;i++) {` | | |
|     stuffing_byte | 8 | bslbf |
| `}` | | |
| `for(i=0;i<N2;i++) {` | | |
|     PES_packet_data_byte | 8 | bslbf |
| `}` | | |
| `} else if(stream_id == program_stream_map` | | |
| `\|\|stream_id == private_stream_2` | | |
| `\|\|stream_id == ECM` | | |
| `\|\|stream_id == EMM` | | |
| `\|\|stream_id == program_stream_directory` | | |
| `\|\|stream_id == DSMCC_stream` | | |
| `\|\|stream_id == ITU-T Rec.H.222.1 type E stream) {` | | |
|     `for(i=0;i<PES_packet_length;i++) {` | | |
|         PES_packet_data_byte | 8 | bslbf |
|     `}` | | |
| `}` | | |
| `else if(stream_id == padding_stream) {` | | |
|     `for(i=0;i<PES_packet_length;i++) {` | | |
|         padding_byte | 8 | bslbf |
|     `}` | | |
| `}` | | |
| `}` | | |

FIG. 19

Table 2-18—Stream_id assignments

| stream_id | Note | stream coding |
|---|---|---|
| 1011 1100 | 1 | program_stream_map |
| 1011 1101 | 2 | private_stream_1 |
| 1011 1110 | | padding_stream |
| 1011 1111 | 3 | private_stream_2 |
| 110x xxxx | | ISO/IEC 13818-3 or ISO/IEC 11172-3 or ISO/IEC 13818-7 or ISO/IEC 14496-3 audio stream number x xxxx |
| 1110 xxxx | | ITU-T Rec. H.262 | ISO/IEC 13818-2 or ISO/IEC 11172-2 or ISO/IEC 14496-2 video stream number xxxx |
| 1111 0000 | 3 | ECM_stream |
| 1111 0001 | 3 | EMM_stream |
| 1111 0010 | 5 | ITU-T Rec. H.222.0 | ISO/IEC 13818-1 Annex A or ISO/IEC 13818-6_DSMCC_stream |
| 1111 0011 | 2 | ISO/IEC_13522_stream |
| 1111 0100 | 6 | ITU-T Rec. H.222.1 type A |
| 1111 0101 | 6 | ITU-T Rec. H.222.1 type B |
| 1111 0110 | 6 | ITU-T Rec. H.222.1 type C |
| 1111 0111 | 6 | ITU-T Rec. H.222.1 type D |
| 1111 1000 | 6 | ITU-T Rec. H.222.1 type E |
| 1111 1001 | 7 | ancillary_stream |
| 1111 1010 | | ISO/IEC14496-1_SL-packetized_stream |
| 1111 1011 | | ISO/IEC14496-1_FlexMux_stream |
| 1111 1100 ... 1111 1110 | | reserved data stream |
| 1111 1111 | 4 | program_stream_directory |

The notation x means that the values '0' or '1' are both permitted and results in the same stream type. The stream number is given by the values taken by the x's.
NOTE 1—PES packets of type program_stream_map have unique syntax specified in 2.5.4.1.
NOTE 2—PES packets of type private_stream_1 and ISO/IEC_13552_stream follow the same PES packet syntax as those for ITU-T Rec. H.262 | ISO/IEC 13818-2 video and ISO/IEC 13818-3 audio streams.
NOTE 3—PES packets of type private_stream_2, ECM_stream and EMM_stream are similar to private_stream_1 except no syntax is specified after PES_packet_length field.
NOTE 4—PES packets of type program_stream_directory have a unique syntax specified in 2.5.5.
NOTE 5—PES packets of type DSM-CC_stream have a unique syntax specified in ISO/IEC 13818-6.
NOTE 6—This stream_id is associated with stream_type 0x09 in Table 2-29.
NOTE 7—This stream_id is only used in PES packets, which carry data from a Program Stream or an ISO/IEC 11172-1 System Stream, in a Transport Stream (refer to 2.4.3.7).

FIG. 20

| stream_id | stream coding (TYPES OF STREAMS) |
|---|---|
| 1011 1101 | private_stream_1 |
| 1011 1110 | padding_stream |
| 1011 1111 | private_stream_2 |
| 110x xxxx | audio stream number x xxxx |
| 1110 xxxx | video stream number xxxx |

FIG. 21

Table 2-18—Stream_id assignments

| stream_id | Note | stream coding |
|---|---|---|
| 1011 1100 | 1 | program_stream_map |
| 1011 1101 | 2 | private_stream_1 |
| 1011 1110 |   | padding_stream |
| 1011 1111 | 3 | private_stream_2 |
| 110x xxxx |   | ISO/IEC 13818-3 or ISO/IEC 11172-3 or ISO/IEC 13818-7 or ISO/IEC 14496-3 audio stream number x xxxx |
| 1110 xxxx |   | ITU-T Rec. H.262 \| ISO/IEC 13818-2 or ISO/IEC 11172-2 or ISO/IEC 14496-2 video stream number xxxx |
| 1111 0000 | 3 | ECM_stream |
| 1111 0001 | 3 | EMM_stream |
| 1111 0010 | 5 | ITU-T Rec. H.222.0 \| ISO/IEC 13818-1 Annex A or ISO/IEC 13818-6_DSMCC_stream |
| 1111 0011 | 2 | ISO/IEC_13522_stream |
| 1111 0100 | 6 | ITU-T Rec. H.222.1 type A |
| 1111 0101 | 6 | ITU-T Rec. H.222.1 type B |
| 1111 0110 | 6 | ITU-T Rec. H.222.1 type C |
| 1111 0111 | 6 | ITU-T Rec. H.222.1 type D |
| 1111 1000 | 6 | ITU-T Rec. H.222.1 type E |
| 1111 1001 | 7 | ancillary_stream |
| 1111 1010 |   | ISO/IEC14496-1_SL-packetized_stream |
| 1111 1011 |   | ISO/IEC14496-1_FlexMux_stream |
| 1111 1100 ... 1111 1110 |   | reserved data stream |
| 1111 1111 | 4 | program_stream_directory |

The notation x means that the values '0' or '1' are both permitted and results in the same stream type. The stream number is given by the values taken by the x's.
NOTE 1—PES packets of type program_stream_map have unique syntax specified in 2.5.4.1.
NOTE 2—PES packets of type private_stream_1 and ISO/IEC_13552_stream follow the same PES packet syntax as those for ITU-T Rec. H.262 \| ISO/IEC 13818-2 video and ISO/IEC 13818-3 audio streams.
NOTE 3—PES packets of type private_stream_2, ECM_stream and EMM_stream are similar to private_stream_1 except no syntax is specified after PES_packet_length field.
NOTE 4—PES packets of type program_stream_directory have a unique syntax specified in 2.5.5.
NOTE 5—PES packets of type DSM-CC_stream have a unique syntax specified in ISO/IEC 13818-6.
NOTE 6—This stream_id is associated with stream_type 0x09 in Table 2-29.
NOTE 7—This stream_id is only used in PES packets, which carry data from a Program Stream or an ISO/IEC 11172-1 System Stream in a Transport Stream (refer to 2.4.3.7).

FIG. 22

| private_stream_id | stream coding (TYPES OF STREAMS) |
|---|---|
| 0000 xxxx | ATRAC Audio stream number xxxx |
| 0001 xxxx | LPCM stream number xxxx |
| 100x xxxx | Subtitle stream number x xxxx |

FIG. 23

| Syntax | No. of bits | Mnemonic |
|---|---|---|
| private_stream2_PES_payload() { | | |
|   reserved_for_future_use | 8 | bslbf |
|   video_stream_id | 8 | uimsbf |
|   1stRef_picture | 16 | uimsbf |
|   2ndRef_picture | 16 | uimsbf |
|   3rdRef_picture | 16 | uimsbf |
|   4thRef_picture | 16 | uimsbf |
|   au_information() | | |
|   VBI() | | |
|   for (i=0; i<N1; i++) { | | |
|     padding_word | 16 | bslbf |
|   } | | |
| } | | |

FIG. 24

| Syntax | No. of bits | Mnemonic |
|---|---|---|
| au_information() { | | |
|   length | 16 | uimsbf |
|   reserved_for_word_alignment | 8 | bslbf |
|   number_of_access_unit | 8 | uimsbf |
|   for (i=0;i<number_of_access_unit;i++) { | | |
|     reserved | 4 | bslbf |
|     pic_struct_copy | 4 | uimsbf |
|     au_ref_flag | 1 | uimsbf |
|     reserved | 2 | bslbf |
|     AU_length | 21 | uimsbf |
|   } | | uimsbf |
| } | | |

FIG. 25

| // "PLAYLIST.DAT" | | |
|---|---|---|
| number_of_PlayLists | 2 | |
| | | |
| // PlayList() | PlayList #0 | PlayList #1 |
| capture_enable_flag_PlayList | 1 | 0 |
| number_of_PlayItems | 2 | 1 |
| | | |
| // PlayItem #0 | | |
| Clip_Information_file_name | "00001.CLP" | "00003.CLP" |
| IN_time | 180,090 | 90,000 |
| OUT_time | 27,180,090 | 81,090,000 |
| | | |
| // PlayItem #1 | | |
| Clip_Information_file_name | "00002.CLP" | |
| IN_time | 90,000 | |
| OUT_time | 27,090,000 | |

FIG. 26

| | "00002.CLP" | "00003.CLP" |
|---|---|---|
| // Clip() | | |
| presentation_start_time | 90,000 | 90,000 |
| presentation_end_time | 27,090,000 | 81,090,000 |
| capture_enable_flag_Clip | 1 | 0 |
| number_of_streams | 4 | 3 |
| // stream #0 | StreamInfo() | StreamInfo() |
| stream_id | 0xE0(video stream) | 0xE0(video stream) |
| private_stream_id | 0x00 | 0x00 |
| | picture_size='720x480' | picture_size='720x480' |
| | frame_rate='29.97Hz' | frame_rate='29.97Hz' |
| | cc_flag='Yes' | cc_flag='No' |
| number_of_DynamicInfo | 0 | 2 |
| // stream #1 | StreamInfo() | StreamInfo() |
| stream_id | 0xBD(private_stream_1) | 0xE1(video stream) |
| private_stream_id | 0x00(ATRAC) | 0x00 |
| | audio_language_code='JAPANESE' | picture_size='720x480' |
| | channel_configuration='STEREO' | frame_rate='29.97Hz' |
| | lfe_existence='NO' | cc_flag='No' |
| | sampling_frequency='48KHz' | |
| number_of_DynamicInfo | 0 | 0 |
| // stream #2 | StreamInfo() | StreamInfo() |
| stream_id | 0xBD(private_stream_1) | 0xBD(private_stream_1) |
| private_stream_id | 0x80(Subtitle) | 0x00(ATRAC) |
| | subtitle_language_code='JAPANESE' | audio_language_code='JAPANESE' |
| | configurable_flag=0 | channel_configuration='STEREO' |
| | | lfe_existence='NO' |
| | | sampling_frequency='48KHz' |
| number_of_DynamicInfo | 0 | 3 |
| // stream #3 | StreamInfo() | |
| stream_id | 0xBD(private_stream_1) | |
| private_stream_id | 0x81(Subtitle) | |
| | subtitle_language_code='JAPANESE' | |
| | configurable_flag=1 | |
| number_of_DynamicInfo | 0 | |

FIG. 27

| EP_map() for "00001.CLP" | | |
|---|---|---|
| number_of_stream_id_entries | 1 | |
| stream_id | 0xE0(video stream) | |
| private_stream_id | 0x00 | |
| | PTS_EP_start | RPN_EP_start |
| | 90000 | 0 |
| | 135045 | 244 |
| | 180090 | 305 |
| | 225135 | 427 |
| | 270180 | 701 |

FIG. 28

PlayListMark() of PlayList #0
number_of_PlayList_marks=7

| Mark() | mark_type | ref_to_PlayItem_id | mark_time_stamp | entry_ES_stream_id | entry_ES_private_stream_id | mark_data | |
|---|---|---|---|---|---|---|---|
| #0 | Chapter | 0 | 180,090 | 0 | 0 | 1 | START |
| #1 | Index | 0 | 5,580,090 | 0 | 0 | 1 | 1 MINUTE |
| #2 | Index | 0 | 10,980,090 | 0 | 0 | 2 | 2 MINUTES |
| #3 | Event | 0 | 16,380,090 | 0 | 0 | 0 | 3 MINUTES |
| #4 | Chpater | 1 | 90,000 | 0 | 0 | 2 | START |
| #5 | Index | 1 | 5,490,000 | 0 | 0 | 1 | 1 MINUTE |
| #6 | Index | 1 | 10,890,000 | 0 | 0 | 2 | 2 MINUTES |

START
1 MINUTE
2 MINUTES
3 MINUTES
5 MINUTES
6 MINUTES
7 MINUTES

PlayListMark() of PlayList #1
number_of_PlayList_marks=3

| Mark() | mark_type | ref_to_PlayItem_id | mark_time_stamp | entry_ES_stream_id | entry_ES_private_stream_id | mark_data | |
|---|---|---|---|---|---|---|---|
| #0 | Chapter | 0 | 90,000 | 0 | 0 | 0 | START |
| #1 | Event | 0 | 27,090,000 | 0xE0 | 0 | 1 | 5 MINUTES |
| #2 | Event | 0 | 27,540,000 | 0xE1 | 0 | 2 | 5 MINUTES 5 SECONDS (305 SECONDS) |

FIG. 42

"00003.CLP"

Stream#0:
| stream_id | 0xE0 | (video stream) |
|---|---|---|
| private_stream_id | 0x00 | |
| number_of_DynamicInfo | 2 | |

| | pts_change_point | DynamicInfo() |
|---|---|---|
| #0 | 90,000 | display_aspect_ratio=='4:3' |
| #1 | 54,090,000 | display_aspect_ratio=='16:9' |

Stream#2:
| stream_id | 0xBD | (private_stream_1) |
|---|---|---|
| private_stream_id | 0x00 | (ATRAC) |
| number_of_DynamicInfo | 3 | |

| | pts_change_point | DynamicInfo() |
|---|---|---|
| #0 | 90,000 | channel_assignment=='Dual' |
| #1 | 27,090,000 | channel_assignment=='Stereo' |
| #2 | 32,490,000 | channel_assignment=='Dual' |

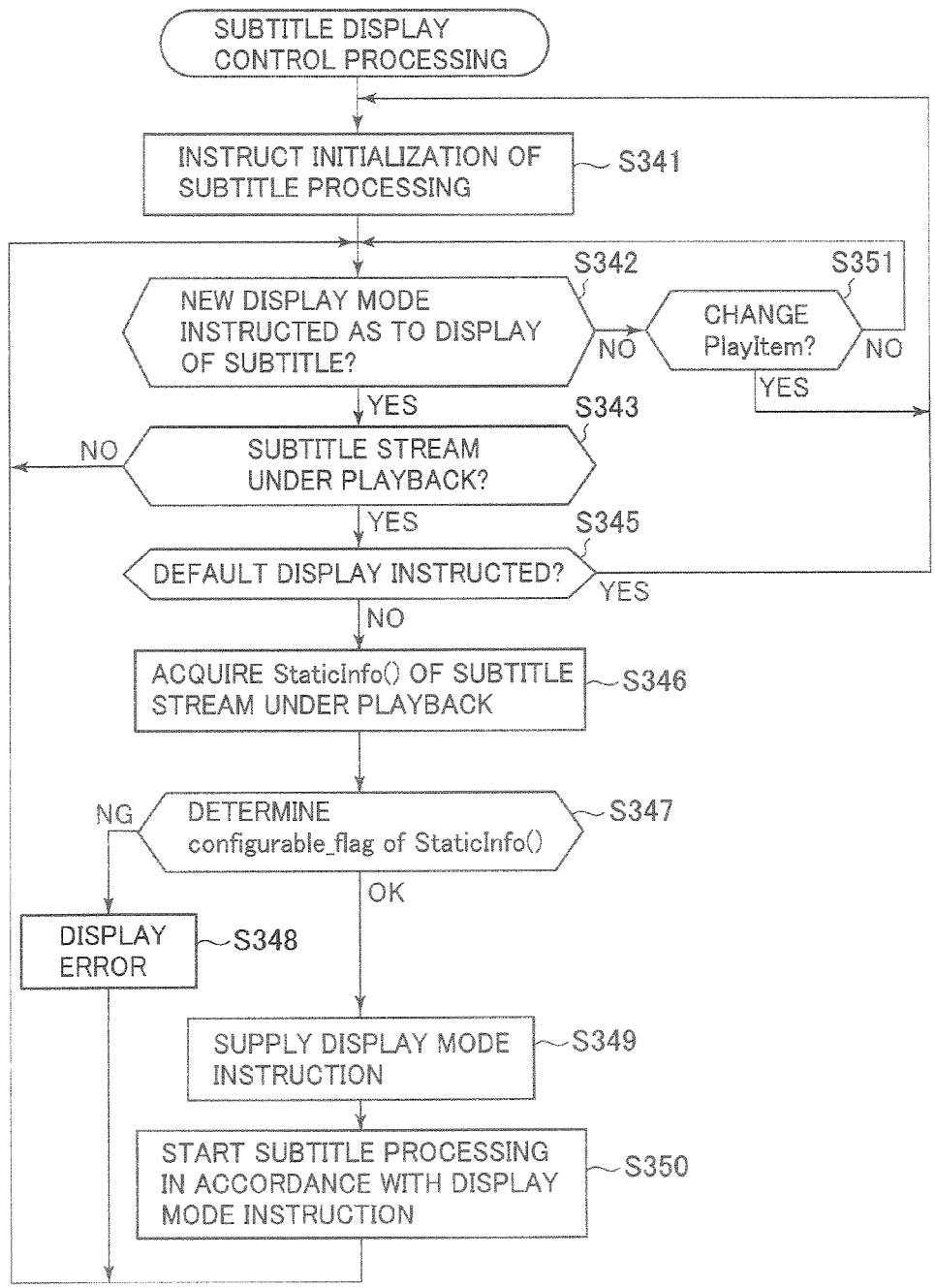

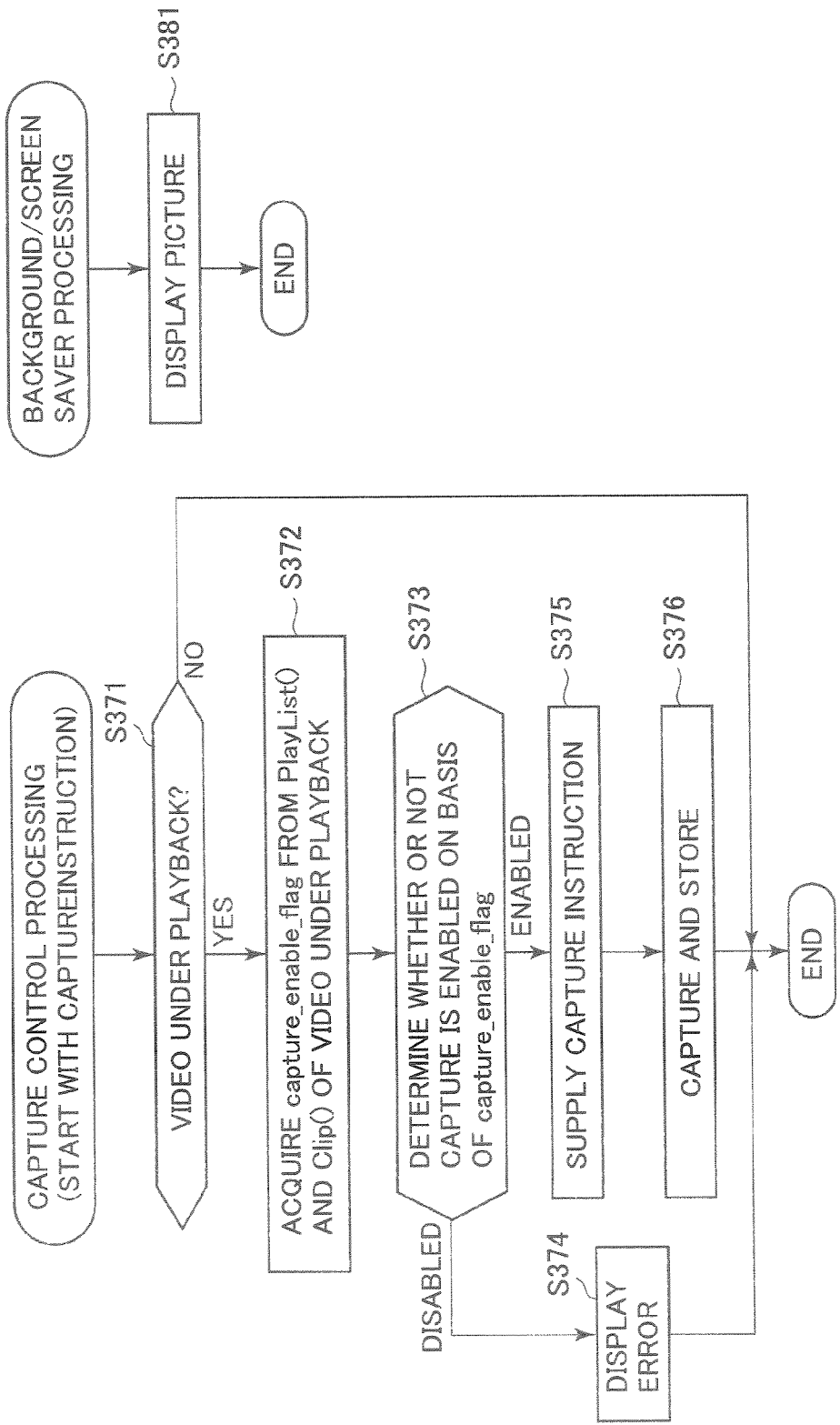

FIG. 45

| Syntax | No. of bits | Mnemonic |
|---|---|---|
| private_stream2_PES_payload() { | | |
| reserved_for_future_use | 7 | bslbf |
| capture_enable_ps2 | 1 | uimsbf |
| video_stream_id | 8 | uimsbf |
| 1stRef_picture | 16 | uimsbf |
| 2ndRef_picture | 16 | uimsbf |
| 3rdRef_picture | 16 | uimsbf |
| 4thRef_picture | 16 | uimsbf |
| au_information() | | |
| grain_variance_information() | | |
| VBI() | | |
| for (i=0; i<N1; i++) { | | |
| padding_word | 16 | bslbf |
| } | | |
| } | | |

FIG. 46

| Syntax | No. of bits | Mnemonic |
|---|---|---|
| au_information() { | | |
| length | 16 | uimsbf |
| reserved_for_word_align | 8 | bslbf |
| number_of_access_unit | 8 | uimsbf |
| for (i=0;i<number_of_access_unit;i++) { | | |
| reserved | 3 | bslbf |
| capture_enable_flag_AU | 1 | uimsbf |
| pic_struct_copy | 4 | uimsbf |
| au_ref_flag | 1 | uimsbf |
| reserved | 2 | bslbf |
| AU_length | 21 | uimsbf |
| } | | |
| } | | |

DATA PROCESSING DEVICE, DATA PROCESSING METHOD, PROGRAM, PROGRAM RECORDING MEDIUM, DATA RECORDING MEDIUM, AND DATA STRUCTURE

TECHNICAL FIELD

The present invention relates to a data processing device and a data processing method, a program and a program recording medium, a data recording medium, and a data structure. The invention particularly relates to a data processing device and a data processing method, a program and a program recording medium, a data recording medium, and a data structure, all enabling, e.g., data processing featuring enhanced convenience and the like.

BACKGROUND ART

Recently, a DVD (Digital Versatile Disc), for example, is widespread as a large-capacity, random-accessible recording medium, and so are DVD apparatus for performing various processing using a DVD.

The DVD apparatus include, e.g., DVD recorders for performing recording/playback of data such as television broadcasting programs on/from a DVD, car navigation systems for recording map information and the like on a DVD and displaying the map information, and game machines for recording a program and the like of a game and executing the program.

Note that details of DVDs are described in, e.g., a Non-Patent Document 1.

[Non-Patent Document 1] DVD Specifications for Read-Only Disc Part 3; Version 1.1 December 1997

DISCLOSURE OF THE INVENTION

Problems to be Solved by the Invention

A recording medium such as a DVD capable of recording a huge amount of data, a DVD apparatus for performing various processing using it, and the like are requested to perform data processing featuring enhanced convenience on such a huge amount of data.

The present invention has been made in view of such circumstances, and is to enable data processing featuring enhanced convenience and the like.

Means for Solving the Problems

A data processing device of the present invention is characterized by having reading means for reading metadata. The metadata is related to multiplexed data into which one or more pieces of data are multiplexed, and includes as many sets as a number of pieces of data multiplexed into the multiplexed data. Each of the sets includes first identification information, defined for each attribute of data in a predetermined standard, for identifying the data; and second identification information for identifying data having an attribute not defined in the predetermined standard. The data processing device of the present invention is also characterized by having specifying means for specifying the data multiplexed into the multiplexed data on the basis of the first and second identification information included in the metadata, and processing means for processing the data specified by the specifying means.

A data processing method of the present invention is characterized by including a reading step of reading metadata. The metadata is related to multiplexed data into which one or more pieces of data are multiplexed, and includes as many sets as a number of pieces of data multiplexed into the multiplexed data. Each of the sets includes first identification information, defined for each attribute of data in a predetermined standard, for identifying the data, and second identification information for identifying data having an attribute not defined in the predetermined standard. The data processing method of the present invention is also characterized by including a specifying step of specifying data multiplexed into the multiplexed data on the basis of the first and second identification information included in the metadata, and a processing step of processing the data specified in the specifying step.

A program of the present invention is characterized by including a reading step of reading metadata. The metadata is related to multiplexed data into which one or more pieces of data are multiplexed, and includes as many sets as a number of pieces of data multiplexed into the multiplexed data. Each of the sets includes first identification information, defined for each attribute of data in a predetermined standard, for identifying the data, and second identification information for identifying data having an attribute not defined in the predetermined standard. The program of the present invention is also characterized by including a specifying step of specifying data multiplexed into the multiplexed data on the basis of the first and second identification information included in the metadata, and a processing step of processing the data specified in the specifying step.

A program recorded on a program recording medium of the present invention is characterized by including a reading step of reading metadata. The metadata is related to multiplexed data into which one or more pieces of data are multiplexed, and includes as many sets as a number of pieces of data multiplexed into the multiplexed data. Each of the sets includes first identification information, defined for each attribute of data in a predetermined standard, for identifying the data, and second identification information for identifying data having an attribute not defined in the predetermined standard. The program recorded on the program recording medium of the present invention is also characterized by including a specifying step of specifying data multiplexed into the multiplexed data on the basis of the first and second identification information included in the metadata, and a processing step of processing the data specified in the specifying step.

Recorded data and a data structure recorded on a data recording medium of the present invention is characterized by including multiplexed data into which one or more pieces of data are multiplexed, and metadata related to the multiplexed data. The metadata includes as many sets as a number of pieces of data multiplexed into the multiplexed data. Each of the sets includes first identification information, defined for each attribute of data in a predetermined standard, for identifying the data, and second identification information for identifying data having an attribute not defined in the predetermined standard.

In the data processing device and the data processing method, and the program, and the program recorded on the program recording medium of the present invention, metadata is read. The metadata is related to multiplexed data into which one or more pieces of data are multiplexed, and includes as many sets as a number of pieces of data multiplexed into the multiplexed data. Each of the sets includes first identification information, defined for each attribute of data in a predetermined standard, for identifying the data, and second identification information for identifying data having an attribute not defined in the predetermined standard. Furthermore, on the basis of the first and second identification information included in the metadata, data multiplexed into the multiplexed data is specified, and the specified data is processed.

In the recorded data recorded on the data recording medium, and the data structure of the present invention, multiplexed data into which one or more pieces of data are multiplexed, and metadata about the multiplexed data are included. And the metadata includes as many sets as a number of pieces of data multiplexed into the multiplexed data. Each of the sets includes first identification information, defined for each attribute of data in a predetermined standard, for identifying the data, and second identification information for identifying data having an attribute not defined in the predetermined standard.

Effects of the Invention

According to the present invention, data processing featuring enhanced convenience and the like is enabled. Particularly, it becomes possible to specify data multiplexed into multiplexed data according to metadata irrespective of the number of pieces of data.

BRIEF DESCRIPTION OF THE DRAWINGS

FIG. 5 is a diagram showing a syntax of a "PLAYLIST.DAT" file.

FIG. 6 is a diagram showing a syntax of a PlayItem( ).

FIG. 7 is a diagram showing a syntax of a PlayListMark( ).

FIG. 8 is a diagram showing the relationship between mark_type values and types of Mark( )'s.

FIG. 9 is a diagram showing the relationship among a PlayList( ), a PlayItem( ), a clip, and a program stream stored in a clip stream file.

FIG. 10 is a diagram showing a syntax of a clip information file Clip( ).

FIG. 11 is a diagram showing the relationship between a stream_id and a private_stream_id for identifying an elementary stream, and the elementary stream.

FIG. 12 is a diagram showing a syntax of a StaticInfo( ).

FIG. 13 is a diagram showing a syntax of a DynamicInfo( ).

FIG. 14 is a diagram showing a syntax of an EP_map( ).

FIG. 15 is a diagram showing syntaxes of a program stream, a program stream pack, and a program stream pack header in the MPEG-2 System.

FIG. 16 is a diagram showing a syntax of a PES packet in the MPEG-2 System.

FIG. 17 is a diagram showing the syntax of the PES packet in the MPEG-2 System.

FIG. 18 is a diagram showing the syntax of the PES packet in the MPEG-2 System.

FIG. 19 is a diagram showing the relationship between values described in the stream_id's of PES_packet( )'s and attributes (types) of elementary streams in the MPEG-2 System.

FIG. 20 is a diagram showing stream_id's adopted by the disc apparatus.

FIG. 21 is a diagram showing a syntax of a private_stream1_PES_payload( ).

FIG. 22 is a diagram showing the relationship between private_stream_id values and attributes of elementary streams stored in private_payload( )'s.

FIG. 23 is a diagram showing a syntax of a private_stream2_PES_payload( ).

FIG. 24 is a diagram showing a syntax of an au_information( ).

FIG. 25 is a diagram showing a specific example of the "PLAYLIST.DAT" file.

FIG. 26 is a diagram showing specific examples of clip information files "00001.CLP", "00002.CLP", and "00003.CLP".

FIG. 27 is a diagram showing a specific example of the EP_map( ) in the clip information file "00001.CLP".

FIG. 28 is a diagram showing specific examples of PlayListMark( )'s in a PlayList#0 and a PlayList#1.

FIG. 42 is a diagram showing specific examples of pts_change_point/DynamicInfo( ) sets described in the clip information file "00003.CLP".

FIG. 43 is a flowchart for explaining subtitle display control processing.

FIG. 44 is a flowchart for explaining capture control processing and background/screen saver processing.

FIG. 45 is a diagram showing another syntax of the private_stream2_PES_payload( ).

FIG. 46 is a diagram showing another syntax of the au_information( ).

EXPLANATION OF REFERENCE NUMERALS

101 disc, 102 disc drive, 111 bus, 112 CPU, 113 memory, 114 drive interface, 115 input interface, 116 video decoder, 117 audio decoder, 118 video output interface, 119 audio output interface, 120 video output terminal, 121 audio output terminal, 201 operating system, 210 video content playback program, 211 script control module, 212 player control module, 213 content data supply module, 214 decode control module, 214A time measuring section, 215 buffer control module, 215A buffer, 216 video decoder control module, 217 audio decoder control module, 218 subtitle decoder control module, 219 graphics processing module, 220 video output module, 220A FIFO, 221 audio output module, 221A FIFO, 231 data start pointer storing section, 232 data writing pointer storing section, 233 video reading function section, 234 audio reading function section, 235 subtitle reading function section, 241 video reading pointer storing section, 242 stream_id register, 243 au_information( ) register, 251 audio reading pointer storing section, 252 stream_id register, 253 private_stream_id register, 261 subtitle reading function flag storing section, 262 subtitle reading pointer storing section, 263 stream_id register, 264 private_stream_id register

BEST MODES FOR CARRYING OUT THE INVENTION

An embodiment of the present invention will be described below with reference to the drawings.

[Hardware Configuration]

Figure 1:
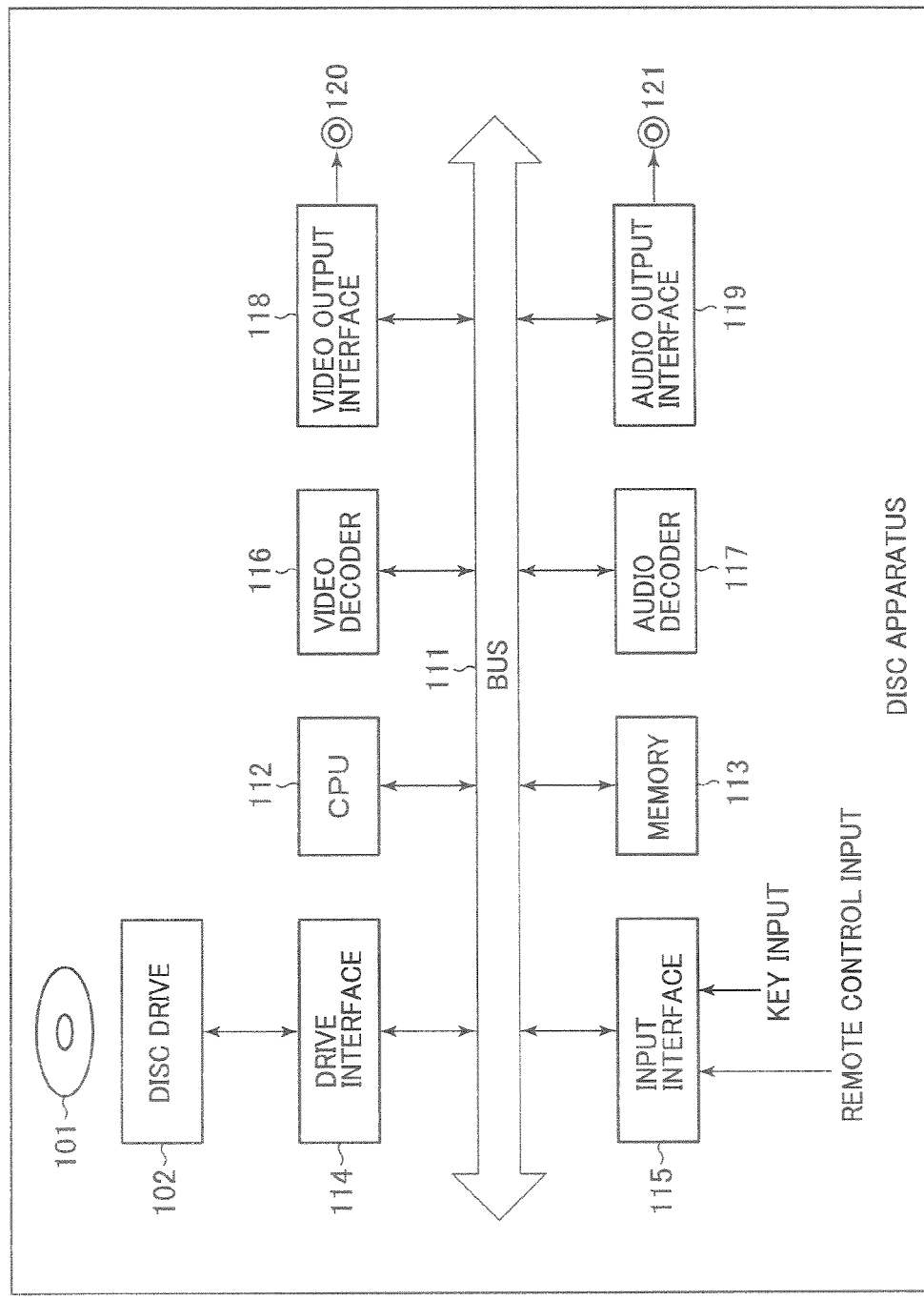
FIG. 1 is a block diagram showing a hardware configuration example of an embodiment of a disc apparatus to which the present invention is applied.

FIG. 1 is a block diagram showing a hardware configuration example of an embodiment of a disc apparatus to which the present invention is applied.

The disc apparatus of FIG. 1 can be applied to, e.g., disc players, game machines, car navigation systems and other apparatus.

In the disc apparatus of FIG. 1, a disc 101 is, e.g., an optical disc such as a DVD, or a magneto-optic disc, a magnetic disk, and has content data such as video data, audio data, and subtitle data, and further, data necessary for playing back the content data, recorded thereon.

Note that the data (recorded data) recorded on the disc 101 also includes a computer-executable program, as necessary. Furthermore, while the disc 101 being a disc-shaped recording medium is adopted as a recording medium in the present embodiment, the recording medium may alternatively include, e.g., a semiconductor memory and a tape-shaped recording medium. Furthermore, it is possible to input to the disc apparatus of FIG. 1 data read from the disc 101 at a distant location and transmitted thereto. Namely, the reading of data from the disc 101 can be performed by a different apparatus connected to the disc apparatus, and the data read by the different apparatus can be received and processed by the disc apparatus. Furthermore, the disc apparatus can have data distributed from a server or the like which stores in its storage data similar to that recorded on the disc 101, via a network such as the Internet, for processing. Furthermore, the disc apparatus can also receive data from a server or other apparatus, temporarily record the data on the disc 101, and thereafter process the data recorded on the disc 101.

A disc drive 102 allows the disc 101 to be releasably attachable thereto. The disc drive 102 incorporates an interface (not shown), and is connected to a drive interface 114 through that interface. The disc drive 102 drives the disc 101 attached thereto, and performs processing of, e.g., reading data from the disc 101 in accordance with an instruction for reading or the like from the drive interface 114, and, e.g., supplies the read data to the drive interface 114.

To a bus 111, there are connected a CPU (Central Processing Unit) 112, a memory 113, the drive interface 114, an input interface 115, a video decoder 116, an audio decoder 117, a video output interface 118, and an audio output interface 119.

The CPU 112 and the memory 113 form a computer system. Namely, the CPU 112 executes later-described software modules being a program stored in the memory 113, to control the whole disc apparatus, and also performs later-described various processing. The memory 113 stores the software modules to be executed by the CPU 112. Furthermore, the memory 113 temporarily stores data necessary for operation of the CPU 112. Note that the memory 113 can be formed only of a nonvolatile memory, or of a combination of a volatile memory and a nonvolatile memory. Furthermore, in a case where a hard disk drive is provided in the disc apparatus of FIG. 1 to record (install) the software modules executed by the CPU 112 thereon, the memory 113 can be formed only of a volatile memory.

Here, the program (software modules) executed by the CPU 112 may be recorded (stored) beforehand in the memory 113 as a recording medium incorporated in the disc apparatus.

Alternatively, the program can be temporarily or permanently stored (recorded) on the disc 101, and further on a removable recording medium other than the disc 101 such as a flexible disc, a CD-ROM (Compact Disc Read Only Memory), an MO (Magneto Optical) disc, a magnetic disk, or a memory card. Such a removable recording medium can be provided as so-called package software.

Note that the program can be stored beforehand in the memory 113, or installed in the disc apparatus from a removable recording medium such as those mentioned above. Furthermore, the program can be installed in the disc apparatus through wireless transmission from a downloading site via a satellite for digital satellite broadcasting, or through wired transmission to the disc apparatus via a network such as a LAN (Local Area Network) or the Internet, and the disc apparatus can receive the thus transmitted program by the input interface 115 for installation in the memory 113 incorporated therein.

Furthermore, the program may be processed by a single CPU, or processed by a plurality of CPUs in a distributed manner.

The drive interface 114 controls the disc drive 102 under control by the CPU 112, whereby it supplies data read by the disc drive 102 from the disc 101, to the CPU 112, memory 113, video decoder 116, audio decoder 117 and the like, via the bus 111.

The input interface 115 receives a signal supplied by a user controlling keys (buttons) or a remote control (remote controller) (not shown), for supply to the CPU 112 via the bus 111. Note that the input interface 115 additionally functions as a communication interface such as, e.g., a modem (including an ADSL (Asymmetric Digital Subscriber Line) modem) and a NIC (Network Interface Card).

The video decoder 116 decodes coded data (coded video data) of video data read by the disc drive 102 from the disc 101 and supplied thereto via the drive interface 114 and the bus 111, and supplies the resultant video data to the CPU 112 and the video output interface 118 via the bus 111.

The audio decoder 117 decodes coded data (coded audio data) of audio data read by the disc drive 102 from the disc 101 and supplied thereto via the drive interface 114 and the bus 111, and supplies the resultant audio data to the CPU 112 and the audio output interface 119 via the bus 111.

The video output interface 118 performs necessary processing on the video data supplied thereto via the bus 111, for output from a video output terminal 120. The audio output interface 119 performs necessary processing on the audio data supplied thereto via the bus 111, for output from an audio output terminal 121.

The video output terminal 120 is connected to a video output apparatus (not shown), such as a CRT (Cathode Ray Tube) or a liquid crystal panel, and therefore the video data outputted from the video output terminal 120 is supplied to the video output apparatus for display thereon. The audio output terminal 121 is connected to an audio output apparatus (not shown), such as speakers or amplifiers, and therefore, the audio data outputted from the audio output terminal 121 is supplied to the audio output apparatus for output therefrom.

Note that the supply of the video data and the audio data to the video output apparatus and the audio output apparatus from the disc apparatus, respectively, can be performed by any of wired or wireless means.

[Configuration of Software Modules]

Figure 2:
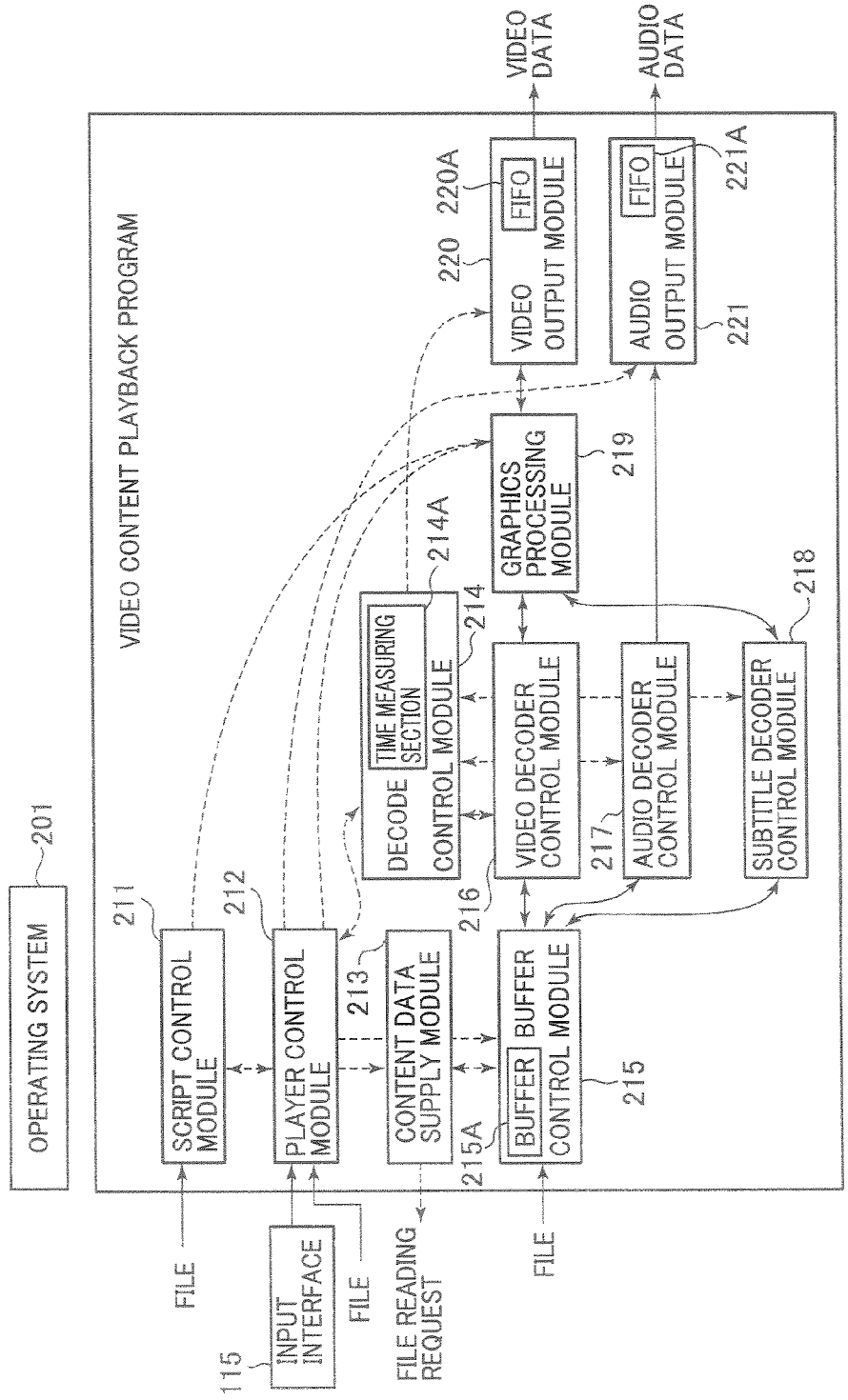
FIG. 2 is a block diagram showing a configuration example of software modules executed by a CPU 112.

Next, FIG. 2 shows a configuration example of the software modules executed by the CPU 112 of FIG. 1.

The software modules executed by the CPU 112 are roughly divided into an operating system (OS) 201, and a video content playback program 210 as an application program.

[Operating System 201]

The operating system 201 is started (the CPU 112 executes the operating system 201) first when the power of the disc apparatus is turned on, and performs necessary processing such as initialization to call the video content playback program 210 being an application program.

The operating system 201 provides infrastructure-like services such as reading a file and the like, to the video content playback program 210. Namely, e.g., as to the reading of a file, the operating system 210, when requested to read a file by the video content playback program 210, controls the disc drive 102 via the drive interface 114 to read data on the disc 101, to provide a data delivery service to the video content playback program 210. Furthermore, the operating system 210 performs operation such as interpreting a file system.

Note that the operating system 210 includes a multi-task processing function, whereby it can operate a plurality of software modules (apparently) concurrently in a time-division manner. Namely, the video content playback program 210 is formed of several software modules, and these software modules can operate concurrently with each other.

[Video Content Playback Program 210]

The video content playback program 210 includes a script control module 211, a player control module 212, a content data supply module 213, a decode control module 214, a buffer control module 215, a video decoder control module 216, an audio decoder control module 217, a subtitle decoder control module 218, a graphics processing module 219, a video output module 220, and an audio output module 221.

The video content playback program 210 is software playing a core role in playing back the disc 101. When the disc 101 is loaded (inserted) to the disc drive 102, the video content playback program 210 checks if that disc 101 conforms to a later-described format according to which content is recorded thereon. Furthermore, the video content playback program 210 reads a later-described script file from the disc 101 for execution, and also reads a file of metadata (database information) necessary for playing back the content recorded on that disc 101, to control the playback of the content on the basis of the metadata.

The software modules forming the video content playback program 210 of FIG. 2 will be described below. Note that in FIG. 2, arrow-headed solid lines represent content data, whereas arrow-headed dotted lines represent control data, in principle.

[Script Control Module 211]

The script control module 211 interprets and executes a script program (SCRIPT) described in the script file recorded on the disc 101. In the script program, one can describe operation such as, e.g., "Control the graphics processing module 219 to create and display a picture such as a menu", "Change display of a menu (e.g., move the cursor on the menu) according to a signal from a UI (User Interface) such as a remote control", and "Control the player control module 212".

[Player Control Module 212]

The player control module 212 refers to the metadata (database information) and the like recorded on the disc 101 to perform control regarding playback of the content. Namely, the player control module 212 analyzes, e.g., a PlayList( ) and a Clip( ), described later, recorded on the disc 101, and controls the content data supply module 213, decode control module 214, and buffer control module 215 in accordance with the analysis results. Furthermore, the player control module 212 performs control over later-described stream switching for switching streams for playback, and the like according to instructions from the script control module 211 and the input interface 115. Furthermore, the player control module 212 acquires a time from the decode control module 214 to perform processing for time display, later-described marks (Mark( )'s), and the like.

[Content Data Supply Module 213]

The content data supply module 213 requests the operating system 201 to read content data, metadata and the like from the disc 101 according to control by the player control module 212 or on the basis of amounts of data accumulated in the buffer control module 215.

Note that the metadata and the like read by the operating system 201 from the disc 101 as requested by the content data supply module 213 are supplied to necessary one(s) of the modules. Furthermore, the content data read by the operating system 201 from the disc 101 as requested by the content data supply module 213 is supplied to the buffer control module 215.

[Decode Control Module 214]

The decode control module 214 controls operation of the video decoder control module 216, audio decoder control module 217, and subtitle decoder control module 218 in accordance with control by the player control module 212. Furthermore, the decode control module 214 incorporates therein a time measuring section 214A for measuring time, and manages synchronization between output of video data outputted through control by the video decoder control module 216 and output of data (output data) to be outputted in synchronism with the video data, i.e., here, audio data to be outputted through control by the audio decoder control module 217.

[Buffer Control Module 215]

The buffer control module 215 incorporates therein a buffer 215A being a part of the storage area of the memory 113 of FIG. 1, and temporarily stores the content data read from the disc 101 by the content data supply module 213 having requested the operating system 201 to do so, in the buffer 215A.

Furthermore, the buffer control module 215 supplies the data stored in the buffer 215A to the video decoder control module 216, audio decoder control module 217, or subtitle decoder control module 218, as requested by the video decoder control module 216, audio decoder control module 217, or subtitle decoder control module 218, respectively.

Namely, the buffer control module 215 incorporates therein a video reading function section 233, an audio reading function section 234, and a subtitle reading function section 235, all being described later with reference to FIG. 3. And the buffer control module 215 processes a data request from the video decoder control module 216 with its video reading function section 233, thereby supplying data stored in the buffer 215A to the video decoder control module 216. Similarly, the buffer control module 215 processes a data request from the audio decoder control module 217 with its audio reading function section 234, thereby supplying data stored in the buffer 215A to the audio decoder control module 217, and also processes a data request from the subtitle decoder control module 218 with its subtitle reading function section 235, thereby supplying data stored in the buffer 215A to the subtitle decoder control module 218.

[Video Decoder Control Module 216]

The video decoder control module 216 controls the video reading function section 233 (FIG. 3) incorporated in the buffer control module 215 to read data (coded video data) obtained by encoding video data, from the buffer 215A in the buffer control module 215, on the basis of video access units, for supply to the video decoder 116 of FIG. 1. Furthermore, the video decoder control module 216 controls the video decoder 116 to decode video access unit-based data. Furthermore, the video decoder control module 216 supplies video data resulting from the decoding at the video decoder 116, to the graphics processing module 219.

Here, the video access unit means an amount of video data equivalent to, e.g., one picture (one frame or one field).

[Audio Decoder Control Module 217]

The audio decoder control module 217 controls the audio reading function section 234 (FIG. 3) incorporated in the buffer control module 215 to read data (coded audio data) obtained by encoding audio data, from the buffer 215A in the buffer control module 215, on the basis of audio access units, for supply to the audio decoder 117 of FIG. 1. Furthermore, the audio decoder control module 217 controls the audio decoder 117 to decode audio access unit-based data. Furthermore, the audio decoder control module 217 supplies audio data resulting from the decoding at the audio decoder 117, to the audio output module 221.

Here, the audio access unit means a predetermined amount of audio data (e.g., an amount of data outputted in synchronism with one picture). In the present embodiment, the audio access unit is supposed to be, e.g., a known fixed length.

[Subtitle Decoder Control Module 218]

The subtitle decoder control module 218 controls the subtitle reading function section 235 (FIG. 3) incorporated in the buffer control module 215 to read data (coded subtitle data) obtained by encoding subtitle data, from the buffer 215A in the buffer control module 215, on the basis of subtitle access units. Furthermore, the subtitle decoder control module 218 includes therein subtitle decoding software (not shown) to decode the data read from the buffer 215A. Furthermore, the subtitle decoder control module 218 supplies subtitle data (the picture data of the subtitle) resulting from the decoding, to the graphics processing module 219.

Here, the subtitle access unit means a predetermined amount of subtitle data (e.g., an amount of data outputted in synchronism with one picture). In the present embodiment, the size of a subtitle access unit is supposed to be described, e.g., at the start of each subtitle access unit.

[Graphics Processing Module 219]

The graphics processing module 219 performs enlargement or reduction of the subtitle data from the subtitle decoder control module 218 in accordance with control (instruction) by the player control module 212, for addition to (overlay on) video data from the video decoder control module 216. Furthermore, the graphics processing module 219 performs enlargement, reduction and other operation to fit the size (picture frame) of the video data to which the subtitle data has been added, to a display screen of the video output apparatus connected to the video output terminal 120 of FIG. 1, and outputs the resultant video data to the video output module 220.

Furthermore, the graphics processing module 219 generates menus, messages and the like in accordance with instructions (control) from the script control module 211 and the player control module 212, to overlay them on output video data.

Furthermore, the graphics processing module 219 converts the aspect ratio of the video data to be outputted to the video output module 220, on the basis of the aspect ratio of the video output apparatus connected to the video output terminal 120 of FIG. 1, and information for instructing the aspect ratio of video data recorded on the disc 101, and the like.

Namely, in a case where the aspect ratio of the video output apparatus is 16:9, for example, when the information for instructing the aspect ratio of video data represents 4:3, the graphics processing module 219 squeezes (reduces) the video data to be outputted to the video output module 220 lengthwise (in the horizontal direction), for output, leaving both left and right sides in black. Furthermore, in a case where the aspect ratio of the video output apparatus is 4:3, for example, when the information for instructing the aspect ratio of video data represents 16:9, the graphics processing module 219 squeezes (reduces) the video data to be outputted to the video output module 220 heightwise (in the vertical direction), for output, leaving both upper and lower sides in black.

Note that in a case where the aspect ratio of the video output apparatus equals that represented by the information for instructing the aspect ratio of video data as being 4:3 or 16:9, the graphics processing module 219 directly outputs the video data to be outputted to the video output module 220, without squeezing.

Besides, the graphics processing module 219 captures video data being currently processed, e.g., as requested by the player control module 212. Furthermore, the graphics processing module 219 stores the captured video data, or supplies the data to the player control module 212.

[Video Output Module 220]

The video output module 220 exclusively occupies part of the memory 113 of FIG. 1 for use as a FIFO (First In First Out) 220A (buffer), to temporarily store video data from the graphics processing module 219, or appropriately read the video data stored in the FIFO 220A, to output the data to the video output terminal 120 (FIG. 1).

[Audio Output Module 221]

The audio output module 221 exclusively occupies part of the memory 113 of FIG. 1 for use as a FIFO 221A (buffer), to temporarily store audio data from the audio decoder control module 217 (audio decoder 117), or appropriately read the audio data stored in the FIFO 221A, to output the data to the audio output terminal 121 (FIG. 1).

Furthermore, in a case where the audio data from the audio decoder control module 217 is in a "Dual" (bilingual) mode wherein the left channel carries audio data being "main audio" and the right channel carries audio data being "sub audio", the audio output module 221 outputs the audio data from the audio decoder control module 217, to the audio output terminal 121 according to a pre-designated audio output mode.

Namely, when, e.g., "main audio" is designated as the audio output mode, the audio output module 221 copies the left-channel audio data of the audio data from the audio decoder control module 217 as the right-channel audio data, and outputs the resultant audio data of the left-channel and the right-channel ("main audio" audio data) to the audio output terminal 121. Furthermore, when "sub audio" is designated as the audio output mode, the audio output module 221 copies the right-channel audio data of the audio data from the audio decoder control module 217 as the left-channel audio data, and outputs the resultant audio data of the left-channel and the right-channel ("sub audio" audio data) to the audio output terminal 121. Furthermore, when "main/sub audio" is designated as the audio output mode, the audio output module 221 directly outputs the audio data from the audio decoder control module 217 to the audio output terminal 121.

Note that in a case where the audio data from the audio decoder module 217 is in a "Stereo" mode, the audio output module 221 outputs the audio data from the audio decoder control module 217 directly to the audio output terminal 121, regardless of how the audio output mode is designated.

Here, the audio output mode designation can be made interactively by a user controlling the remote control or the like, e.g., on a screen or the like wherein a menu generated by the video content playback program 210 is displayed.

[Configuration of the Buffer Control Module 215]

Figure 3:
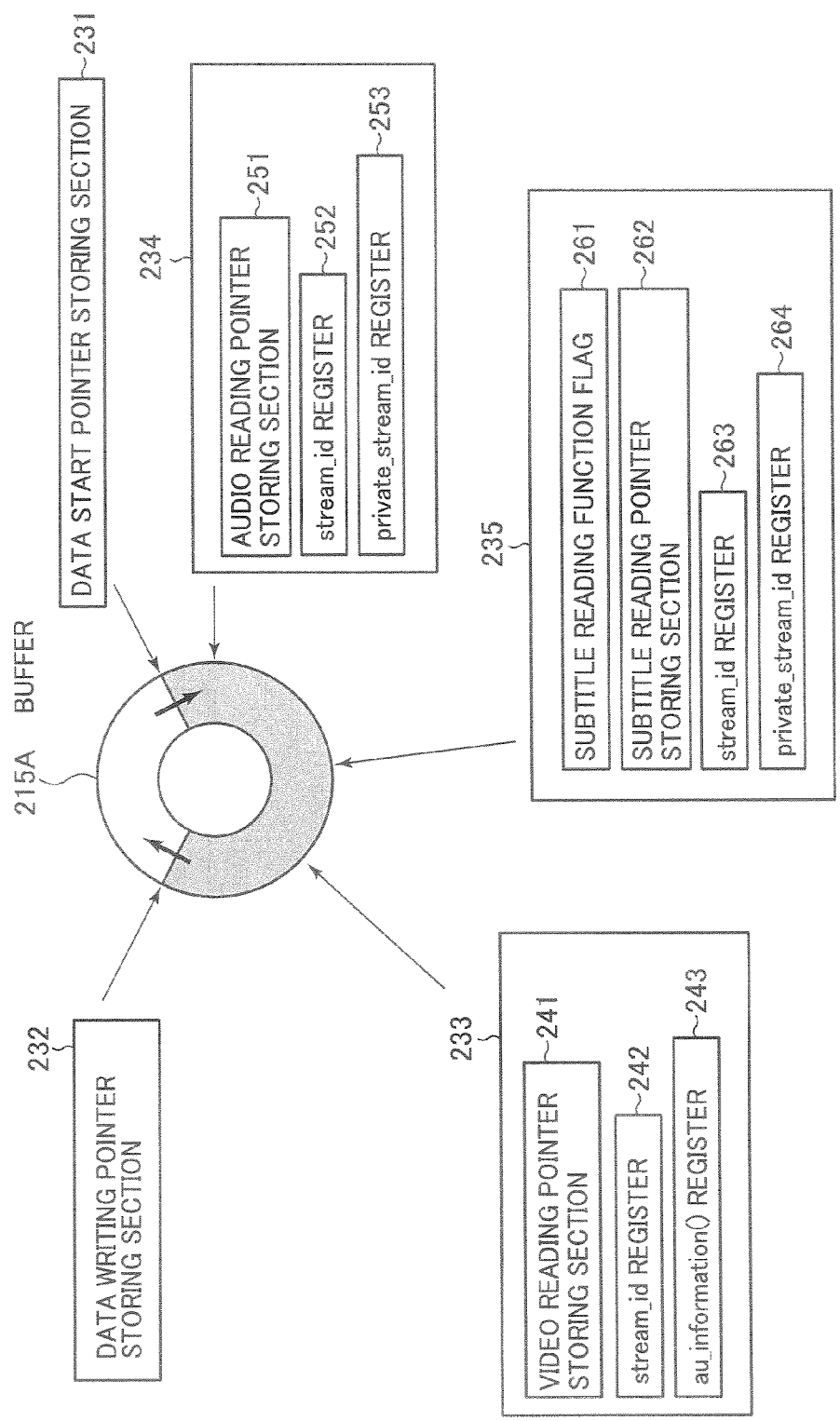
FIG. 3 is a block diagram showing a configuration example of a buffer control module 215.

Next, FIG. 3 shows a configuration example of the buffer control module 215 of FIG. 2.

The buffer control module 215 exclusively uses part of the memory 113 of FIG. 1 as the buffer 215A, to temporarily store data read from the disc 101, in the buffer 215A. Furthermore, the buffer control module 215 reads the data stored in the buffer 215A, and supplies the data to the video decoder control module 216, the audio decoder control module 217, or the subtitle decoder control module 218 of FIG. 2.

Namely, the buffer control module 215 has, besides the buffer 215A, a data start pointer storing section 231 and a data writing pointer storing section 232, both being part of the memory 113, and also has, as its internal modules, the video reading function section 233, the audio reading function section 234, and the subtitle reading function section 235.

The buffer 215A is, e.g., a ring buffer, and thus sequentially stores the data read from the disc 101. Once filled up with data, the buffer 215A stores new data in a manner overwriting the oldest data, for practically endless, loop-like storage.

The data start pointer storing section 231 stores a data start pointer for pointing at a position (address) where data which has not been read from the buffer 215A yet and which is thus the oldest, of the data stored in the buffer 215A, is stored.

The data writing pointer storing section 232 stores a data writing pointer for pointing at a position (address) in the buffer 215A to which new data read from the disc 101 is written.

Here, the position pointed at by the data writing pointer is updated clockwise as viewed in the drawing, whenever data read from the disc 101 is stored in the buffer 215A, whereas the position pointed to by the data start pointer is so updated clockwise as viewed in the drawing, as data is read from the buffer 215A. Therefore, of the data stored in the buffer 215A, "valid" data is, practically, the data stored clockwise from the position pointed at by the data start pointer to the position pointed at by the data writing pointer.

The video reading function section 233 reads a video stream (an elementary stream regarding video data) from the buffer 215A as requested by the video decoder control module 216 of FIG. 2, and supplies the video stream to the video decoder control module 216. Also the audio reading function section 234 reads an audio stream (an elementary stream regarding audio data) from the buffer 215A as requested by the audio decoder control module 217 of FIG. 2, and supplies the audio stream to the audio decoder control module 217. Also the subtitle reading function section 234 reads a subtitle stream (an elementary stream regarding subtitle data) from the buffer 215A as requested by the subtitle decoder control module 218 of FIG. 2, and supplies the subtitle stream to the subtitle decoder control module 218.

Namely, the disc 101 has an MPEG2-System Program Stream conforming to, e.g., the MPEG (Moving Picture Experts Group) 2 standard, recorded therein, and the buffer 215A stores the program stream read from the disc 101. In this program stream, one or more elementary streams such as a video stream, an audio stream, and a subtitle stream are time-division-multiplexed. The video reading function section 233 has a function for demultiplexing the program stream, and reads the video stream by separation from the program stream stored in the buffer 215A.

Similarly, the audio reading function section 234 also has a function for demultiplexing the program stream, and reads the audio stream by separation from the program stream stored in the buffer 215A. Also the subtitle reading function section 235 has a function for demultiplexing the program stream, and reads the subtitle stream by separation from the program stream stored in the buffer 215A.

Here, the video reading function section 233 has a video reading pointer storing section 241, a stream_id register 242, and an au_information( ) register 243, all being part of the memory 113 of FIG. 1.

The video reading pointer storing section 241 stores a video reading pointer for pointing at a position (address) in the buffer 215A, where a video stream is stored, and the video reading function section 233 reads data stored at the position in the buffer 215A, pointed at by the video reading pointer, as the video stream. The stream_id register 242 analyzes the program stream stored in the buffer 215A, and stores a later-described stream_id for identifying (specifying) a video stream to be read from the program stream. The au_information( ) register 243 stores a later-described au-information( ) being data necessary to read a video stream (used to read a video stream) from the buffer 215A.

The audio reading function section 234 has an audio reading pointer storing section 251, a stream_id register 252, and a private_stream_id register 253, all being part of the memory 113 of FIG. 1.

The audio reading pointer storing section 251 stores an audio reading pointer for pointing at a position (address) in the buffer 215A, where an audio stream is stored, and the audio reading function section 234 reads data stored at the position in the buffer 215A, pointed at by the audio reading pointer, as the audio stream. The stream_id register 252 and the private_stream_id register 253 analyze the program stream stored in the buffer 215A, and store later-described stream_id and private_stream_id for identifying an audio stream to be read from the program stream, respectively.

The subtitle reading function section 235 has a subtitle reading function flag storing section 261, a subtitle reading pointer storing section 262, a stream_id register 263, and a private_stream_id register 264, all being part of the memory 113 of FIG. 1.

The subtitle reading function flag storing section 261 stores a subtitle reading function flag. In a case where the subtitle reading function flag stored in the subtitle reading function flag storing section 261 is, e.g., 0, the subtitle reading function section 235 does not function, whereas where the subtitle reading function flag stored in the subtitle reading function flag storing section 261 is, e.g., 1, the subtitle reading function section 235 functions.

The subtitle reading pointer storing section 262 stores a subtitle reading pointer for pointing at a position (address) in the buffer 215A, where a subtitle stream is stored, and the subtitle reading function section 235 reads data stored at the position in the buffer 215A, pointed at by the subtitle reading pointer, as the subtitle stream. The stream_id register 263 and the private_stream_id register 264 analyze the program stream stored in the buffer 215A, and store later-described stream_id and private_stream_id for identifying a subtitle stream to be read from the program stream, respectively.

[Description of the Data Format of Data Stored on the Disc 101]

Next, the data format of data stored on the disc 101 will be described.

Figure 4:
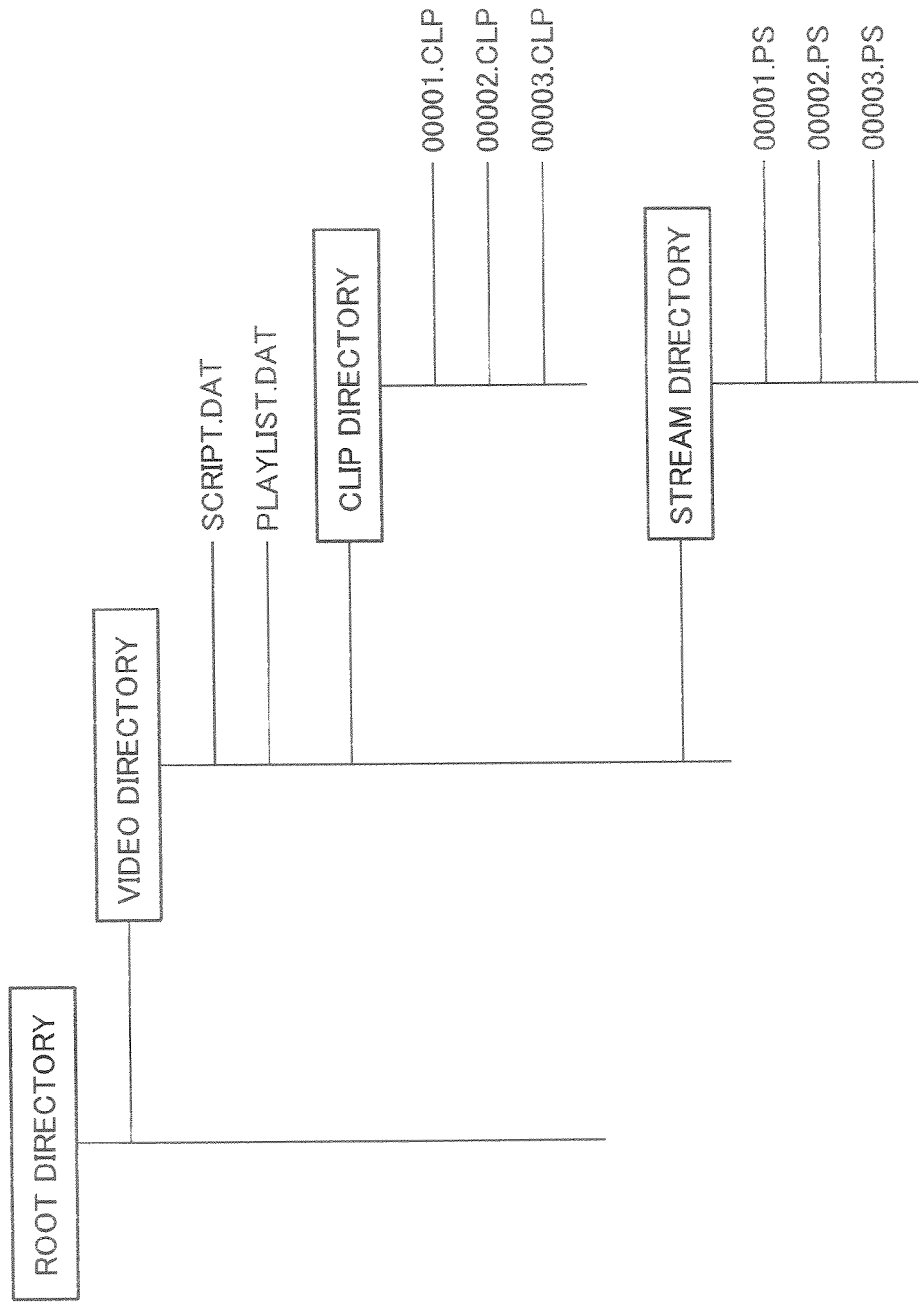
FIG. 4 is a diagram showing a configuration example of directories in a disc 101.

FIG. 4 schematically shows a directory structure of the disc 101.

The disc 101 uses a file system conforming to any of, e.g., ISO (International Organization for Standardization)-9660, UDF (Universal Disc Format: http://www.osta.org/specs/) and other specifications. Files of data stored on the disc 101 are managed hierarchically by a directory structure. Here, the file system is not limited to those conforming to the above-mentioned specifications.

In FIG. 4, a root directory representing the base of a file system includes a "VIDEO" directory, and the "VIDEO" directory includes two directories, a "CLIP" directory and a "STREAM" directory.

Besides the "CLIP" directory and the "STREAM" directory, the "VIDEO" directory further includes two data files, a "SCRIPT.DAT" file and a "PLAYLIST.DAT" file.

The "SCRIPT.DAT" file is a script file in which the script program is described. Namely, in the "SCRIPT.DAT" file, the script program is described which is used to make playback modes of the disc 101 interactive. The script program described in the "SCRIPT.DAT" file is interpreted and executed by the script control module 211 of FIG. 2.

The "PLAYLIST.DAT" file stores one or more Play List( )'s (a later-described PlayList( ) of FIG. 5) in which a playback procedure for content such as video data recorded on the disc 101 is described.

The "CLIP" directory includes one or more clip information files, and the "STREAM" directory includes one or more clip stream files. Namely, in FIG. 4, the "CLIP" directory includes three clip information files, "00001.CLP", "00002.CLP", and "00003.CLP", and the "STREAM" directory includes three clip stream files, "00001.PS", "00002.PS", and "00003.PS".

The clip stream files each include a program stream wherein one or more elementary streams are time-division-multiplexed. An elementary stream is obtained by compressing and encoding one or more pieces of data (a stream) such as video data, audio data, or subtitle data.

In each of the clip information files, (file) metadata on a clip stream, such as the property of the corresponding clip stream file is described.

Namely, a clip stream file corresponds to a clip information file one by one. In FIG. 4, the clip stream file is given a filename according to a naming regulation requiring use of a five-digit number followed by a period and "PS", whereas the clip information file is given a filename according to a naming regulation requiring use of the same five-digit number as that of the corresponding clip stream file, followed by a period and "CLP".

Therefore, whether the file is a clip stream file or a clip information file can be identified by checking its file extension (a portion on the right side of the period), and furthermore, whether or not a clip stream file corresponds to a clip information file can be identified by checking if portions other than file extensions (portions on the left side of the period) coincides with each other.

Details of these files recorded on the disc 101 will be described below.

[PLAYLIST.DAT]

FIG. 5 shows an internal structure (syntax) of the "PLAYLIST.DAT" file included in the "VIDEO" directory of FIG. 4.

Here, in FIG. 5, descriptions in the column "Syntax" represent a data structure, and descriptions in the column "No. of bits" each represent a bitlength of data in the corresponding row of the column "Syntax". Furthermore, "bslbf" (bit string left bit first) being one of descriptions in the column "Mnemonic" means that data in the corresponding row of the column "Syntax" is forwarded from its leftmost bit, whereas "uimsbf" (unsigned integer most significant bit first) means that data in the corresponding row of the column "Syntax" is an unsigned integer and is forwarded from the most significant bit on. The above applies similarly to any below-described drawing similar to FIG. 5.

The "PLAYLIST.DAT" file starts with a name_length (8 bits) and a name_string (255 bytes) sequentially arranged for describing information such as its name (filename).

Namely, the name_length represents the size of the following name_string in bytes. The name_string represents the name (filename) of the "PLAYLIST.DAT" file.

Note that as to the name_string, data equivalent to as many bytes as the name_length represents from the start is used as a valid name. Where a name_length is set to a value 10, data equivalent to 10 bytes from the start of the name_string is construed to be a valid name.

The name_string is followed by a number_of_PlayLists (16 bits). The number_of_PlayLists represents the number of PlayList( )'s that follow. The number_of_PlayLists is followed by as many PlayList( )'s as the number_of_PlayLists represents.

A PlayList( ) is a play list in which a playback procedure for clip stream files recorded on the disc 101 is described, and has the following internal structure.

Namely, the PlayList( ) starts with a PlayList_data_length (32 bits). The PlayList_data_length represents the size of the PlayList( ).

The PlayList_data_length is followed sequentially by a reserved_for_word_alignment (15 bits) and a capture_enable_flag_PlayList (1 bit). The 15-bit reserved_for_word_alignment is arranged in order to make a so-called word_alignment at the position of the following 1-bit capture_enable_flag_PlayList (in order to align every sixteenth bit position). The capture_enable_flag_PlayList is a 1-bit flag indicating whether or not secondary use of the video data (video data belonging to a PlayList( )) corresponding to a video stream to be played back by the PlayList( ), within the disc apparatus of FIG. 1 on which the disc 101 is to be played back, is permitted. The capture_enable_flag_PlayList set to, e.g., 1, out of 0 or 1, indicates that secondary use of video data belonging to a PlayList( ) is permitted, whereas the capture_enable_flag_PlayList set to, e.g., 0, out of 0 or 1 indicates that secondary use of video data belonging to a PlayList( ) is not permitted (is prohibited).

Note that in FIG. 5, the capture_enable_flag_PlayList is formed of 1 bit. However, the capture_enable_flag_PlayList can alternatively be formed of a plurality of bits, thereby secondary use of video data belonging to a PlayList( ) may be permitted practically step by step. Namely, the capture_enable_flag_PlayList can be formed of, e.g., 2 bits. And in a case where the capture_enable_flag_PlayList represents a value 00B (where B indicates the number preceding is a binary number), secondary use of video data can be prohibited, whereas in a case where the capture_enable_flag_PlayList represents a value 01B, only secondary use of video data in which the video data is used as reduced to a size of 64×64 pixels or less can be permitted. Furthermore, in a case where the capture_enable_flag_PlayList represents a value 10B, secondary use of video data can be permitted with no limitation imposed on the size.

Furthermore, secondary use of video data can also be limited not in terms of size as mentioned above, but in terms of intended use. Namely, in a case where the capture_enable_flag_PlayList represents the value 01B, secondary use of video data is permitted only when the video content playback program 210 (FIG. 2) is used, whereas in a case where the capture_enable_flag_PlayList represents the value 10B, secondary use of video data can be permitted using any applications including the video content playback program 210 within the disc apparatus of FIG. 1. Here, the applications other than the video content playback program 210 within the disc apparatus of FIG. 1 include, e.g., applications for performing processing of displaying wallpaper (background) and a screen saver.

Note that in a case where the capture_enable_flag_PlayList is formed of 2 bits as mentioned above, the reserved_for_word_alignment arranged precedence thereto should be formed of 14 bits for word alignment.

Furthermore, besides the fact that the capture_enable_flag_PlayList is used to permit secondary use of video data within the disc apparatus, it can also be configured to permit its secondary use outside the disc apparatus. Here, in a case where secondary use of video data outside the disc apparatus is to be permitted, the video data is, e.g., recorded on a recording medium releasable to the disc apparatus or a recording medium releasable to other apparatus connectable to the disc apparatus, or transmitted (distributed) to other apparatus via a network such as the Internet. In this case, it is possible to add, to the video data, information for limiting the number of recordings of the video data which can be made on the recording medium or the number of distributions of the video data.

The capture_enable_flag_PlayList is then followed sequentially by a PlayList_name_length (8 bits) and a PlayList_name_string (255 bytes). The PlayList_name_length represents the size of the following PlayList_name_string in bytes, and the PlayList_name_string represents the name of the PlayList( ).

The PlayList_name_string is followed by a number_of_PlayItems (16 bits). The number_of_PlayItems represents the number of PlayItem( )'s that follow.

The number_of_PlayItems is followed by a description of as many PlayItem( ) structures as the number_of_PlayItems represents.

Here, in a single PlayList( ), a playback procedure for content can be described in units of PlayItem( )'s.

Furthermore, for each of the PlayItem( )'s as many as the number_of_PlayItems in a PlayList( ), a unique ID (Identification) is given as long as the PlayList( ) is concerned. Namely, 0 is given as the ID to a first PlayItem( ) in the PlayList( ), and through numbers such as 1, 2, . . . are sequentially given as the IDs to the following PlayItem( )'s in order of their appearance.

The PlayItem( )'s as many as the number_of_PlayItems represents are then followed by a single PlayListMark( ). The PlayListMark( ) is a set of later-described Mark( )'s being marks on a time axis for playback performed according to the PlayList( ), and details thereof will be described later with reference to FIG. 7.

[Description of PlayItem( )]

Next, FIG. 6 shows the internal structure of a PlayItem( ) included in the PlayList( ) of FIG. 5.

The PlayItem( ) starts with a length (16 bits), and the length represents the size of the PlayItem( ) including itself.

The length is followed sequentially by a Clip_Information_file_name_length (16 bits) and a Clip_Information_file_name (variable length). The Clip_Information_file_name_length represents the size of the following Clip_Information_file_name in bytes. The Clip_Information_file_name represents the filename of the clip information file (a file with the extension CLP of FIG. 4) corresponding to a clip stream file (a file with the extension PS of FIG. 4) to be played back by the PlayItem( ). Note that on the basis of the above-mentioned regulations for naming a clip stream file and a clip information file, the filename of a clip information file to be played back by a PlayItem( ) can be recognized from the Clip_Information_file_name, thereby specifying the clip stream file.

The Clip_Information_file_name is followed sequentially by an IN_time (32 bits) and an OUT_time (32 bits).

The IN_time and the OUT_time are time information for specifying the playback start position and the playback end position of a clip stream file specified from the Clip_Information_file_name, respectively.

According to the IN_time, any position (including the start) along the clip stream file can be designated as the playback start position, and according to the OUT_time, any position (including the end) along the clip stream file can be designated as the playback end position.

Here, according to a PlayItem( ), content from the IN_time to the OUT_time of a clip stream file specified from the Clip_Information_file_name can be played back. The content played back by the PlayItem( ) is hereinafter called "clip" whenever appropriate.

[Description of PlayListMark( )]

Next, FIG. 7 shows the internal structure of the PlayListMark( ) included in the PlayList( ) of FIG. 5.

The PlayListMark( ) is a set of zero or more Mark( )'s being marks on the time axis for playback performed according to the PlayList( ) (FIG. 5) including that PlayListMark( ). A single Mark( ) at least has time information representing a single time (position) on the time axis for playback performed according to the PlayList( ), type information representing the type of the Mark( ), and argument information being the argument of an event when the type information represents a type for causing the event to occur.

Namely, the PlayListMark( ) starts with a length (32 bits). The length represents the size of the PlayListMark( ) including itself.

The length is followed by a number_of_PlayList_marks (16 bits), and the number_of_PlayList_marks represents the number of Mark( )'s that follow. The number_of_PlayList_marks is then followed by a description of the Mark( ) structures as many as the number_of_PlayList_marks.

The Mark( ) starts with a mark_type (8 bits). The mark_type is the above-mentioned type information, and represents the type of the Mark( ) including itself.

In the present embodiment, three types of Mark( )'s are available, which are, e.g., a Chapter, an Index, and an Event.

A Mark( ) whose type is 'Chapter' (hereinafter called "chapter mark" whenever appropriate) is a mark indicating the start position of a chapter being a start-locating unit for dividing a PlayList( ). Furthermore, a Mark( ) whose type is 'Index' (hereinafter called "index mark" whenever appropriate) is a mark indicating the start position of an index being a unit for segmenting a chapter. A Mark( ) whose type is 'Event' (hereinafter called "event mark" whenever appropriate) is a mark indicating the position for causing an event to occur. Notification about occurrence of an event by an event mark is given to the script control module 211 as described later.

Here, the relationship between mark_type values and the types of Mark( )'s is shown in FIG. 8. According to FIG. 8, 1 is set to the mark_type of a chapter mark. Furthermore, 2 is set to the mark_type of an index mark, and 3 is set to the mark_type of an event mark. Note that in FIG. 8, of 8-bit values representing a mark_type, 0, and 4 through 255 are reserved for future extension.

Returning to FIG. 7, the mark_type is followed by a mark_name_length (8 bits). Furthermore, the Mark( ) ends with a mark_name_string (24 bytes). The mark_name_length and the mark_name_string serve to describe the name of a Mark( ), with the mark_name_length representing the valid size of the mark_name_string and the mark_name_string representing the name of the Mark( ), respectively. Therefore, as many bytes as the mark_name_length represents from the start of the mark_name_string represent the valid name of the Mark( ).

The mark_name_length is followed sequentially by four elements, a ref_to_PlayItem_id (16 bits), a mark_time_stamp (32 bits), an entry_ES_stream_id (8 bits), and an entry_ES_private_stream_id (8 bits). These four elements make any Mark( ) defined in a PlayList( ) to correspond to a clip stream file.

In the ref_to_PlayItem_id, a serially-numbered ID is described which is given to the PlayItem( ) to which the Mark( ) belongs. The ref_to_PlayItem_id specifies the PlayItem( ) (FIG. 6) to which the Mark( ) belongs, and hence specifies the clip information file and the clip stream file, as described with reference to FIG. 6.

The mark_time_stamp represents a position (time) represented by the Mark( ) within the clip stream file specified by the ref_to_PlayItem_id.

Here, FIG. 9 shows the relationship among a PlayList( ), a PlayItem( ), a clip, and a program stream stored in a clip stream file.

In FIG. 9, the PlayList( ) is formed of three PlayItem( )'s, and the three PlayItem( )'s each are given serially-numbered IDs#0,#1, and#2. Here, a PlayItem( ) with an ID#i will hereinafter be described "PlayItem#i" whenever appropriate.

Furthermore, in FIG. 9, clips being content to be played back by the PlayItem#0, PlayItem#1, and PlayItem#2 are indicated as a clip A, a clip B, and a clip C, respectively.

The substance of a clip is a program stream from an IN_time to an OUT_time, of program streams stored in a clip stream file specified by the Clip_Information_file_name (and further specified by a clip information file) in the PlayItem( ) of FIG. 6. In FIG. 9, program streams being the substances of the clip A, clip B, and clip C are indicated as a program stream A, a program stream B, and a program stream C, respectively.

For example, in FIG. 9, in a Mark( ) being a mark at a position (time) t0 on the time axis for playback performed according to a PlayList( ), its ref_to_PlayItem_id and mark_time_stamp are described as follows.

Namely, the time t0 is a time for performing playback of the PlayItem#1, and thus, 1 being the ID of the PlayItem#1 is described in the ref_to_PlayItem_id. Furthermore, at the time t0, the program stream B being the substance of the clip B is played back, and thus the time corresponding to the time t0 in the clip stream file in which the program stream B is stored is described in the mark_time_stamp.

Returning to FIG. 7 again, in a case where the Mark( ) is associated with a specific elementary stream, the entry_ES_stream_id and the entry_ES_private_stream_id are used to specify the elementary stream. Namely, in the entry_ES_stream_id, a later-described stream_id of (a PES_packet( ) shown in FIGS. 16 to 18 described later and including therein) an elementary stream with which to associate the Mark( ) is described. Furthermore, in the entry_ES_private_stream_id, a later-described private_stream_id of (a private_header( ) in a private_stream1_PES_payload( ) shown in FIG. 21 described later and including therein) the elementary stream with which to associate the Mark( ) is described.

For example, in a clip in which a video stream#1 and a video stream#2 are multiplexed, when a user wishes to change chapter occurrence times for playback of the video stream#1 and for playback of the video stream#2, the stream_id and the private_stream_id of the video stream#1 are described in the entry_ES_stream_id and the entry_ES_private_stream_id of a Mark( ) for the chapter mark occurrence time during playback of the video stream #1, and further the stream_id and the private_stream_id of the video stream#2 are described in the entry_ES_stream_id and the entry_ES_private_stream_id of a Mark( ) for the chapter mark occurrence time during playback of the video stream#2.

Note that both the entry_ES_stream_id and the entry_ES_private_stream_id of a Mark( ) not associated with any specific elementary stream are set to, e.g., 0.

The entry_ES_private_stream_id is followed by a mark_data (32 bits). In a case where the Mark( ) is an event mark, the mark_data is argument information being the argument of an event which is caused to occur by the event mark. Note that, in a case where the Mark( ) is a chapter mark or an index mark, the mark_data can be used as a chapter number or an index number represented by the chapter mark or the index mark.

[Description of Clip( )]

Next, the internal structure of a clip information file with the extension CLP, which is included in the "CLIP" directory of FIG. 4 will be described.

In FIG. 4, the three clip information files "00001.CLP", "00002.CLP", and "00003.CLP" are included in the "CLIP" directory, and they store metadata indicating the properties of the clip stream files "0001.PS", "00002.PS", and "00003.PS" included in the "STREAM" directory, respectively.

FIG. 10 shows the internal structure of such a clip information file Clip( ).

The clip information file Clip( ) starts sequentially with a presentation_start_time and a presentation_end_time (each in 32 bits). The presentation_start_time and the presentation_end_time represent the start and the end times of (a program stream stored in) the clip stream file corresponding to the clip information file Clip( ), respectively. Note that the times in the clip stream file are described in multiples of 90 kHz used as an MPEG2-System time.

The presentation_end_time is followed sequentially by a reserved_for_word_alignment (7 bits) and a capture_enable_flag_Clip (1 bit). The 7-bit reserved_for_word_alignment is used for word alignment, whereas the capture_enable_flag_Clip is a flag indicating whether secondary use of video data is permitted or not, similarly to the above-described capture_enable_flag_PlayList of FIG. 5.

However, the capture_enable_flag_PlayList of FIG. 5 indicates whether secondary use is permitted of the video data (video data belonging to a PlayList( )) corresponding to a video stream to be played back by the PlayList( ), whereas the capture_enable_flag_Clip of FIG. 10 indicates whether secondary use is permitted as to the video data corresponding to a video stream (a video elementary stream) stored in the clip stream file corresponding to a clip information file Clip( ). Therefore, the capture_enable_flag_PlayList of FIG. 5 and the capture_enable_flag_Clip of FIG. 10 are different in terms of a unit (range) of video data whose secondary use is to be permitted.

Note that the capture_enable_flag_Clip of FIG. 10 can be formed of a plurality of bits, instead of a single bit, as explained above with reference to the capture_enable_flag_PlayList of FIG. 5.

The capture_enable_flag_Clip is followed by a number_of_streams (8 bits). In the number_of_streams, the number of StreamInfo( ) structures following itself are described. Therefore, the number_of_streams is followed by a description of as many StreamInfo( ) structures as the number_of_Streams represents.

A StreamInfo( ) starts with a length (16 bits) The length represents the size of the StreamInfo( ) including itself. The length is then followed by a stream_id (8 bits) and a private_stream_id (8 bits), and by the stream_id and the private stream_id, an elementary stream associated with the StreamInfo( ) is specified (identified).

Here, FIG. 11 shows the relationship between the stream_id's and private_stream_id's for identifying elementary streams, and the elementary streams.

The stream_id's are the same as the ones specified in the MPEG2-System standard, and their values are pre-defined for each attribute (type) of an elementary stream (data) in the MPEG2-System standard. Therefore, an elementary stream whose attribute is defined in the MPEG2-System standard can be specified only by the stream_id.

In the present embodiment, elementary streams whose attributes are not defined in the MPEG2-System standard can also be handled. The private_stream_id is information for identifying an elementary stream whose attribute is not defined in the MPEG2-System standard.

FIG. 11 shows the relationship of four elementary streams having different attributes, with respect to their stream_id and private_stream_id. Namely, the four elementary streams are a video elementary stream encoded by a coding (decoding) scheme defined by the MPEG, an audio elementary stream (hereinafter called "ATRAC audio stream" whenever appropriate) encoded by the ATRAC (Adaptive TRansform Acoustic Coding) scheme, an audio elementary stream (hereinafter called "LPCM audio stream" whenever appropriate) encoded by the LPCM (Linear Pulse Code Modulation) scheme, and a subtitle elementary stream (hereinafter called "subtitle stream" whenever appropriate).

In the MPEG2-System standard, it is defined that a video elementary stream encoded by the coding scheme defined by the MPEG be multiplexed using any of values ranging from 0xE0 to 0xEF (0x indicates that the number following thereto is a base 16 number) as the stream_id for identifying the elementary stream. Therefore, as to the video elementary stream encoded by the coding scheme defined by the MPEG, sixteen video elementary streams, each of which can be identified by a stream_id having any of values ranging from 0xE0 to 0xEF, can be multiplexed into a program stream.

Note that a video elementary stream encoded by the coding scheme defined by the MPEG can be identified by a stream_id having any of values ranging from 0xE0 to 0xEF, and thus that a private_stream_id is not needed (can be neglected).

Meanwhile, the MPEG2-System does not define stream_id's for an ATRAC audio stream, an LPCM audio stream, and a subtitle stream.

Thus, in the present embodiment, as to an elementary stream for which a stream_id is not defined by the MPEG2-System, 0xBD being a value representing an attribute "private_stream_1" in the MPEG2-System is adopted, and thus, it is designed to identify (specify) elementary streams using private_stream_id's such as shown in FIG. 11, in addition to stream_id's.

Namely, for identification of an ATRAC audio stream, a private_stream_id having any of values ranging from 0x00 to 0x0F is used. Therefore, sixteen ATRAC audio streams can be multiplexed into a program stream. Furthermore, for identification of an LPCM audio stream, a private_stream_id having any of values ranging from 0x10 to 0x1F is used. Therefore, sixteen LPCM audio streams can be multiplexed into a program stream. Furthermore, for identification of a subtitle stream, a private_stream_id having any of values ranging from 0x80 to 0x9F is used. Therefore, thirty-two subtitle streams can be multiplexed into a program stream.

Note that the stream_id and the private_stream_id will be further described later.

Returning to FIG. 10, the private_stream_id is followed sequentially by a StaticInfo( ) and a reserved_for_word_alignment (8 bits). In the StaticInfo( ), information is described which remains unchanged during playback of an elementary stream specified by a stream_id and a private_stream_id (described in a StreamInfo( ) including that StaticInfo( )). Details of the StaticInfo( ) will be described later with reference to FIG. 12.

The reserved_for_word_alignment is used for word alignment.

The reserved_for_word_alignment is then followed by a number_of_DynamicInfo (8 bits). The number_of_DynamicInfo represents the number of pts_change_point (32 bits)/DynamicInfo( ) sets that follow.

Therefore, the number_of_DynamicInfo is followed by a description of as many pts_change_point/DynamicInfo( ) structure sets as the number_of_DynamicInfo represents.

The pts_change_point represents a time at which DynamicInfo( ) information paired therewith becomes valid. Here, a pts_change_point representing a time defining the start of an elementary stream equals a presentation_start_time with which a clip information file Clip( ) starts which corresponds to a clip stream file storing the elementary stream.

In the DynamicInfo( ), practically "dynamic" information is described which changes during playback of the elementary stream specified by the stream_id and the private_stream_id. The information described in the DynamicInfo( ) becomes valid when a playback time represented by the pts_change_point paired therewith arrives. Note that details of the DynamicInfo( ) will be described with reference to FIG. 13.

As many pts_change_point/DynamicInfo( ) structure sets as the number_of_DynamicInfo represents are followed by an EP_map( ). Note that the EP_map( ) will be described later with reference to FIG. 14.

[Explanation of StaticInfo( )]

Next, referring to FIG. 12, details of the StaticInfo( ) of FIG. 10 will be explained.

FIG. 12 shows a syntax of a StaticInfo( ).

The content of a StaticInfo( ) differs depending on the attribute (type) of the corresponding elementary stream. The attribute of the elementary stream corresponding to the StaticInfo( ) is judged by the stream_id and the private_stream_id included in the StreamInfo( ) of FIG. 10 including that StaticInfo( ).

In a case where the elementary stream corresponding to the StaticInfo( ) is a video stream (stream==VIDEO), the StaticInfo( ) is formed of a picture_size (4 bits), a frame_rate (4 bits), and a cc_flag (1 bit), and reserved_for_word_alignment's for word alignment.

The picture_size represents the size of (a picture displayed by) the video data corresponding to the video stream. The frame_rate represents a frame frequency of the video data corresponding to the video stream. The cc_flag indicates whether or not Closed Caption data is included in the video stream. Namely, for example, in a case where Closed Caption data is included in the video stream, the cc_flag is set to 1, whereas in a case where Closed Caption data is not included in the video stream, the cc_flag is set to 0.

In a case where the elementary stream corresponding to the StaticInfo( ) is an audio stream (stream==AUDIO), the StaticInfo( ) is formed of an audio_language_code (16 bits), a channel_configuration (8 bits), a lfe_existence (1 bit), and a sampling_frequency (4 bits), and further a reserved_for_word_alignment for making a word alignment.

In the audio_language_code, a code is described which represents a language used for audio data included in the audio stream. The channel_configuration represents the attribute of the audio data included in the audio stream, such as monophonic (mono)/stereophonic (stereo)/multi-channel. The lfe_existence indicates whether or not a low-frequency emphasis channel is included in the audio stream or not, and if so, 1 is set, and if not, 0 is set. The sampling_frequency is information indicating the sampling frequency of the audio data included in the audio stream.

In a case where the elementary stream corresponding to the StaticInfo( ) is a subtitle stream (stream==SUBTITLE), the StaticInfo( ) is formed of a subtitle_language_code (16 bits) and a configurable_flag (1 bit), and further a reserved_for_word_alignment for word alignment.

In the subtitle_language_code, a code is described which represents a language used for subtitle data included in the subtitle stream. The configurable_flag is information indicating whether or not it is permitted to change the display mode from a default display mode for the subtitle data included in the subtitle stream, and if it is permitted, 1 is described, and if not, 0 is described. Note that the subtitle data display mode includes the display size, position, color, pattern (e.g., blinking), direction (e.g., vertical, horizontal), and the like of the subtitle data.

[Explanation of DynamicInfo( )]

Referring next to FIG. 13, details of the DynamicInfo( ) of FIG. 10 will be explained.

FIG. 13 shows a syntax of a DynamicInfo( ).

The DynamicInfo( ) starts with a reserved_for_word_alignment (8 bits) for word alignment, which is then followed by element(s) which differs depending on the attribute of the elementary stream corresponding to the DynamicInfo( ). The attribute of the elementary stream corresponding to the DynamicInfo( ) is judged by the stream_id and the private_stream_id included in the StreamInfo( ) of FIG. 10 including that DynamicInfo( ), similarly to the case of the StaticInfo( ) explained above with reference to FIG. 12.

In the DynamicInfo( ), dynamic information is described which changes during playback of the elementary stream, as explained above with reference to FIG. 10. This dynamic information is not particularly limited, but in the embodiment of FIG. 13, the data corresponding to the elementary stream corresponding to the DynamicInfo( ), i.e., an output attribute of data outputted through processing of the elementary stream (an output attribute of data obtained from the elementary stream) is described in the DynamicInfo( ).

Specifically, in a case where the elementary stream corresponding to the DynamicInfo( ) is a video stream (stream==VIDEO), the DynamicInfo( ) is formed of a display_aspect_ratio (4 bits) and a reserved_for_word_alignment for word alignment. In the display_aspect_ratio, e.g., the aspect ratio of video data is described as the output attribute (display mode) of the video data corresponding to the video stream. Namely, in the display_aspect_ratio, information indicating that, e.g., the aspect ratio is either 16:9 or 4:3 is described. Note that the DynamicInfo( ) for a video stream may include, besides the aspect ratio, e.g., the size (X pixels×Y pixels) of a picture to be displayed by the video data.

In a case where the elementary stream corresponding to the DynamicInfo( ) is an audio stream (stream==AUDIO), the DynamicInfo( ) is formed of a channel_assignment (4 bits) and a reserved_for_word_alignment for word alignment. In the channel_assignment, in a case where the audio stream includes 2-channel audio data, an output attribute (output mode) of the 2-channel audio stream is described. Namely, in the channel_assignment, information indicating that the audio data is assigned to either the "Stereo" or the "Dual" (bilingual) channel mode is described.

In a case where the elementary stream corresponding to the DynamicInfo( ) is a subtitle stream (stream==SUBTITLE), the DynamicInfo( ) is formed of a reserved_for_word_alignment for word alignment. Namely, in the embodiment of FIG. 13, no output attribute is defined as the dynamic information for the subtitle stream.

[Explanation of EP_map( )]

Referring next to FIG. 14, details of the EP_map( ) of FIG. 10 will be explained.

FIG. 14 shows a syntax of an EP_map( ).

In the EP_map( ), there is described information about a decode startable point (entry point) at which decoding of an elementary stream can be started, for each of elementary streams multiplexed into the program stream stored in the clip stream file corresponding to the clip information file Clip( ) of FIG. 10 including that EP_map( ).

Here, as to a stream having a fixed rate, its decode startable point can be obtained by calculation, whereas as to a stream of a variable rate or a stream whose size differs for each video access unit, such as a video stream encoded in conformity with the MPEG standard, its decode startable point cannot be obtained by calculation, and thus, it involves a stream analysis to find the decode startable point. Quick recognition of a decode startable point is important in performing random access, and the EP_map( ) enables such quick recognition of a decode startable point.

Note that in the MPEG2-Video, the start of an intra-picture including a Sequence_header( ) (sequence header) is a decode startable point.

The EP_map( ) starts with a reserved_for_word_alignment (8 bits) for word alignment, which is then followed by a number_of_stream_id_entries (8 bits) The number_of_stream_id_entries represents the number of elementary streams for each of which the decode startable point information is described in the EP_map( ).

The number_of_stream_id_entries is followed by information for identifying an elementary stream and information about the decode startable point of the elementary stream, which are arranged repeatedly as many times as the number_of_stream_id_entries represents.

Namely, the number_of_stream_id_entries is immediately followed by a stream_id (8 bits) and a private_stream_id (8 bits) as information for identifying the elementary stream, which are further followed by a number_of_EP_entries (32 bits). The number_of_EP_entries represents the number of decode startable points for the elementary stream identified (specified) by the immediately preceding stream_id and private_stream_id.

The number_of_EP_entries is followed by a PTS_EP_start (32 bits)/RPN_EP_start (32 bits) set as the decode startable point information for the elementary stream specified by the immediately preceding stream_id and private_stream_id, which is arranged repeatedly as many times as the number_of_EP_entries represents.

The PTS_EP_start being one piece of the decode startable point information represents a decode startable point time (playback time) within a clip stream file having stored therein a program stream into which the elementary stream specified by the stream_id and the private_stream_id as mentioned above is multiplexed.

In the RPN_EP start being the other piece of the decode startable point information, a value is described which is obtained by counting, in units of pack( )'s for a program stream, a decode startable point position within the clip stream file having stored therein the program stream into which the elementary stream specified by the stream_id and the private_stream_id as mentioned above is multiplexed. Note that in the present embodiment, the size of a pack( ) is supposed to be fixed to 2,048 bytes. Furthermore, in the present embodiment, a single sector of the disc 101 (FIG. 1) is supposed to equal 2,048 bytes.

Here, as to a video stream, its decode startable point (entry point) is preceded immediately by a later-described private_stream_2 packet (a PES_packet( ) having an attribute "private_stream_2"). In the private_stream_2 packet, information is stored which is used to decode the video stream arranged between that private_stream_2 packet to a next private_stream_2 packet Thus, as to a video stream, in the RPN_EP_start as its decode startable point information, the start position of the private_stream_2 packet immediately ahead of the actual decode startable point is described, instead of the actual decode startable point itself.

Furthermore, in the EP_map( ), the PTS_EP_start/RPN_EP_start sets as the decode startable point information are pre-sorted in ascending order for each of elementary streams specified by their stream_id's and private_stream_id's. As a result, it is made possible to perform binary search on the PTS_EP_start/RPN_EP_start sets as the decode startable point information.

Note that a random access method for a stream having a variable rate and a stream having a different video access unit size is disclosed, e.g., in Japanese Patent Application Publication (KOKAI) No. 2000-341640 (Japanese Patent Application No. Hei 11-317738).

[Description of Clip Stream file]

Next, the internal structure of a clip stream file included in the "STREAM" directory in FIG. 4 and having the extension PS (the files "00001.PS", "00002.PS", and "00003.PS" in FIG. 4) will be described.

A clip stream file is formed on the basis of an MPEG2_Program_Stream( ) defined in the MPEG-2 System (ISO/IEC 13818-1).

Namely, FIG. 15 shows a Table 2-31, a Table 2-32, and a Table 2-33 described in the MPEG-2 System (ISO/IEC 13818-1:2000).

A program stream stored in a clip stream file is an MPEG2_Program_Stream( ) defined in the Table 2-31 of the MPEG-2 System standard, and is formed of one or more pack( )'s and a single MPEG_program_end_code. Note that the MPEG2_Program_Stream( ) is described in Japanese Patent No. 2785220 and the like.

A single pack( ) is formed of a single Pack_header( ) and an arbitrary number of PES_packet( )'s as defined in the Table 2-32 of the MPEG-2 System standard. Details of the Pack_header are defined in the Table 2-33 of the MPEG-2 System standard.

Here, while the size of a pack( ) is defined to be variable in the MPEG-2 System standard, here, it is supposed to be fixed to 2,048 bytes, as described above in FIG. 14. Furthermore, here, the number of PES_packet( )'s in a single pack( ) is supposed to be 1, 2 or 3. In a case where a Pack( ) starts with a later-described private_stream_2 packet, there always exists the PES_packet( ) of the corresponding video stream, immediately therebehind (within the same Pack( )). Furthermore, in addition thereto, a padding_packet (padding packet) can be arranged as a third PES_packet( ). Note that the private_stream_2 packet would be arranged at the start of a Pack( ) without exception.

In a case where a Pack( ) does not start with a private_stream_2 packet, the Pack( ) starts with a PES_packet( ) storing content data such as video, audio, or subtitle data. In addition thereto, a padding_packet (padding packet) can be arranged as a second PES_packet( ).

FIGS. 16 to 18 show a PES_packet( ) defined in a Table 2-17 of the MPEG-2 System standard.

The PES_packet( ) can be roughly divided into a portion including a packet_start_code_prefix, a stream_id and a PES_packet_length (FIG. 16), a header portion whose structure is changed by a stream_id and the like (including a stuffing_byte) (FIGS. 16 to 18), and a PES_packet_data_byte (FIG. 18). Note that in a case where the PES_packet( ) is a padding_packet (stream_id=padding_stream), a padding_byte(0xFF) (FIG. 18) is arranged repeatedly as many times as necessary, in place of the PES_packet_data_byte.

Here, in the header portion of the PES_packet( ), information indicating a display timing called a PTS (Presentation Time Stamp) and information indicating a decode timing called a DTS (Decoding Time Stamp) can be arranged, as shown in FIGS. 16 and 17. In the present embodiment, it is supposed that the PTS is added to all access units (decoding units defined by the MPEG2-System and forming an elementary stream), and that the DTS is added only in a case where so determined by the MPEG2-System.

An elementary stream to be multiplexed into a program stream is stored in the PES_packet_data_byte (FIG. 18) of a PES_packet( ). And in the stream_id of the PES_packet( ), the value corresponding to the attribute of the elementary stream is described in order to identify the elementary stream stored in the PES_packet_data_byte.

The relationship between values described in the stream_id's of PES_packet( )'s and the attributes (types) of elementary streams is defined in a Table 2-18 of the MPEG-2 System standard. Here, the Table 2-18 of the MPEG-2 System standard is shown in FIG. 19.

In the present embodiment, of the stream_id's defined in the MPEG-2 System standard shown in FIG. 19, e.g., values shown in FIG. 20 are adopted.

Namely, in the present embodiment, five patterns, i.e., 10111101B, 10111110B, 10111111B, 110xxxxxB, and 1110xxxxB are adopted as stream_id values. Note that "x" represents any of 0 and 1.

And the stream_id of a PES_packet( ) of an elementary stream whose attribute is called the private_stream_1 is set to 10111101B in accordance with FIG. 20. Furthermore, the stream_id of a PES_packet( ) of a padding_packet is set to 10111110B in accordance with FIG. 20. Furthermore, the stream_id of a PES_packet( ) of an elementary stream whose attribute is called the private_stream_2 is set to 10111111B in accordance with FIG. 20.

Furthermore, the stream_id of a PES_packet( ) of an audio stream (an audio elementary stream) defined by the MPEG is set to 110xxxxxB. Note that the lower 5 bits xxxxx in the 110xxxxxB is an audio stream number for distinguishing audio streams, and into a program stream (MPEG2_Program_Stream( )), 32 ($=2^5$) audio streams (audio streams defined by the MPEG) can be multiplexed, 32 being a number of audio streams distinguishable from each other using this audio stream number.

Furthermore, the stream_id of a PES_packet( ) of a video stream (a video elementary stream) defined by the MPEG is set to 1110xxxxB. Note that the lower 4 bits xxxx in the 1110xxxxB is a video stream number for distinguishing video streams, and into a program stream, 16 (=$2^4$) video streams (video streams defined by the MPEG) can be multiplexed, 16 being a number of video streams distinguishable from each other using this video stream number.

By the way, a PES_packet( ) whose stream_id is 1110xxxxB is used to store a video stream defined by the MPEG, whereas a PES_packet( ) whose stream_id is 110xxxxxB is used to store an audio stream defined by the MPEG. Meanwhile, the stream_id of a PES_packet( ) used to store an elementary stream coded by an encoding scheme (e.g., the ATRAC scheme) not defined by the MPEG is not specified in the MPEG, and therefore, any elementary stream coded by an encoding scheme not defined by the MPEG cannot be stored in a PES_packet( ) by simply designating a stream_id, as in a video stream and an audio stream defined by the MPEG.

To overcome this situation, in the present embodiment, the PES_packet_data_byte of a private_stream_1 PES_packet( ) is extended to store an elementary stream of an encoding scheme not defined by the MPEG.

Here, the extended PES_packet_data_byte of a private_stream_1 PES_packet( ) is described as a private_stream1_PES_payload( ).

[Explanation of the private_stream1_PES_payload( )]

FIG. 21 shows a syntax of a private_stream1_PES_payload( ).

The private_stream1_PES_payload( ) is formed of a private_header( ) and a private_payload( ). The private_payload( ) stores an elementary stream coded by an encoding scheme not defined by the MPEG, such as an ATRAC audio stream, an LPCM audio stream, or a subtitle stream.

The private_header( ) starts with a private_stream_id (8 bits) The private_stream_id is identification information for identifying an elementary stream stored in the private_payload( ), and is set to, e.g., any of the following values according to its attribute (type).

Namely, FIG. 22 shows the relationship between private_stream_id values and the attributes of elementary streams stored in private_payload( )'s.

In FIG. 22, three patterns, i.e., 000xxxxB, 0001xxxxB, and 100xxxxxB are adopted as private_stream_id values. Note that "x" represents any of 0 and 1, similarly to the case of FIG. 20.

According to FIG. 22, the private_stream_id of a private_stream1_PES_payload( ) in which an ATRAC audio stream is stored in its private_payload( ) is set to 0000xxxxB. Note that the lower 4 bits xxxx of the 0000xxxxB is an audio stream number for distinguishing ATRAC audio streams, and into a program stream (MPEG2_Program_Stream( )), 16 (=$2^4$) ATRAC audio streams can be multiplexed, 16 being a number of ATRAC audio streams distinguishable from each other using this audio stream number.

Furthermore, according to FIG. 22, the private_stream_id of a private_stream1_PES_payload( ) in which an LPCM audio stream is stored in its private_payload( ) is set to 0001xxxxB. Note that the lower 4 bits xxxx of the 0001xxxxB is an audio stream number for distinguishing LPCM audio streams, and into a program stream, 16 (=$2^4$) LPCM audio streams can be multiplexed, 16 being a number of LPCM audio streams distinguishable from each other using this audio stream number.

In addition, according to FIG. 22, the private_stream_id of a private_stream1_PES_payload( ) in which a subtitle stream is stored in its private_payload( ) is set to 100xxxxxB. Note that the lower 5 bits xxxxx of the 100xxxxxB is a subtitle stream number for distinguishing subtitle streams, and into a program stream, 32 (=$2^5$) subtitle streams can be multiplexed, 32 being a number of subtitle streams distinguishable from each other using this subtitle stream number.

Here, FIG. 11 mentioned above is a re-arrangement of the relationship between FIG. 20 and FIG. 22.

Returning to FIG. 21, in the private_stream1_PES_payload( ), the private_stream_id is followed by an element whose content differs depending on the attribute of the elementary stream stored in the private_payload( ). The attribute of the elementary stream stored in the private_payload( ) is judged by the private_stream_id at the head of the private_header( ).

In a case where the elementary stream stored in the private_payload( ) is an ATRAC audio stream (private_stream_id==ATRAC), a reserved_for_future_use (8 bits) for future extension is arranged, which is then followed by an AU_locator (16 bits) The AU_locator represents the start position of an audio access unit of the ATRAC audio stream (ATRAC audio access unit) (audio frame) stored in the private_payload( ), using the position immediately behind that AU_locator as a reference. In a case where there is no audio access unit in the private_payload( ), e.g., 0xFFFF is described in the AU_locator.

In a case where the elementary stream stored in the private_payload( ) is an LPCM audio stream (private_stream_id==LPCM), an fs_flag (1 bit), a reserved_for_future_use (3 bits), a ch_flag (4 bits), and an AU_locator (16 bits) are sequentially arranged.

The fs_flag indicates a sampling frequency of the LPCM audio stream stored in the private_payload( ). Namely, e.g., in a case where the sampling frequency is 48 kHz, the fs_flag is set to 0, whereas in a case where the sampling frequency is 44.1 kHz, the fs_flag is set to 1.

The ch_flag indicates the number of channels in the LPCM audio stream stored in the private_payload( ). For example, in a case where the LPCM audio stream is in the monophonic mode, the ch_flag is set to 1, whereas in a case where the LPCM audio stream is in the stereophonic mode, the ch_flag is set to 2.

The AU_locator indicates the start position of an audio access unit of the LPCM audio stream (LPCM audio access unit) (audio frame) to be stored in the private_payload( ), using the position immediately behind that AU_locator as a reference. In a case where there is no audio access unit in the private_payload( ), e.g., 0xFFFF is described in the AU_locator.

In a case where the elementary stream stored in the private_payload( ) is a subtitle stream (private_stream_id==SUBTITLE), a reserved_for_future_use (8 bits) for future extension is arranged, which is then followed by an AU_locator (16 bits). The AU_locator indicates the start position of a subtitle access unit of the subtitle stream stored in the private_payload( ), using the position immediately behind that AU_locator as a reference. In a case where there is no subtitle access unit in the private_payload( ), e.g., 0xFFFF is described in the AU_locator.

[Explanation of private_stream2_PES_payload( )]

Next, FIG. 23 shows a syntax of a private_stream2_PES_payload( ).

The private_stream2_PES_payload( ) is an extension of the PES_packet_data_byte (FIG. 18) of a private_stream_2 PES_packet( ), i.e., the extended PES_packet data_byte of a private_stream_2 PES_packet( ), and includes therein a description of information used to decode a video stream.

In the present embodiment, the private_stream_2 PES_packet( ) is arranged immediately ahead of the decode startable point of a video stream. Therefore, in the present embodiment, once the private_stream_2 PES_packet( ) has been found in a program stream, decoding can be started at a video stream immediately therebehind.

Here, the RPN_EP_start of the EP_map( ) of FIG. 14 indicates, as to a video stream, the start position of a private_stream_2 PES_packet( ).

The private_stream2_PES_payload( ) starts with a reserved_for_future_use (8 bits) for future extension, which is followed sequentially by a video_stream_id (8 bits), a 1stRef_picture (16 bits), a 2ndRef_picture (16 bits), a 3rdRef_picture (16 bits), a 4thRef_picture (16 bits), an au_information( ), and a VBI( ).

In the video-stream_id, (the same value as) the stream_id of a video stream arranged immediately behind a private_stream_2 PES_packet( ) is described. This video_stream_id specifies (a PES_packet( ) storing therein) the video stream to be decoded using information stored in (the private_stream2_PES_payload( ) of) the private_stream_2 PES_packet( ).

The 1stRef_picture, 2ndRef_picture, 3rdRef_picture, and 4thRef_picture represent the last pack( ) positions including first, second, third, and fourth reference pictures from the private_stream_2 PES_packet( ) to a next private_stream_2 PES_packet( ) as to the video stream specified by the video-stream_id, in terms of relative values, respectively. Note that details of the 1stRef_picture, 2ndRef_picture, 3rdRef_picture, and 4thRef_picture are disclosed as bytes_to_first_P_pic bytes_to_second_P_pic in, e.g., Japanese Patent Application Publication (KOKAI) No. Hei 09-46712 (Japanese Patent Application No. Hei 07-211420).

In the au_information( ), information about a video access unit in the video stream from the private_stream_2 PES_packet( ) to a next private_stream_2 PES_packet( ) is described. Details of the au_information( ) will be described later with reference to FIG. 24.

The VBI( ) is used to describe Closed Caption information.

A private_stream_2 PES_packet( ) having the private_stream2_PES_payload( ) such as described above is arranged every decode startable point of each video stream.

Next, FIG. 24 shows a syntax of the au_information( ) of FIG. 23.

The au_information( ) starts with a length (16 bits). The length represents the size of the au_information( ) including itself. The length is followed sequentially by a reserved_for_word_alignment (8 bits) and a number_of_access_unit (8 bits). The reserved_for_word_alignment is used for word alignment.

The number_of_access_unit represents the number of video access units (pictures) included between a private_stream_2 PES_packet( ) including itself and a next private_stream_2 PES_packet( ).

Namely, the number_of_access_unit indicates the number of access units (pictures) included in a video stream indicated by the video_stream_id from this au_information( ) to the position immediately ahead of a next au_information( ) (if this au_information( ) is the last au_information( ) of a clip stream file, to the end of the clip stream file), in a private_stream_2 PES_packet( ) in which private_steram2_PES_payload( ) of FIG. 23 has the same video_stream_id.

The number_of_access_unit is followed by as many "for" loop contents as the number_of_access_unit represents.

Namely, information is arranged which is about one or more video access units included between the private_stream_2 PES_packet( ) including that number_of access unit and a next private_stream_2 PES_packet( ).

The information (information about video access units) arranged in a "for" loop is as follows.

Namely, within the "for" loop, a pic_struct_copy (4 bits), an au_ref_flag (1 bit), an AU_length (21 bits), and reserved's are arranged.

In the pic_struct_copy, there is described a copy of a pic_struct( ) which, in a case where the video stream conforms to the MPEG4-AVC (ISO/IEC 14496-10), is defined in the ISO/IEC 14496-10, D.2.2 and set to the corresponding video access unit. Note that the pic_struct( ) is information for displaying, e.g., a picture as a frame, or displaying the top field of a picture and thereafter its bottom field.

The au_ref_flag indicates whether or not the corresponding access unit is a reference picture referred to for decoding (the picture of) another access unit, and if so, 1 is set, and if not, 0 is set.

The AU_length represents the size of the corresponding access unit in bytes.

[Specific Example of Data Recorded on the Disc 101]

Next, FIGS. 25 to 28 show specific examples of the data recorded on the disc 101 of FIG. 1 and having a format such as described above.

Here, in FIGS. 25 to 28, the MPEG2-Video is adopted for video streams, whereas ATRAC audio streams are adopted for audio streams. However, video streams and audio streams are not limited to these types. Namely, for video streams, e.g., MPEG4-Visual, MPEG4-AVC, and the like is adoptable. Furthermore, for audio streams, e.g., MPEG1/2/4-Audio and LPCM audio streams is adoptable.

Note that subtitle streams are not subjected to continuous decoding/displaying (outputting) processing at equal intervals, unlike video streams and audio streams. Namely, subtitle streams are only occasionally supplied to the subtitle decoder module 218 from the buffer control module 215 of FIG. 2, for decoding.

FIGS. 25 to 28 show specific examples of the "PLAYLIST.DAT" file and the clip information files "00001.CLP", "00002.CLP", and "00003.CLP" and the like, in a case where, as shown in FIG. 4, the disc 101 includes a recording of the three clip information files "00001.CLP", "00002.CLP", and "00003.CLP" in the "CLIP" directory and the three clip stream files "00001.PS", "00002.PS", and "00003.PS" respectively corresponding to the three clip information files "00001.CLP", "00002.CLP", and "00003.CLP", in the "STREAM" directory. However, in FIGS. 25 to 28, part of the data, such as the "PLAYLIST.DAT" file, is omitted.

Namely, FIG. 25 shows a specific example of the "PLAYLIST.DAT" file described above with reference to FIG. 5.

In FIG. 25, the number_of_PlayLists is set to 2, and therefore, the number of PlayList( )'s included in the "PLAYLIST.DAT" file is 2. In FIG. 25, a first one of the two PlayList( )'s is described as a PlayList#0, and a second one as a PlayList#1.

As to the PlayList#0 being the first PlayList( ), the capture_enable_flag_PlayList is set to 1, and therefore, secondary use of video data to be played back according to the PlayList#0 is permitted. Furthermore, as to the PlayList#0, the number_of_PlayItems is set to 2, and therefore, the number of PlayItem( )'s included in the PlayList#0 is 2. In FIG. 25, specific examples of a PlayItem#0 and a PlayItem#1 being the two PlayItem( )'s are described in the lower part of the column "PlayList#0".

In the PlayItem#0 being the first PlayItem( ) included in the PlayList#0, the Clip_Information_file_name is set to "00001.CLP", the In-time to 180,090, and the OUT_time to 27,180,090, respectively, all being described above with reference to FIG. 6. Therefore, a clip to be played back by the PlayItem#0 of the PlayList#0 is specified as being from the time 180,090 to 27,180,090, of the clip stream file "00001.PS" corresponding to the clip information file "00001.CLP".

In the PlayItem#1 being the second PlayItem( ) included in the PlayList#0, the Clip_Information file_name is set to "00002.CLP", the In-time to 90,000, and the OUT_time to 27,090,000, respectively. Therefore, a clip to be played back by the PlayItem#1 of the PlayList#0 is specified as being from the time 90,000 to 27,090,000, of the clip stream file "100002.PS" corresponding to the clip information file "00002.CLP".

Meanwhile, in FIG. 25, as to the PlayList#1 being the second PlayList( ), the capture_enable_flag_PlayList is set to 0, and therefore, secondary use of video data to be played back according to the PlayList#1 is not permitted (is prohibited). Furthermore, as to the PlayList#1, the number_of_PlayItems is set to 1, and therefore, the number of Play Item( )'s included in the PlayList#1 is 1. In FIG. 25, a specific example of the PlayItem#0 being the only one PlayItem( ) is described in the lower part of the column "PlayList#1".

In the PlayItem#0 being the only one PlayItem( ) included in the PlayList#1, the Clip_Information file_name is set to "00003.CLP", the In-time to 90,000, and the OUT_time to 81,090,000, respectively, all being described above with reference to FIG. 6. Therefore, a clip to be played back by the PlayItem#0 of the PlayList#1 is specified as being from the time 90,000 to 81,090,000, of the clip stream file "00003.PS" corresponding to the clip information file "00003.CLP".

Next, FIG. 26 shows specific examples of the clip information file Clip( ) described above with reference to FIG. 10. Namely, FIG. 26 shows specific examples of the clip information files "00001.CLP", "00002.CLP", and "00003.CLP" of FIG. 4.

In the clip information file "00001.CLP", the presentation_start_time is set to 90,000, and the presentation_end_time to 27,990,000, respectively.

Therefore, according to a program stream stored in the clip stream file "00001.PS" corresponding to the clip information file "00001.CLP", content equivalent to 310 seconds (27,990,000–90,000)/90 kHz) is usable.

Furthermore, in the clip information file "00001.CLP", the capture_enable_flag_Clip is set to 1, and therefore, secondary use is permitted as to (the video data corresponding to) a video stream multiplexed into the program stream stored in the clip stream file "00001.PS" corresponding to the clip information file "00001.CLP".

Furthermore, in FIG. 26, the number_of_streams of the clip information file "00001.CLP" is set to 4, and therefore, four elementary streams are multiplexed into the program stream stored in the corresponding clip stream file "00001.PS".

Let it now be supposed that the four elementary streams are stream#0, stream#1, stream#2, and stream#3. Then, in FIG. 26, specific examples of the StreamInfo( )'s (FIG. 10) of the four elementary streams stream#0, stream#1, stream#2, and stream#3 are described in the lower part of the column "00001.CLP".

As to the first elementary stream stream#0 of the clip stream file "00001.PS", the stream_id is set to 0xE0, and therefore, this elementary stream stream#0 is a video stream, as described above with reference to FIGS. 20 and 22 (or FIG. 11). Note that in the present embodiment, a video stream is irrelevant to a private_stream_id as mentioned above, but that it is set to 0x00 in FIG. 26.

Furthermore, as to the video stream stream#0 being the first elementary stream of the clip stream file "00001.PS", the picture_size is set to '720×480', the frame_rate to '29.97 Hz', the cc_flag to 'Yes', of the StaticInfo( ) (FIG. 12) included in its StreamInfo( ), respectively. Therefore, this video stream stream#0 is video data having 720×480 pixels and a frame cycle of 29.97 Hz, and further includes Closed Caption data.

Furthermore, as to the video stream stream#0 being the first elementary stream of the clip stream file "00001.PS", the number_of_DynamicInfo of the StreamInfo( ) (FIG. 10) is set to 0, and thus, there is no pts_change_point/DynamicInfo( ) set.

Next, as to the second elementary stream stream#1 of the clip stream file "00001.PS", the stream_id is set to 0xBD, and the private_stream_id to 0x00. Therefore, this elementary stream stream#1 is an ATRAC audio stream, as described above with reference to FIGS. 20 and 22.

Furthermore, as to the ATRAC audio stream stream#1 being the second elementary stream of the clip stream file "00001.PS", the audio_language_code is set to 'Japanese', the channel_configuration to 'STEREO', the lfe_existence to 'NO', and the sampling_frequency to '48 kHz', of the StaticInfo( ) (FIG. 12) included in its StreamInfo( ), respectively. Therefore, this ATRAC audio stream stream#1 is audio data in Japanese and stereophonic. Furthermore, the low-frequency emphasis channel is not included, and the sampling frequency is 48 kHz.

Furthermore, as to the ATRAC audio stream stream#1 being the second elementary stream of the clip stream file "00001.PS", the number_of_DynamicInfo of the StreamInfo( ) (FIG. 10) is set to 0, and thus, there is no pts_change_point/DynamicInfo( ) set.

Next, as to the third elementary stream stream#2 of the clip stream file "00001.PS", the stream_id is set to 0xBD, and the private_stream_id to 0x80. Therefore, this elementary stream stream#2 is a subtitle stream, as described above with reference to FIGS. 20 and 22.

Furthermore, as to the subtitle stream stream#2 being the third elementary stream of the clip stream file "00001.PS", the subtitle_language_code is set to 'Japanese' and the configurable_flag to 0, of the StaticInfo( ) (FIG. 12) included in its StreamInfo( ), respectively. Therefore, this subtitle stream stream#2 is subtitle data in Japanese, and furthermore, it is not permitted (is prohibited) to change its display mode.

Furthermore, as to the subtitle stream stream#2 being the third elementary stream of the clip stream file "00001.PS", the number_of_DynamicInfo of the StreamInfo( ) (FIG. 10) is set to 0, and thus there is no pts_change_point/DynamicInfo( ) set.

Next, as to the fourth elementary stream stream#3 of the clip stream file "00001.PS", the stream_id is set to 0xBD, and the private_stream_id to 0x81. Therefore, this elementary stream stream#3 is a subtitle stream, as described above with reference to FIGS. 20 and 22.

Note that in order to distinguish the subtitle stream stream#2 being the third elementary stream from the subtitle stream stream#3 being the fourth elementary stream, of the clip stream file "00001.PS", their private_stream_id's are set to 0x80 and 0x81, respectively.

In addition, as to the subtitle stream stream#3 being the fourth elementary stream of the clip stream file "00001.PS", the subtitle_language_code is set to 'Japanese' and the configurable_flag to 1, of the StaticInfo( ) (FIG. 12) included in its StreamInfo( ), respectively. Therefore, this subtitle stream stream#3 is subtitle data in Japanese, and furthermore, it is permitted to change its display mode.

Furthermore, as to the subtitle stream stream#3 being the fourth elementary stream of the clip stream file "00001.PS", the number_of_DynamicInfo of the StreamInfo( ) (FIG. 10) is set to 0, and thus there is no pts_change_point/DynamicInfo( ) set.

Next, in FIG. 26, as to the clip information file "00002.CLP", the presentation_start_time is set to 90,000, and the presentation_end_time to 27,090,000, respectively. Therefore, according to a program stream stored in the clip stream file "00002.PS" corresponding to the clip information file "00002.CLP", content equivalent to 300 seconds (27,090, 000−90,000)/90 kHz) is usable.

Furthermore, in the clip information file "00002.CLP", the capture_enable_flag_Clip is set to 0, and therefore, secondary use is not permitted (is prohibited) as to (the video data corresponding to) a video stream multiplexed into the program stream stored in the clip stream file "00002.PS" corresponding to the clip information file "00002.CLP".

Furthermore, in FIG. 26, the number_of_streams of the clip information file "00002.CLP" is set to 4, and therefore, four elementary streams are multiplexed into the program stream stored in the corresponding clip stream file "00002.PS", similarly to the above-mentioned case of the clip stream file "00001.PS".

Let it now be supposed that the four elementary streams are stream#0, stream#1, stream#2, and stream#3. Then, in FIG. 26, specific examples of the StreamInfo( )'s (FIG. 10) of the four elementary streams stream#0, stream#1, stream#2, and stream#3 are described in the lower part of the column "00002.CLP".

Here, in FIG. 26, the StreamInfo( )'s of the first to fourth elementary streams stream#0 to stream#3 of the clip stream file "00002.PS" have the same contents as those of the first to fourth elementary streams stream#0 to stream#3 of the clip stream file "00001.PS", and thus, their description will be omitted.

Note that as described above, the StreamInfo( )'s of the first to fourth elementary streams stream#0 to stream#3 of the clip stream file "00002.PS" have the same contents as those of the first to fourth elementary streams stream#0 to stream#3, and thus, the first elementary stream stream#0 of the clip stream file "00002.PS" is a video stream and the second elementary stream stream#1 is an ATRAC audio stream. In addition, the third elementary stream stream#2 and the fourth elementary stream stream#3 are both subtitle streams.

Next, in FIG. 26, in the clip information file "00003.CLP", the presentation_start_time is set to 90,000, and the presentation_end_time to 81,090,000, respectively. Therefore, according to a program stream stored in the clip stream file "00003.PS" corresponding to the clip information file "00003.CLP", content equivalent to 900 seconds (81,090, 000−90,000)/90 kHz) is usable.

In addition, in the clip information file "00003.CLP", the capture_enable_flag_Clip is set to 1, and therefore, secondary use is permitted as to a video stream multiplexed into the program stream stored in the clip stream file "00003.PS" corresponding to the clip information file "00003.CLP".

Furthermore, in FIG. 26, the number_of_streams of the clip information file "00003.CLP" is set to 3, and therefore, three elementary streams are multiplexed into the program stream stored in the corresponding clip stream file "00003.PS".

Let it now be supposed that the three elementary streams are stream#0, stream#1, and stream#2. Then, in FIG. 26, specific examples of the StreamInfo( )'s (FIG. 10) of the three elementary streams stream#0, stream#1, and stream#2 are described in the lower part of the column "00003.CLP".

As to the first elementary stream stream#0 of the clip stream file "00003.PS", the stream_id is set to 0xE0, and therefore, this elementary stream stream#0 is a video stream, as explained above with reference to FIGS. 20 and 22 (or FIG. 11). Note that the private_stream_id is set to 0x00, similarly to the first elementary stream stream#0 of the clip stream file "00001.PS".

In addition, as to the video stream stream#0 being the first elementary stream of the clip stream file "00003.PS", the picture_size is set to '720×480', the frame_rate to '29.97 Hz', the cc_flag to 'No', of the StaticInfo( ) (FIG. 12) included in its StreamInfo( ), respectively. Therefore, this video stream stream#0 is video data having 720×480 pixels and a frame cycle of 29.97 Hz, and further does not include Closed Caption data.

Furthermore, as to the video stream stream#0 being the first elementary stream of the clip stream file "00003.PS", the number_of_DynamicInfo of the StreamInfo( ) (FIG. 10) is set to 2, and thus, two pts_change_point/DynamicInfo( ) sets are described in its StreamInfo( ).

Next, as to the second elementary stream stream#1 of the clip stream file "00003.PS", the stream_id is set to 0xE1, and therefore, this elementary stream stream#1 is a video stream, as explained above with reference to FIGS. 20 and 22 (or FIG. 11). Note that in order to distinguish the video stream stream#0 being the first elementary stream from the video stream stream#1 being the second elementary stream, of the clip stream file "00003.PS", their stream_id's are set to 0xE0 and 0xE1, respectively. Furthermore, the private_stream_id is set to 0x00, similarly to the first elementary stream stream#0 of the clip stream file "00001.PS".

In addition, as to the video stream stream#1 being the second elementary stream of the clip stream file "00003.PS", the picture_size, the frame_rate, and the cc_flag of the StaticInfo( ) (FIG. 12) included in its StreamInfo( ) are set to the same values as the video stream stream#0 being the first elementary stream. Therefore, this video stream stream#1 being the second elementary stream of the clip stream file "00003.PS" is video data having 720×480 pixels and a frame cycle of 29.97 Hz, and further does not include closed caption data.

Furthermore, as to the video stream stream#1 being the second elementary stream of the clip stream file "00003.PS", the number_of_DynamicInfo of the StreamInfo( ) (FIG. 10) is set to 0, and thus, there is no pts_change_point/DynamicInfo( ) set.

Next, as to the third elementary stream stream#2 of the clip stream file "00003.PS", the stream_id is set to 0xBD, and the private_stream_id to 0x00. Therefore, this elementary stream stream#2 is an ATRAC audio stream, as explained above with reference to FIGS. 20 and 22.

In addition, as to the ATRAC audio stream stream#2 being the third elementary stream of the clip stream file "00003.PS", the audio_language_code, the channel_configuration, the lfe_existence, and the sampling_frequency of the StaticInfo( ) (FIG. 12) included in its StreamInfo( ) are set to the same values as the ATRAC audio stream stream#1 being the second elementary stream of the clip stream file "00001.PS". Therefore, the ATRAC audio stream stream#2 being the third elementary stream of the clip stream file "00003.PS" is audio data in Japanese and stereophonic. In addition, the low-frequency emphasis channel is not included, and the sampling frequency is 48 kHz.

Furthermore, as to the ATRAC audio stream stream#2 being the third elementary stream of the clip stream file "00003.PS", the number_of_DynamicInfo of the StreamInfo( ) (FIG. 10) is set to 3, and therefore, three pts_change_point/DynamicInfo( ) sets are described in its StreamInfo( ).

Next, FIG. 27 shows a specific example of the EP_map( ) of the clip information file Clip( ) explained above with reference to FIG. 10. Namely, FIG. 27 shows a specific example of the EP_map( ) of FIG. 14, in the clip information file "00001.CLP" of FIG. 4.

In FIG. 27, the number_of_stream_id_entries of the EP_map is set to 1, and therefore, decode startable point information about a single elementary stream is described in this EP_map( ).

In addition, in the EP_map( ) of FIG. 27, the stream_id is set to 0xE0. Therefore, as explained above with reference to FIGS. 20 and 22, in the EP_map( ), decode startable point information (the PTS_EP_start and the RPN_EP_start (FIG. 14)) is described which is about a video stream specified by the stream_id being set to 0xE0. Namely, FIG. 27 shows the EP_map( ) of the clip information file "00001.CLP", and in the clip stream file "00001.PS" corresponding to the clip information file "00001.CLP", the elementary stream whose stream_id is 0xE0 is the first video stream stream#0 of the clip stream file "00001.PS" as explained above with reference to FIG. 26, and thus, the information described in the EP_map( ) of FIG. 27 includes PTS_EP_start's and RPN_EP_start's as decode startable points of that video stream stream#0.

In FIG. 27, five PTS_EP_start's and RPN_EP_start's from the start are described, as decode startable points of the first video stream stream#0 of the clip stream file "00001.PS", and a description of the sixth and thereafter PTS_EP_start's and RPN_EP_start's is omitted.

Note that in the EP_map( ) of FIG. 27, the private_stream_id is set to 0x00, but that in a case where the stream_id represents a video stream, the private_stream_id is irrelevant to (is neglected for) the video stream, as described above.

Next, FIG. 28 shows specific examples of the PlayListMark( )'s in the PlayList#0 and the PlayList#1 (PlayList( ) of FIG. 5) described above with reference to FIG. 25.

The upper side of FIG. 28 shows the PlayListMark( ) (FIG. 7) of the PlayList#0.

In the upper side of FIG. 28, the number_of_PlayList_marks in the PlayListMark( ) of the PlayList#0 is set to 7, and therefore, the number of Mark( )'s included in (the PlayListMark( ) of) the PlayList #0 is 7.

In addition, in the upper side of FIG. 28, a Mark#0 being the first Mark( ) of the seven Mark( )'s included in the PlayList#0 has its mark_type (FIG. 7) set to "Chapter", and thus, it is a chapter mark. Furthermore, the Mark#0 has its ref_to_PlayItem_id (FIG. 7) set to 0, and thus, it belongs to the PlayItem#0 of the two PlayItem's#0 and#1 of FIG. 25 included in the PlayList #0. In addition, the Mark#0 has its mark_time_stamp set to 180,090, and thus, it is a mark on a time (playback time) 180,090 of a clip stream file to be played back by the PlayItem#0 included in the PlayList#0. Furthermore, the Mark#0 has both its entry_ES_stream_id and entry_ES_private_stream_id set to 0, and thus, it is associated with none of elementary streams. Furthermore, the Mark#0 has its mark_data set to 1, and thus, it represents a chapter numbered 1.

Note here that the clip stream file to be played back by the PlayItem#0 included in the PlayList#0 is the clip stream file "00001.PS" specified by "00001.CLP" described in the Clip_Information_file_name of that PlayItem#0, explained above with reference to FIG. 25. Therefore, the above-mentioned time 180,090 represented by the mark_time_stamp of the Mark#0 is the time of the clip stream file "00001.PS".

In the upper side of FIG. 28, a Mark#4 being the fifth Mark( ) of the seven Mark( )'s included in the PlayList#0 is also a chapter mark similar to the first Mark#0.

Namely, the Mark#4 being the fifth Mark( ) has its mark_type (FIG. 7) set to 'Chapter', and thus, it is a chapter mark. Furthermore, the Mark#4 has its ref_to_PlayItem_id (FIG. 7) set to 1, and thus, it belongs to the PlayItem#1 of the two PlayItem's#0 and#1 of FIG. 25 included in the PlayList#0. Furthermore, the Mark#4 has its mark_time_stamp set to 90,000, and thus, it is a mark on a time (playback time) 90,000 of a clip stream file to be played back by the PlayItem#1 included in the PlayList#0. Furthermore, the Mark#4 has both its entry_ES_stream_id and entry_ES_private_stream_id set to 0, and thus, it is associated with none of elementary streams. Furthermore, the Mark#4 has its mark_data set to 2, and thus, it represents a chapter numbered 2.

Note that the clip stream file to be played back by the PlayItem#1 included in the PlayList#0 is the clip stream file "00002.PS" specified by "00002.CLP" described in the Clip_Information_file_name of that PlayItem#1, explained above with reference to FIG. 25. Therefore, the above-mentioned time 90,000 represented by the mark_time_stamp of the Mark#4 is the time of the clip stream file "00002.PS".

Furthermore, in the upper side of FIG. 28, a Mark#1 being the second Mark( ) of the seven Mark( )'s included in the PlayList#0 has its mark_type (FIG. 7) set to 'Index', and thus, it is an index mark. Furthermore, the Mark#1 has its ref_to_PlayItem_id (FIG. 7) set to 0, and thus, it belongs to the PlayItem#0 of the two PlayItem's#0 and #1 of FIG. 25 included in the PlayList#0. In addition, the Mark#1 has its mark_time_stamp set to 5,580,090, and thus, it is a mark on a time 5,580,090 of a clip stream file to be played back by the PlayItem#0 included in the PlayList#0. Furthermore, the Mark#1 has both its entry_ES_stream_id and entry_ES_private_stream_id set to 0, and thus, it is associated with none of elementary streams. Furthermore, the Mark#1 has its mark_data set to 1, and thus, it represents an index numbered 1.

Note here that the clip stream file to be played back by the PlayItem#0 included in the PlayList#0 is the clip stream file "00001.PS", as described above. Therefore, the above-mentioned time 5,580,090 represented by the mark_time_stamp of the Mark#1 is the time of the clip stream file "00001.PS".

In the upper side of FIG. 28, a Mark#2, a Mark#5, and a Mark#6 being the third, sixth, and seventh Mark( )'s of the seven Mark( )'s included in the PlayList#0 are also index marks similar to the second mark#1.

Furthermore, in the upper side of FIG. 28, a Mark#3 being the fourth Mark( ) of the seven Mark( )'s included in the PlayList#0 has its mark_type (FIG. 7) set to 'Event', and thus, it is an event mark. Furthermore, the Mark#3 has its ref_to_PlayItem_id (FIG. 7) set to 0, and thus, it belongs to the PlayItem#0 of the two PlayItem's#0 and #1 of FIG. 25 included in the PlayList#0. In addition, the Mark#3 has its mark_time_stamp set to 16,380,090, and thus, it is a mark on a time 16,380,090 of a clip stream file to be played back by the PlayItem#0 included in the PlayList#0. Furthermore, the Mark#3 has both its entry_ES_stream_id and entry_ES_private_stream_id set to 0, and thus, it is associated with none of elementary streams. In addition, the Mark#3 has its mark_data set to 0, and thus, it causes an event involving 0 as the argument to occur.

Note here that the clip stream file to be played back by the PlayItem#0 included in the PlayList#0 is the clip stream file "00001.PS", as mentioned above. Therefore, the above-mentioned time 16,380,090 represented by the mark_time_stamp of the Mark#3 is the time of the clip stream file "00001.PS".

Here, in the upper side of FIG. 28, the time from the start of the PlayItem( ) to which each of the Mark( )'s belongs is shown to the right of the outside of the PlayListMark( ) list of the PlayList#0. Furthermore, to the right thereof, the time from the start of the PlayList#0 is shown.

Next, the lower side of FIG. 28 shows the PlayListMark( ) (FIG. 7) of the PlayList#1.

In the lower side of FIG. 28, the number_of_PlayList_marks in the PlayListMark( ) of the PlayList#1 is set to 3, and therefore, the number of Mark( )'s included in (the PlayListMark( ) of) the PlayList #1 is three.

In addition, in the lower side of FIG. 28, a Mark#0 being the first Mark( ) of the three Mark( )'s included in the PlayList#1 has its mark_type (FIG. 7) set to 'Chapter', and thus, it is a chapter mark. Furthermore, the Mark#0 has its ref_to_PlayItem_id (FIG. 7) set to 0, and thus, it belongs to the only one PlayItem#0 of FIG. 25 included in the PlayList#1. In addition, the Mark#0 has its mark_time_stamp set to 90,000, and thus, it is a mark on a time 90,000 of the clip stream file to be played back by the PlayItem#0 included in the PlayList#1. Furthermore, the Mark#0 has both its entry_ES_stream_id and entry_ES_private_stream_id set to 0, and thus, it is associated with none of elementary streams. Furthermore, the Mark#0 has its mark_data set to 0, and thus, it represents a chapter numbered 0.

Note here that the clip stream file to be played back by the PlayItem#0 included in the PlayList#1 is the clip stream file "00003.PS" specified by "00003.CLP" described in the Clip_Information_file_name of that PlayItem#0, explained above with reference to FIG. 25. Therefore, the above-mentioned time 90,000 represented by the mark_time_stamp of the Mark#0 is the time of the clip stream file "00003.PS".

In the lower side of FIG. 28, a Mark#1 being the second Mark( ) of the three Mark( )'s included in the PlayList#1 has its mark_type (FIG. 7) set to 'Event', and thus, it is an event mark. Furthermore, the Mark#1 has its ref_to_PlayItem_id (FIG. 7) set to 0, and thus, it belongs to the only one PlayItem#0 of FIG. 25 included in the PlayList#1. In addition, the Mark#1 has its mark_time_stamp set to 27,090,000, and thus, it is a mark on a time 27,090,000 of a clip stream file to be played back by the PlayItem#0 included in the PlayList#1. Furthermore, the Mark#1 has its entry_ES_stream_id set to 0xE0, and its entry_ES_private_stream_id to 0, and thus, it is associated with an elementary stream whose stream_id is specified (identified) by 0xE0, i.e., a video stream as explained above with reference to FIGS. 20 and 22. Furthermore, the Mark#1 has its mark_data set to 1, and thus, it causes an event involving 1 as the argument to occur.

Note here that the clip stream file to be played back by the PlayItem#0 included in the PlayList#1 is the clip stream file "00003.PS" as mentioned above. Therefore, the above-mentioned time 27,090,000 represented by the mark_time_stamp of the Mark#1 is the time of the clip stream file "00003.PS".

Furthermore, the video stream with which the Mark#1 is associated and of which stream_id is 0xE0 is a video stream whose stream_id is 0xE0, described in "00003.CLP" described in the Clip_Information_file_name of the PlayItem#0 included in the PlayList#1 of FIG. 25 to which that Mark#1 belongs, i.e., the first elementary stream (video stream) stream#0 of the three elementary streams stream#0 to stream#2 multiplexed into the clip stream file "00003.PS" specified by the clip information file "00003.CLP" of FIG. 26.

Next, in the lower side of FIG. 28, a Mark#2 being the third Mark( ) of the three Mark( )'s included in the PlayList #1 has its mark_type (FIG. 7) set to 'Event', and thus, it is an event mark. Furthermore, the Mark#2 has its ref_to_PlayItem_id (FIG. 7) set to 0, and thus, it belongs to the only one PlayItem#0 of FIG. 25 included in the PlayList #1. In addition, the Mark#2 has its mark_time_stamp set to 27,540,000, and thus, it is a mark on a time 27,540,000 of a clip stream file to be played back by the Playtem#0 included in the PlayList #1. Furthermore, the Mark#2 has its entry_ES_stream_id set to 0xE1, and its entry_ES_private_stream_id to 0, and thus, it is associated with an elementary stream whose stream_id is specified (identified) by 0xE1, i.e., a video stream as explained above with reference to FIGS. 20 and 22. Furthermore, the Mark#2 has its mark_data set to 2, and thus, it causes an event involving 2 as the argument to occur.

Note here that the clip stream file to be played back by the PlayItem#0 included in the PlayList#1 is the clip stream file "00003.PS" as mentioned above. Therefore, the above-mentioned time 27,540,000 represented by the mark_time_stamp of the Mark#2 is the time of the clip stream file "00003.PS".

Furthermore, the video stream with which the Mark#2 is associated and of which stream_id is 0xE1 is a video stream whose stream_id is 0xE1, described in "00003.CLP" described in the Clip_Information_file_name of the PlayItem#0 included in the PlayList#1 of FIG. 25 to which that Mark#2 belongs, i.e., the second elementary stream (video stream) stream#1 of the three elementary streams stream#0 to stream#2 multiplexed into the clip stream file "00003.PS" recognized from the clip information file "00003.CLP" of FIG. 26.

Here, in the lower side of FIG. 28, to the right of the outside of the PlayListMark( ) list of the PlayList#1, the time from the start of the PlayItem( ) to which each of the Mark( )'s belongs is shown.

Note that in FIG. 28, the chapter or index number represented by a chapter or index mark is described in the mark_data. However, the chapter or index number represented by a chapter or index mark may not necessarily be described in the mark_data, but can be recognized by, e.g., counting the number of chapter or index marks in a PlayListMark( ).

[Explanation of Operation of the Disc Apparatus]

Next, operation of the disc apparatus of FIG. 1 will be explained, supposing that data (files) such as those explained above with reference to FIGS. 25 to 28 are recorded on the disc 101 of FIG. 1.

When the disc 101 has been inserted into the disc drive 102, a message to that effect is conveyed to the video content playback program 210, via the drive interface 114 and further the operating system 201 of FIG. 2. When having received the message to the effect that the disc 101 has been inserted into the disc drive 102, from the operating system 201, the video content playback program 210 starts pre-playback processing of FIG. 29.

[Pre-playback Processing]

Figure 29:
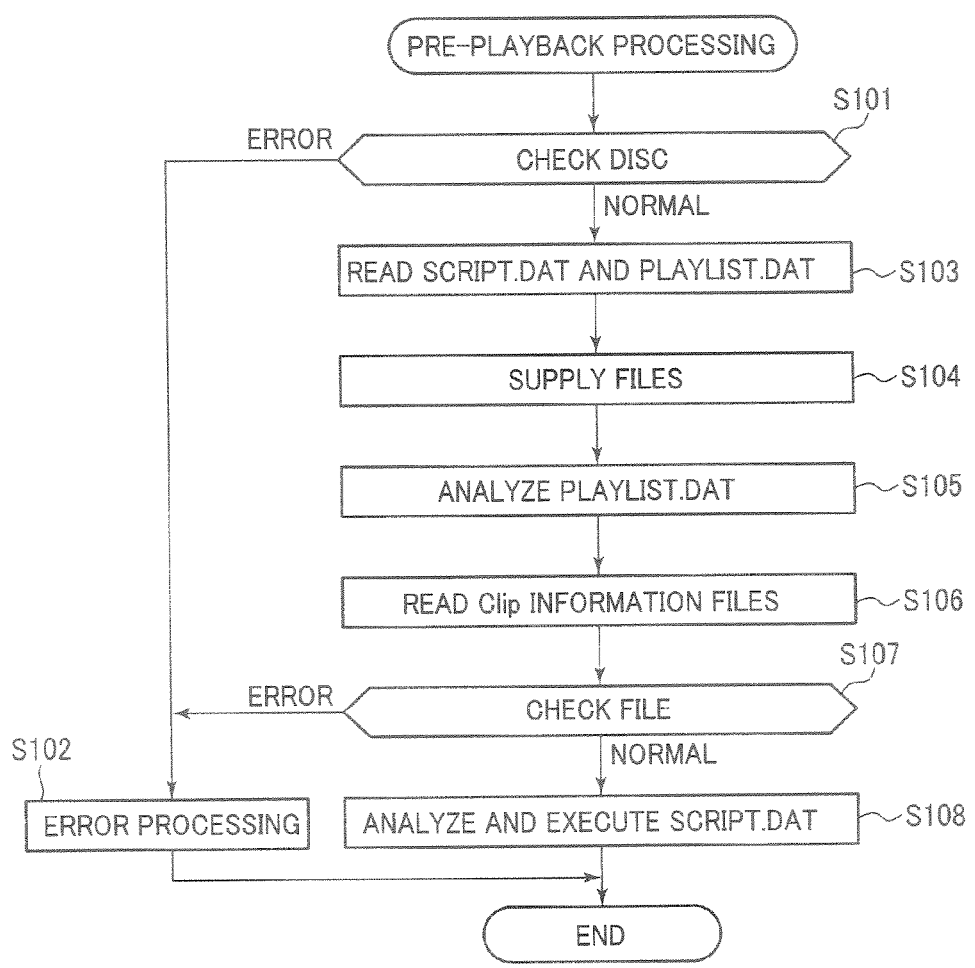
FIG. 29 is a flowchart for explaining pre-playback processing.

Namely, FIG. 29 is a flowchart for explaining the pre-playback processing performed by the video content playback program 210.

Here, the operation or processing of the disc apparatus explained below according to flowcharts is not necessarily performed time-sequentially along sequences described as the flowcharts, but may be performed parallely or individually in some cases. However, in the present Description, the operation or processing of the disc apparatus will be explained along the flowcharts for convenience.

In the pre-playback processing, in step S101, the video content playback program 210 uses a file system function of the operating system 201 to check the disc 101, thereby determining whether or not the disc 101 is a normal disc for the video content playback program 210.

Here, as mentioned above, access to (the reading of a file from) the disc 101 is performed using the file system function of the operating system 201, but its explanation will be omitted below, whenever appropriate.

In a case where it has been determined in step S101 that the disc 101 is not a normal disc, i.e., for example, a case where the file system adopted for the disc 101 is not compatible with the operating system 201, or a case where the "VIDEO" directory is not included in the root directory, the video content playback program 210 judges that the operating system 201 is incompatible with the disc 101, and the process proceeds to step S102, to cause the graphics processing module 219 to perform error processing, after which the pre-playback processing ends.

Namely, the graphics processing module 219 generates, as the error processing, (video data of) an error message to the effect that the disc 101 is not normal, and outputs the video data from the video output module 220, thereby displaying the error message. Note that the error processing may additionally include, e.g., output of an alarming sound from the audio output module 221, ejection of the disc 101 from the disc drive 102, and the like.

Meanwhile, in a case where it has been determined in step S101 that the disc 101 is a normal disc, the process goes to step S103 so that the video content playback program 210 causes the content data supply module 213 to request the operating system 201 to read two data files, i.e., the "SCRIPT.DAT" file and the "PLAYLIST.DAT" file included in the "VIDEO" directory of the disc 101 (FIG. 4), after which the process goes to step S104. In step S104, the "SCRIPT.DAT" file is supplied to the script control module 211, and also the "PLAYLIST.DAT" file is supplied to the player control module 212.

Thereafter, the process goes from step S104 to steps S105 to S107, where the player control module 212 performs initialization processing. Note that the script control module 211 waits until the initialization processing by the player control module 212 ends.

[Initialization Processing of the Player Control Module 212]

In the initialization processing, in step S105, the player control module 212 analyzes the "PLAYLIST.DAT" file, to examine the number of clip information files and their file names, used in the "PLAYLIST.DAT" file.

Namely, in the current case, the "PLAYLIST.DAT" file is as shown in FIG. 25, and the player control module 212 recognizes the presence of two PlayList( )'s, i.e., the first PlayList#0 and the second PlayList#1, since the number_of_ PlayLists is set to 2 in the "PLAYLIST.DAT" file of FIG. 25. Furthermore, since the number_of_PlayItems is set to 2 as to the first PlayList#0 in the "PLAYLIST.DAT" file of FIG. 25, the player control module 212 recognizes the presence of two PlayItem( )'s, i.e., the first PlayItem#0 and the second PlayItem#1 in that PlayList#0. And the player control module 212 refers to the Clip_Information_file_name of each of the first PlayItem#0 and the second PlayItem#1 included in the PlayList#0 in the "PLAYLIST.DAT" file of FIG. 25, thereby recognizing that (the filename of) the clip information file of the first PlayItem#0 included in the PlayList#0 is "00001.CLP" and that (the filename of) the clip information file of the second PlayItem#1 included in the PlayList#0 is "00002.CLP".

As to the second PlayList#1, the player control module 212 similarly recognizes the presence of the only one PlayItem( ) (PlayItem#0) since its number_of_PlayItems is set to 1, and further recognizes that the clip information file of that PlayItem#0 is "00003.CLP" from its Clip_Information_file_name in that PlayItem#0.

Thereafter, the process goes from step S105 to step S106, where the player control module 212 reads from the disc 101 the clip information files recognized in step S105, i.e., the three clip information files "00001.CLP", "00002.CLP", and "00003.CLP" from the "CLIP" directory within the "VIDEO" directory of the disc 101.

Here, as to the reading of the clip information files in step S106, it is enough to read only a clip information file of a PlayItem( ) in a PlayList( ), which is to be played back first. However, in the present embodiment, as mentioned above, it is supposed to read clip information files of PlayItem( )'s in all PlayList( )'s beforehand.

After the processing of step S106, the process goes to step S107, where the player control module 212 determines whether or not the clip information files recognized in step S105 have been successfully read, and further determine (check) whether or not the clip stream files corresponding to the read clip information files exist on the disc 101. Namely, in step S107, it is determined whether or not the reading of the clip information files "00001.CLP", "00002.CLP", and "00003.CLP" has been successful, and it is further determined whether or not the clip stream files "00001.PS", "00002.PS", and "00003.PS" which differ only in the file extensions from the clip information files "00001.CLP", "00002.CLP", and "00003.CLP", respectively, exist in the "STREAM" directory under the "VIDEO" directory of the disc 101.

In a case where it has been determined in step S107 that the reading of the clip information files recognized in step S105 has failed, or that the clip stream files corresponding to the clip information files are not found on the disc 101, i.e., for example, a case where clip information files and clip stream files necessary for playback in accordance with the "PLAYLIST.DAT" file are not recorded on the disc 101, the video content playback program 210 judges that the files are incompatible with the disc 101, and the process goes to step S102, in which the above-mentioned error processing is performed, and then the pre-playback processing is completed.

Meanwhile, in a case where it has been determined in step S107 that the reading of the clip information files recognized in step S105 has been successful and that the clip stream files corresponding to the clip information files are found on the disc 101, the player control module 212 ends the initialization processing, after which the process proceeds to step S108.

In step S108, the script control module 211 starts interpretation and execution of the "SCRIPT.DAT" file.

Let it now be supposed, e.g., that the script control module 211 executes the "SCRIPT.DAT" file whereby playback of the first PlayList( ) (PlayList#0) is instructed to the player control module 212. Then, playback processing of FIG. 30 is performed.

[Playback Processing]

Figure 30:
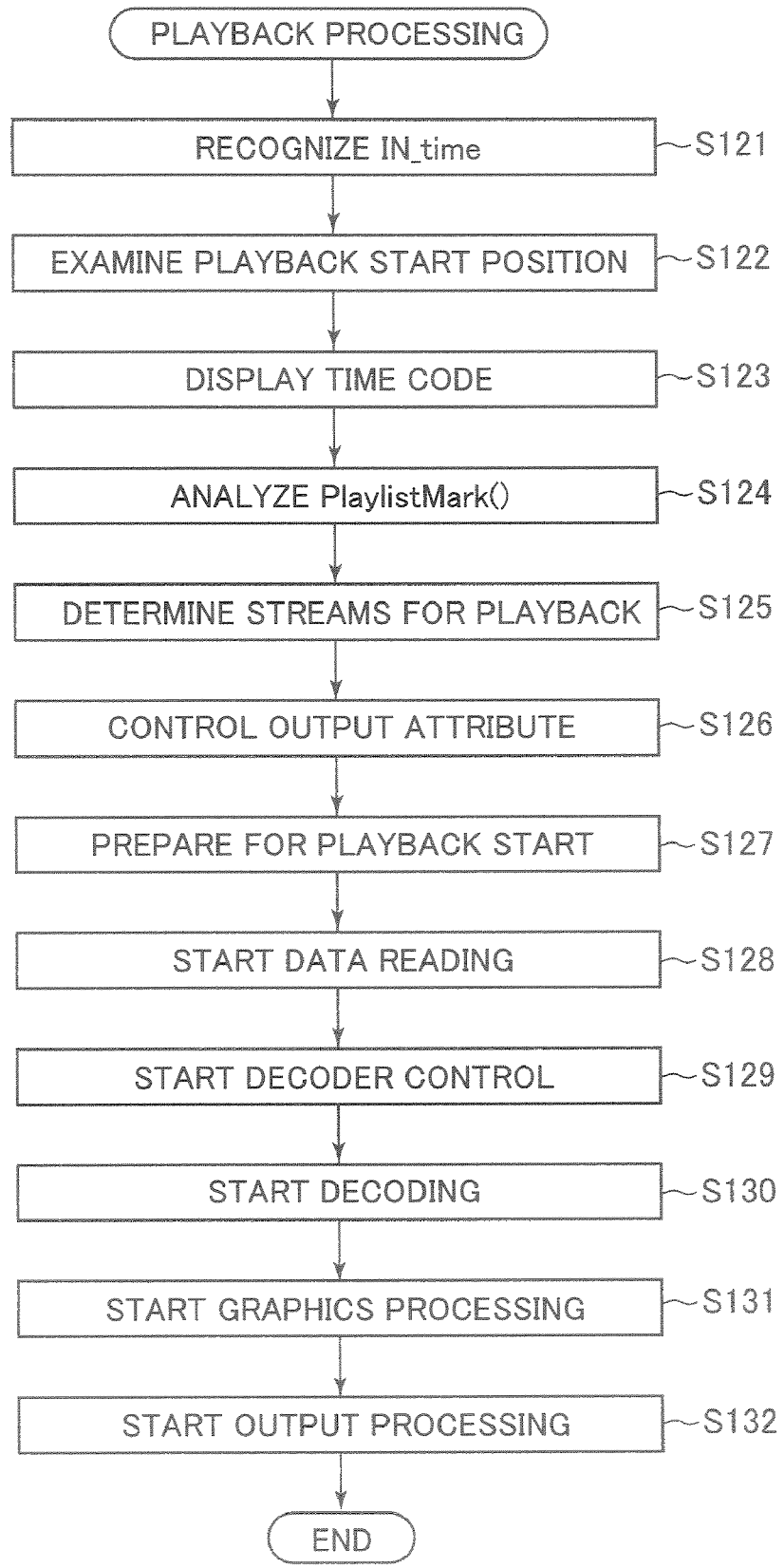
FIG. 30 is a flowchart for explaining playback processing.

Namely, FIG. 30 is a flowchart for explaining the playback processing performed by the video content playback program 210.

[Playback Preparing processing]

In the playback processing, the player control module 212 performs, in steps S121 and S122, playback preparing processing for a PlayList( ) whose playback has been instructed by the script control module 211, i.e., a first PlayList( ) (PlayList#0).

Namely, in step S121, the player control module 212 checks the IN_time (FIG. 6) of the first PlayItem#0 included in the first PlayList#0, and then the process goes to step S122, where the player control module 212 examines a playback start position for starting the playback which is on the clip stream file "00001.PS" to be played back by the first PlayItem#0 included in the first PlayList#0 and which corresponds to the IN_time of that PlayItem#0.

Here, in a case where the IN_time (FIG. 6) of a Play Item( ) indicates the start of a clip stream file, a program stream may only have to be read from the start of the clip stream file. However, in a case where the IN_time points to a position other than the start of the clip stream file, the player control module 212 finds (examines) the position corresponding to the IN_time, and must read the program stream therefrom.

Specifically, in the case shown in FIG. 25, the IN_time of the first PlayItem#0 included in the first PlayList#0 is 180,090. The player control module 212 finds a playback start position matching with 180,090 being the IN_time of the PlayItem#0, from the EP_map( ) shown in FIG. 27, of the clip stream file "00001.CLP" to be played back by the first PlayItem#0 included in the first PlayList#0.

Namely, the player control module 212 searches the maximum PTS_EP_start satisfying a formula PTS_EP_start≦IN_time, of the PTS_EP_start's representing the decode startable points described in the EP_map( ), using binary search or the like. Here, the reason why search is made on the PTS_EP_start equal to or smaller than the IN_time is because the position indicated by the IN_time is not always a decode startable point.

In the current case, the IN_time is 180,090 as mentioned above. Furthermore, in the EP_map( ) shown in FIG. 27, of the clip stream file "00001.CLP" to be played back by the first PlayItem#0 included in the first PlayList#0, 180,090 is described as the maximum PTS_EP_start satisfying the formula PTS_EP_start≦IN_time. Therefore, the player control module 212 searches through the EP_map( ) shown in FIG. 27 for the PTS_EP_start being set to 180,090.

Furthermore, the player control module 212 reads (a sector) 305 being the RPN_EP_start corresponding to the PTS_EP_start searched, whereby the position on the clip stream file "00001.PS" represented by that RPN_EP_start being 305 is determined as the playback start position.

After the player control module 212 determines the playback start position in the above-mentioned manner, the process proceeds from step S122 to step S123, where the player control module 212 controls the graphics processing module 219 to display a time code. The graphics processing module 219 generates (video data) of the time code, for output to the video output module 220, in accordance with the control by the player control module 212. As a result, display of the time code is started.

Here, the time code whose display has been started in step S123 is supposed to be a value obtained, e.g., by converting the start of the PlayList( ) into 00:00:00 (hours:minutes:seconds) Note that a chapter or index number may be displayed, together with or instead of the time code.

[PlaylistMark( ) Analyzing Processing]

After the display of the time code has been started in step S123, the process proceeds to step S124, where the player control module 212 performs analyzing processing for analyzing the PlayListMark( ) (FIG. 7) described in a PlayList( ) whose playback has been instructed by the script control module 211, i.e., a first PlayList( ) (PlayList#0).

Specifically, the player control module 212 recognizes that the number of Mark( )'s included in the PlayList#0 is seven, since the number_of_PlayList_marks is set to 7 in the PlayListMark( ) shown in the upper side of FIG. 28, of the first PlayList#0 in the "PLAYLIST.DAT" file already read.

Furthermore, the player control module 212 analyzes the seven Mark( )'s in the upper side of FIG. 28, included in the PlayList#0, and recognizes that four Mark( )'s being the first to fourth ones of the seven Mark( )'s belong to the first PlayItem( ) (PlayItem#0) of the PlayList#0, from their ref_to_PlayItem_id's.

Thereafter, the player control module 212 extracts the mark_time_stamp's of the four Mark( )'s belonging to the first PlayItem#0 of the PlayList#0, for delivery to the decode control module 214 as an array having four elements. Namely, as a result, four times {180,090}, {5,580,090}, {10,980,090}, and {16,380,090} being the mark_time_stamp's of the four Mark( )'s being the first to fourth ones of the seven Mark( )'s in the upper side of FIG. 28 are delivered to the decode control module 214 from the player control module 212. At this point of the processing, a message to the effect that these times have an attribute "mark processing" is also conveyed to the decode control module 214 from the player control module 212. When a time which the decode control module 214 is measuring with its measuring section 214A coincides with a time whose attribute is "mark processing", the decode control module 214 conveys a message to that effect, the time having coincided with the time whose attribute is "mark processing", and the attribute "mark processing", to the player control module 212.

[Determining Processing for Elementary Streams to be Played Back]

Next, the process proceeds from step S124 to step S125, where the player control module 212 determines elementary streams to be played back.

Namely, in the clip information file "00001.CLP" of FIG. 26, whose filename is described in the Clip_Information_file_name of the first PlayItem#0 (FIG. 25) in the first PlayList#0 being the PlayList( ) whose playback has been instructed by the script control module 211, the player control module 212 recognizes that four elementary streams are multiplexed into the corresponding clip steam file "00001.PS", since the number_of_streams is set to 4. Furthermore, the player control module 212 sequentially examines the stream_id's and necessary private_stream_id's in the StaticInfo( ) of the clip information file "00001.CLP" of FIG. 26, as to the four elementary streams, to recognize that, of the four elementary streams, one is a video stream, one is an ATRAC audio stream, and two are subtitle streams. Namely, the number of elementary streams having their respective attributes, multiplexed into the clip stream file "00001.PS" is recognized.

Note that the information about the number of elementary streams having their respective attributes, multiplexed into the clip stream file is used for switching elementary streams (such as switching of audio, switching of a subtitle, or the like) during playback. In addition, there may be a case where no subtitle stream exists in a clip stream file (no subtitle is included in content), and thus, information about the number of elementary streams whose attribute is "subtitle stream" is used to judge whether or not a subtitle stream is included.

The player control module 212 selects and determines the elementary streams to be played back on the basis of the result of an examination of the StaticInfo( ) such as above. In the current case, since there is only one elementary stream whose attribute is "video stream" and there is only one elementary stream whose attribute is "audio stream" of the four elementary streams multiplexed into the clip stream file "00001.PS", there is no room for selection as to the elementary streams whose attributes are "video stream" and "audio stream". Thus, the only one video stream and the only one audio stream (ATRAC audio stream) are determined as the elementary streams to be played back.

In addition, as to elementary streams whose attribute is "subtitle stream", there are two of the four elementary streams multiplexed into the clip stream file "00001.PS", and thus, one of the two subtitle streams is to be selected and determined as the elementary stream to be played back. Here, e.g., one of the two subtitle streams, which comes first in order of appearance in the clip information file "00001.CLP", is supposed to be selected.

Here, as mentioned above, in recognizing the attributes and the number of the four elementary streams multiplexed into the clip stream file "00001.PS", each of these four elementary streams must be specified. The player control module 212 specifies the four elementary streams multiplexed into the clip stream file "00001.PS" by referring to their stream_id's and necessary private_stream_id's.

Namely, the player control module 212 specifies the video stream being the elementary stream whose attribute is "video stream", of the four elementary streams multiplexed into the clip stream file "00001.PS", on the basis of the stream_id being set to 0xE0, as explained above with reference to the clip information file "00001.CLP" of FIG. 26.

In addition, the player control module 212 specifies the ATRAC audio stream being the elementary stream whose attribute is "audio stream", of the four elementary streams multiplexed into the clip stream file "00001.PS", on the basis of the stream_id being set to 0xBD and the private_stream_id being set to 0x00, as explained above with reference to the clip information file "00001.CLP" of FIG. 26.

Furthermore, the player control module 212 specifies the two subtitle streams being the elementary streams whose attribute is "subtitle stream", of the four elementary streams multiplexed into the clip stream file "00001.PS", on the basis of the stream_id being set to 0xBD and the private_stream_id being set to 0x80, and the stream_id being set to 0xBD and the private_stream_id being set to 0x81, respectively, as explained above with reference to the clip information file "00001.CLP" of FIG. 26.

As in the above, any elementary stream multiplexed into a clip stream file can be specified by a stream_id/private_stream_id combination described as the metadata in the clip information file corresponding to a clip stream file.

Here, a stream_id/private_stream_id combination is a mechanism provided to extend the MPEG2-System multiplexing. By using this stream_id/private_stream_id combination in the metadata (database) to specify an elementary stream, the elementary stream can be specified reliably. In addition, even where the meaning of a private_stream_id is extended in the future to increase the number and type (attribute) of the corresponding elementary streams, the current mechanism can be used directly, and thus, this mechanism is superior in extendability.

Namely, e.g., in the BD (Blue ray Disc) standard, the PID (Packet ID) of a transport stream (Transport Stream) in the MPEG2 standard is used to specify data, and thus the BD standard is restricted by the MPEG2 standard. In addition, e.g., in the DVD_Video standard, a sub_stream_id analogous to the private_stream_id is defined. However, the sub_stream_id is not configured to be described in the database to specify a stream, but can only be described in a fixed area for describing information about eight or thirty-two streams (see, e.g., VI4-49, Table 4.2.1-2 (VTS-AST_ATRT) and a VI4-52, Table 4.2.1-3 (VTS_SPST_ATRT), and thus the DVD_Video is inferior in extendability.

Meanwhile, the stream_id/private_stream_id combination can be described, e.g., as many times as the number_of_streams represents in the clip information file Clip( ) of FIG. 10 in which metadata is described, and therefore, it is possible to specify elementary streams multiplexed into the clip stream file, according to stream_id/private_stream_id combinations as metadata described in the clip information file Clip( ) irrespective of the number of elementary streams (however, within the range of numbers representable by the number_of_streams).

Note that in the present embodiment, the stream_id/private_stream_id combination is used not only to specify, in the clip information file of FIG. 10, an elementary stream multiplexed into the corresponding clip stream file, but also to specify, e.g., an elementary stream associating a Mark( ) therewith as an entry_ES_stream_id/entry_ES_private_stream_id combination in the PlayListMark( ) of FIG. 7. Furthermore, the stream_id/private_stream_id combination is additionally used to specify, e.g., an elementary stream for which decode startable point information is described in the EP_map( ) of FIG. 14.

[Output Attribute Control Processing]

The process thereafter proceeds from step S125 to step S126, where the player control module 212 performs output attribute control processing for playback target elementary streams, i.e., the elementary streams determined to be played back in step S125.

Specifically, the player control module 212 first examines the number_of_DynamicInfo (FIG. 10) representing the number of DynamicInfo( )'s (FIG. 13), in each of which the output attribute is described, as to each of the playback target elementary streams, i.e., the video stream, ATRAC audio stream, and subtitle stream determined to be played back in step S125.

Here, in the present case, the video stream, ATRAC audio stream, and subtitle stream being playback targets are the elementary streams multiplexed into the clip stream file "00001.PS", and all of their number_of_DynamicInfo's are set to 0, as described above with reference to "00001.CLP" of FIG. 26. Where the number_of_DynamicInfo's are set to 0 as to all the playback target elementary streams in this manner, the player control module 212 performs no processing in particular as the output attribute control processing for the playback target elementary streams.

Note that processing to be performed as output attribute control for the elementary stream in a case where the number_of_DynamicInfo as to a playback target elementary stream is not 0 will be described later.

[Playback Start Preparing Processing]

After the processing of step S126, the process proceeds to step S127, where the player control module 212 performs playback start preparing processing for the playback target elementary streams.

Namely, the player control module 212 gives the filename of the clip stream file "00001.PS" into which the playback target elementary streams are multiplexed, and the RPN_EP_start (=305) described in the EP_map( ), being the playback start position determined in step S122, to the content data supply module 213.

Furthermore, the player control module 212 initializes the buffer control module 215 before starting supply of a program stream stored in the clip stream file "00001.PS" into which the playback target elementary streams are multiplexed, to the buffer control module 215.

Specifically, in the buffer control module 215 (FIG. 3), the same value is set to each of the data start pointer stored in the data start pointer storing section 231, the data writing pointer stored in the data writing pointer storing section 232, the video reading pointer stored in the video reading pointer storing section 241, the audio reading pointer stored in the audio reading pointer storing section 251, and the subtitle reading pointer stored in the subtitle reading pointer storing section 262.

As a result, the data start pointer stored in the data start pointer storing section 231 and the data writing pointer stored in the data writing pointer storing section 232 point to the same position in the buffer 215A of the buffer control module 215. This means that no valid data is stored in the buffer 215A.

Furthermore, the player control module 212 supplies the stream_id's, and further, private_stream_id's, as necessary, as identification information for identifying (specifying) the playback target elementary streams, to the buffer control module 215.

Namely, as described above, of the playback target elementary streams, the video stream whose attribute is "video stream" is specified by its stream_id being set to 0xE0; the ATRAC audio stream whose attribute is "audio stream" is specified by its stream_id being set to 0xBD and its private_stream_id being set to 0x00; and the subtitle stream whose attribute is "subtitle stream" is specified by its stream_id being set to 0xBD and its private_stream_id being set to 0x80. The player control module 212 supplies these stream_id's and private_stream_id's to the buffer control module 215.

In the buffer control module 215 (FIG. 3), the video reading function section 233 stores the stream_id of the video stream being set to 0xE0 from the player control module 212, in the stream_id register 242. In addition, the audio reading function section 234 stores the stream_id being set to 0xBD and the private_stream_id being set to 0x00 from the player control module 212, in the stream_id register 252 and the private_stream_id register 253, respectively. Furthermore, the subtitle reading function section 235 stores the stream_id being set to 0xBD and the private_stream_id being set to 0x80 from the player control module 212, in the stream_id register 263 and the private_stream_id register 264, respectively.

Note that the player control module 212 stores the stream_id's and the private_stream_id's of the playback target elementary streams which it has supplied to the buffer control module 215, for future processing. The player control module 212 uses these stream_id's and private_stream_id's at the time of occurrence of a message that requests later-described stream switching, and for specifying streams currently being played back in later-described mark processing.

The player control module 212 further sets a subtitle reading function flag matching with the clip stream file into which the playback target elementary streams are multiplexed, to the subtitle reading function flag storing section 261, as the initialization of the buffer control module 215 (FIG. 3).

Namely, in the present case, the subtitle stream is included in the clip stream file "00001.PS" into which the playback target elementary streams are multiplexed, and thus a subtitle reading function flag whose value is 1 is set to the subtitle reading function flag storing section 261, in order to cause the subtitle reading function section 235 to function. Note that where no subtitle stream is included in the clip stream file "00001.PS" into which the playback target elementary streams are multiplexed, a subtitle reading function flag whose value is 0 is set to the subtitle reading function flag storing section 261. In this case, the subtitle reading function section 235 does not function (performs no processing in particular).

In addition, the player control module 212 gives the time 180,090 being the IN_time and the time 27,180,090 being the OUT_time, of the first PlayItem#0 (FIG. 25) included in the first PlayList#0 whose playback has been instructed by the script control module 211, to the decode control module 214.

In the decode control module 214, the IN_time is used for controlling decoding start for the clip to be played back by a PlayItem( ), and the OUT_time for controlling decoding end for the clip and further for controlling later-described PlayItem changing.

Furthermore, the player control module 212 initializes a subtitle stream display mode instruction to the graphics processing module 219. Namely, the player control module 212 controls the graphics processing module 219 to set the subtitle stream display mode to, e.g., the default display mode.

[Data Reading Start]

Thereafter, the process proceeds from step S127 to step S128, where the player control module 212 controls the content data supply module 213, thereby the content data supply module 213 uses a function of the operating system 201 to read a clip stream file storing a program stream into which the elementary streams to be played back are multiplexed. Namely, the content data supply module 213 designates the clip stream file "00001.PS" in the "STREAM" directory under the "VIDEO" directory of the disc 101 (FIG. 4), and further designates the sector 305 being the playback start position determined in step S122 to request the operating system 201 to read the file. In addition, the content data supply module 213 designates supply of the data read from the disc 101, to the buffer control module 215.

As a result, the reading of the program stream stored in the clip stream file "00001.PS" from the disc 101 is started, and the program stream is supplied to the buffer control module 215.

The buffer control module 215 (FIG. 3) writes the program stream read from the disc 101 and supplied thereto, at a position in the buffer 215A pointed at by the data writing pointer of the data writing pointer storing section 232, and increments the data writing pointer by a size of the data written.

Hereinbelow, unless otherwise mentioned, the content data supply module 213 is supposed to read data from the disc 101 as long as a free space is available in the buffer 215A of the buffer control module 215, and to supply and store the read data to and in the buffer 215A of the buffer control module 215. Therefore, the buffer 215A is supposed to have sufficient data accumulated constantly therein.

[Decoder Control Start]

When the reading of the data from the disc 101 has been started and then the accumulation of the data in the buffer 215A of the buffer control module 215 has been started in a manner such as described above, the process proceeds from step S128 to step S129, where the decode control module 214 controls the video decoder control module 216, the audio decoder control module 217 and the subtitle decoder control module 218 to start reading the data from the buffer 215A as a preliminary step of decoding operation.

Namely, as a result, the video decoder control module 216 requests data from the video reading function section 233 of the buffer control module 215 (FIG. 3) thereby the video decoder control module 216 acquires one video access unit stored in the buffer 215A and delivered from the buffer control module 215 as so requested, the PTS and the DTS (hereinafter called "time stamp" whenever appropriate) added to the video access unit, and the pic_struct_copy, the au_ref_flag, and the AU_length being information (hereinafter also called "added information" whenever appropriate) described in the private_stream_2 PES_packet( ) immediately ahead of the decode startable point. Note that the time stamp is delivered from the video decoder control module 216 to the decode control module 214 every time the video decoder control module 216 acquires a video access unit.

Meanwhile, also the audio decoder control module 217 requests data from the audio reading function section 234 of the buffer control module 215 (FIG. 3), thereby the audio decoder control module 217 acquires a single (ATRAC) audio access unit stored in the buffer 215A and delivered from the buffer control module 215 as so requested, and the time stamp (PTS, DTS) added to the audio access unit. Note that the time stamp is delivered from the audio decoder control module 217 to the decode control module 214 every time the audio decoder control module 217 acquires an audio access unit.

Furthermore, the subtitle decoder control module 218 requests data from the subtitle reading function section 235 of the buffer control module 215 (FIG. 3), thereby the subtitle decoder control module 218 acquires one subtitle access unit stored in the buffer 215A and delivered from the buffer control module 215 as so requested, and the time stamps added to the subtitle access unit. Note that the time stamp is delivered from the subtitle decoder control module 218 to the decode control module 214 every time the subtitle decoder control module 218 acquires a subtitle access unit. In addition, in a case where no subtitle stream exists in the playback target elementary streams, or a case where no subtitle access unit is stored in the buffer 215A, no data is delivered from the buffer control module 215 to the subtitle decoder control module 218.

Here, the video decoder control module 216, the audio decoder control module 217, and the subtitle decoder control module 218 each deliver the result of the data request, every time data is requested from the buffer control module 215, to the decode control module 214.

In addition, details of the reading of the data from the buffer 215A when the data is to be delivered from the buffer control module 215 to the video decoder control module 216, the audio decoder control module 217, and the subtitle decoder control module 218 will be described later.

[Decoding Start]

When the video decoder control module 216, the audio decoder control module 217, and the subtitle decoder control module 218 have started reading the data from the buffer 215A of the buffer control module 215, the process proceeds from step S129 to step S130, where the decoding of the data is started.

Namely, the decode control module 214 instructs the video decoder control module 216, audio decoder control module 217, and subtitle decoder control module 218 to start decoding, on the basis of the time 180,090 being the IN_time of the first PlayItem#0 included in the PlayList#0, given from the player control module in step S127, and further of the time stamp delivered in a manner such as described above with reference to step S129 from the video decoder control module 216, the audio decoder control module 217, and the subtitle decoder control module 218, while shifting their timings, if necessary, for ensuring synchronization.

Here, a decoding start instruction method involving shifted timings for ensuring synchronization is disclosed in, e.g., Japanese Patent No. 3496725. Briefly, the minimum one of the time stamp delivered respectively by the video decoder control module 216, audio decoder control module 217, and subtitle decoder control module 218 is set as an initial value of the time measured by the time measuring section 214A, to start time measurement, and a decoding start instruction is given upon coincidence of the time measured by the time measuring section 214A with that time stamp.

The video decoder control module 216, having received the decoding start instruction from the decode control module 214, delivers, in response to that instruction, one video access unit acquired from the video reading function section 233 of the buffer control module 215 (FIG. 3), to the video decoder 116 (FIG. 1) for decoding. Furthermore, the video decoder control module 216 supplies video data resulting from the decoding, to the graphics processing module 219.

Afterwards, the video decoder control module 216 decodes video access units acquired one at a time from the video reading function section 233 of the buffer control module 215, sequentially at the video decoder 116, and successively supplies video data resulting from the decoding, to the graphics processing module 219.

Meanwhile, also the audio decoder control module 217, having received the decoding start instruction from the decode control module 214, delivers, in response to that instruction, one audio access unit acquired from the audio reading function section 234 of the buffer control module 215 (FIG. 3), to the audio decoder 117 (FIG. 1) for decoding. Furthermore, the audio decoder control module 217 supplies audio data resulting from the decoding, to the audio output module 221.

Afterwards, the audio decoder control module 217 decodes audio access units acquired one at a time from the audio reading function section 234 of the buffer control module 215, sequentially at the audio decoder 117, and successively supplies audio data resulting from the decoding, to the audio output module 221.

In addition, the subtitle decoder control module 218, having received the decoding start instruction from the decode control module 214, decodes, in response to that instruction, one subtitle access unit acquired from the subtitle reading function section 235 of the buffer control module 215 (FIG. 3), using the incorporated subtitle decoding software, and supplies subtitle data resulting from the decoding, to the graphics processing module 219.

Afterwards, the subtitle decoder control module 218 decodes subtitle access units acquired one at a time from the subtitle reading function section 235 of the buffer control module 215, sequentially using the incorporated subtitle decoding software, and successively supplies subtitle data resulting from the decoding, to the graphics processing module 219.

[Graphics Processing]

Thereafter, the process proceeds from step S130 to step S131, where the graphics processing module 219 performs graphics processing on the video data supplied thereto from the video decoder control module 216 and further the subtitle data supplied thereto from the subtitle decoder control module 218 as necessary, in a manner such as mentioned above.

Namely, the graphics processing module 219 first performs subtitle processing, such as enlarging or reducing the subtitle data from the subtitle decoder control module 218, according to a display mode instruction from the player control module 212. In a case where no display mode instruction has been given from the player control module 212, or a case where the default display mode instruction has been given therefrom, the graphics processing module 219 directly saves the subtitle data from the subtitle decoder control module 218 without processing it.

Furthermore, the graphics processing module 219 adds the video data from the video decoder control module 216 to the subtitle data from the subtitle decoder control module 218 or the subtitle data resulting from the subtitle processing, to acquire output video data in which the subtitle data is overlaid on the video data from the video decoder control module 216, for supply to the video output module 220.

Note that in a case where having received an instruction to display information, such as, e.g., a menu, a message, a time code, a chapter or index number, from the script control module 211 and the player control module 212, the graphics processing module 219 generates the information, and overlays it on the output video data, for supply to the video output module 220.

[Output Processing]

After the processing of step S131, the process proceeds to step S132, where the video output module 220 stores the output video data supplied thereto from the graphics processing module 219 in a manner as described above with reference to step S131, sequentially in the FIFO 220A, and sequentially outputs the output video data stored in the FIFO 220A, at a preset output rate.

The video output module 220 accepts the output video data from the graphics processing module 219 as long as some (remaining) space is available in the FIFO 220A. However, in a case where the FIFO space is tight, the video output module 220 requests the graphics processing module 219 to stop reception of the output video data. As a result, the graphics processing module 219 stops its processing, and also requests the video decoder control module 216 and the subtitle decoder control module 218 to stop their processing. As a result, the video decoder control module 216 and the subtitle decoder control module 218 stop their processing.

After the video output module 220 has requested the graphics processing module 219 to stop reception of the output video data, and when output of the output video data from the FIFO 220A advances so that some space becomes available in the FIFO 220A, the video output module 220 requests the graphics processing module 219 to receive the output video data thereto. This request is conveyed from the graphics processing module 219 to the video decoder control module 216 and the subtitle decoder control module 218, similarly to the request for stopping reception of the output video data. As a result, the graphics processing module 219, and further the video decoder control module 216 and the subtitle decoder control module 218 resume their processing stopped.

Meanwhile, also the audio output module 221 stores the output audio data supplied thereto from the audio decoder control module 217 in a manner such as explained above with reference to step S130, sequentially in the FIFO 221A, and sequentially outputs the output audio data stored in the FIFO 221A, at a preset output rate (sampling frequency).

The audio output module 221 accepts the output audio data from the audio decoder control module 217 as long as some (remaining) space is available in the FIFO 221A. However, where the FIFO space is tight, the audio output module 221 requests the audio decoder control module 217 to stop reception of the audio data. As a result, the audio decoder control module 217 stops its processing.

After the audio output module 221 has requested the audio decoder control module 217 to stop reception of the audio data, and when output of the output audio data from the FIFO 221A advances so that some space becomes available in the FIFO 221A, the audio output module 221 requests the audio decoder control module 217 to receive the audio data. As a result, the audio decoder control module 217 resumes its processing stopped.

As the data is outputted from the video output module 220 and the audio output module 221 in a manner as in the above, the elementary streams are successively decoded.

While the flow of the entire processing or operation performed by the disc apparatus of FIG. 1 when the apparatus plays back the disc 101 is as explained above with reference to FIGS. 29 and 30, other processing or operation performed by the disc apparatus during playback of the disc 101 will be described below.

[PlayItem Changing]

Playback of the PlayItem#0 of the first PlayList#0 in FIG. 25 starts in a manner as explained above with reference to FIGS. 29 and 30. According to the PlayList#0, when the playback of the first PlayItem#0 ends, playback of the second PlayItem#1 starts. Namely, PlayItem changing is performed by which the PlayItem#0 is changed to PlayItem#1.

Figure 31:
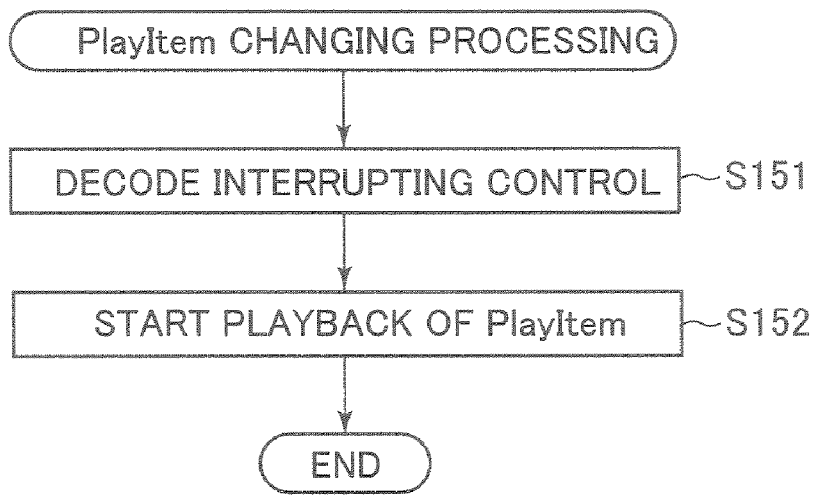
FIG. 31 is a flowchart for explaining PlayItem changing processing.

Referring now to a flowchart of FIG. 31, this PlayItem changing processing will be explained.

When playback of (a clip which is) the PlayItem#0 of the first PlayList#0 in FIG. 25 starts in a manner as explained above with reference to FIGS. 29 and 30, the decode control module 214 (FIG. 2) continues checking the time measured by the built-in measuring section 214A, during playback of that first PlayItem#0.

[Playback End of PlayItem#0]

And when the time measured by the time measuring section 214A equals the time 27,180,090 (FIG. 25) being the OUT_time of the first PlayItem#0 given from the player control module 212 in step S127 of FIG. 30, the decode control module 214 performs, in step S151, decode interrupting control, to end the playback of the PlayItem#0.

Namely, the decode control module 214 controls the video decoder control module 216, the audio decoder control module 217, and the subtitle decoder control module 218 to stop their decoding operation. Furthermore, the decode control module 214 controls the video output module 220 to continue output of the output video data currently being outputted.

Furthermore, the decode control module 214 conveys a message to the effect that the playback of the first PlayItem#0 has ended, to the player control module 212.

[Playback Start of PlayItem#1]

The player control module 212 has recognized, as mentioned above in step S105 of FIG. 29, that the first PlayItem#0 and the second PlayItem#1 exist in the first PlayList#0, and thus when informed by the decode control module 214 that the playback of the first PlayItem#0 has ended, the process proceeds from step S151 to step S152, where the player control module 212 starts playback of the second PlayItem#1, similarly to the case of the above-mentioned first PlayItem#0.

Namely, roughly describing a playback procedure for the second PlayItem#1, the player control module 212 first determines one of the RPN_EP_start's described in the EP_map( ) as the playback start position for the second PlayItem#1, similarly to the case in step S122 of FIG. 30.

Furthermore, the player control module 212 performs recognition of the Mark( )'s belonging to the second PlayItem#1 in a manner such as described above with reference to step S124 of FIG. 30, recognition of the number of elementary streams having their respective attributes, multiplexed into the clip stream file "00002.PS" to be played back by the PlayItem#1 in a manner as explained above with reference to step S125 of FIG. 30, and further determination of elementary streams to be played back (being a playback target), and the like.

And the player control module 212 performs processing similar to the case in step S127 of FIG. 30.

Namely, the player control module 212 gives the content data supply module 213 the RPN_EP_start in the EP_map( ) determined as the playback start position and the filename of the clip stream file into which the playback target elementary steams are multiplexed, i.e., in the present case, the filename of the clip stream file "00002.PS" corresponding to "00002.CLP" described in the Clip_information_file_name of the second PlayItem#1 (FIG. 25).

Furthermore, the player control module 212 initializes the buffer control module 215 before starting supply of a program stream stored in the clip stream file "00002.PS" into which the playback target elementary streams are multiplexed, to the buffer control module 215.

Namely, as a result, in the buffer control module 215 (FIG. 3), the same value is set to each of the data start pointer stored in the data start pointer storing section 231, the data writing pointer stored in the data writing pointer storing section 232, the video reading pointer stored in the video reading pointer storing section 241, the audio reading pointer stored in the audio reading pointer storing section 251, and the subtitle reading pointer stored in the subtitle reading pointer storing section 262.

Furthermore, the player control module 212 supplies the stream_id's, and further, the private_stream_id's, as necessary, as identification information for identifying (specifying) the playback target elementary streams, to the buffer control module 215.

In the buffer control module 215 (FIG. 3), the video reading function section 233 stores the stream_id of the video stream of the elementary streams for playback from the player control module 212, in the stream_id register 242. Furthermore, the audio reading function section 234 stores the stream_id and the private_stream_id of the audio stream of the playback target elementary streams from the player control module 212, in the stream_id register 252 and the private_stream_id register 253, respectively.

Furthermore, since the clip stream file "00002.PS" into which the current playback target elementary streams are multiplexed includes a subtitle stream, the player control module 212 supplies the stream_id and the private_stream_id of the subtitle stream of the elementary streams for playback, to the subtitle reading function section 235, and the subtitle reading function section 235 stores these stream_id and private_stream_id in the stream_id register 263 and the private_stream_id register 264, respectively.

And the player control module 212 sets the subtitle reading function flag whose value matches with the clip stream file into which the playback target elementary streams are multiplexed, to the subtitle reading function flag storing section 261, as the initialization of the buffer control module 215 (FIG. 3).

Namely, in the present case, since the clip stream file "00002.PS" into which the playback target elementary streams are multiplexed includes a subtitle stream, the subtitle reading function flag whose value is 1 is set to the subtitle reading function flag storing section 261, in order to cause the subtitle reading function section 235 to function.

Furthermore, the player control module 212 gives the time 90,000 being the IN_time and the time 27,090,000 being the OUT_time of the second PlayItem#1 (FIG. 25) which is about to be played back, to the decode control module 214.

Furthermore, the player control module 212 initializes the subtitle stream display mode instruction to the graphics processing module 219. Namely, the player control module 212 controls the graphics processing module 219 to set the subtitle stream display mode to the default display mode.

Note that in a case where the subtitle stream for playback has its configurable_flag (FIG. 12) set to 1 which permits display mode change, the subtitle stream display mode instruction to the graphics processing module 219 from the player control module 212 may be to leave the current display mode unchanged.

Thereafter, the playback of the second PlayItem#1 proceeds similarly to the playback of the first PlayItem#0. And the decode control module 214 continues checking the time measured by the built-in measuring section 214A, during playback of the second PlayItem#1. And when the time being measured by the time measuring section 214A equals the time 27,090,000 (FIG. 25) being the OUT_time of the second PlayItem#1 given from the player control module 212 in step S152 (FIG. 31), the decode control module 214 performs the decode interrupting control similar to the case in step S151, to end the playback of the PlayItem#1.

[Time Code Display]

Next, as mentioned above, display of a time code is started in step S123 of FIG. 30. The time code displayed is consecutively updated.

Figure 32:
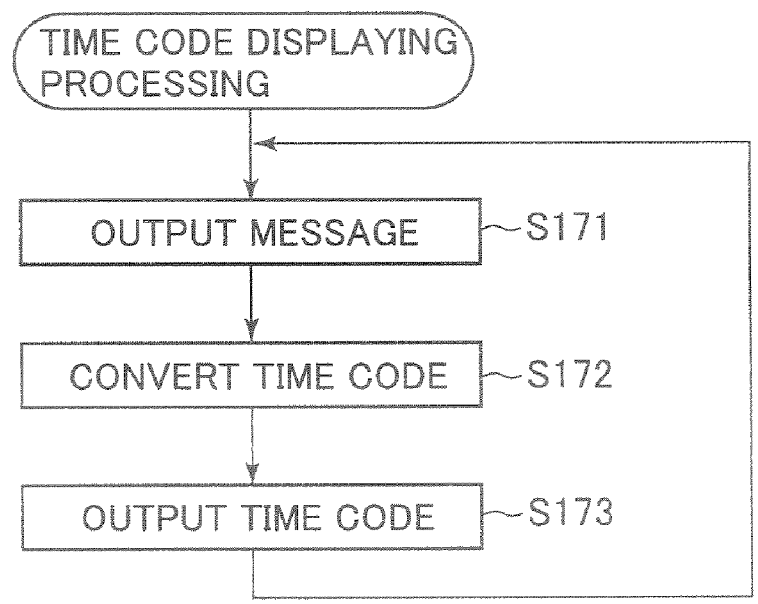
FIG. 32 is a flowchart for explaining time code display processing.

Referring now to a flowchart of FIG. 32, time code display processing will be explained.

When one second is measured by its built-in time measuring section 214A, the decode control module 214 (FIG. 2) supplies, in step S171, a current time measured by the time measuring section 214A, to the player control module 214, together with a message to the effect that one second has elapsed, after which the process proceeds to step S172. In step S172, the player control module 212 receives the message and the current time from the decode control module 214, and converts the current time into a time code, after which the process proceeds to step S173.

In step S173, the player control module 212 controls the graphics processing module 219 to display the time code acquired in step S172, after which the process returns to step S171.

As a result, the time code is updated every second. Note that the intervals at which the time code is updated are not limited to one second.

[Stream Switching]

Next, into the clip stream file "00001.PS" played back by the first PlayItem#0 and the clip stream file "00002.PS" played back by the second PlayItem#1, both forming the first PlayList#0 explained above with reference to FIG. 25, the two subtitle streams are multiplexed as explained above with reference to FIG. 26.

In a case where a plurality of elementary streams having the same attribute are multiplexed into a clip stream file in this manner, stream switching can be performed in which one of the plurality of playback target elementary streams having the same attribute can be switched to another.

Figure 33:
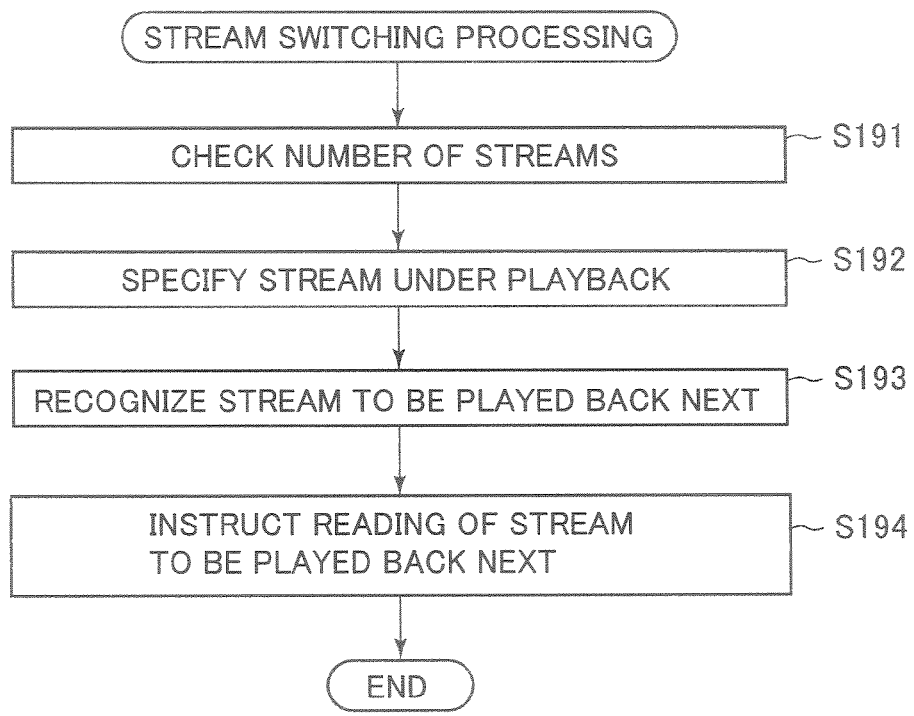
FIG. 33 is a flowchart for explaining stream switching processing.

Referring now to a flowchart of FIG. 33, stream switching processing will be explained.

For example, in a case where a stream switching instruction is described as the script program in the "SCRIPT.DAT" file (FIG. 4), a stream switching request is given to the player control module 212 by the script control module 211 executing the script program or by the user controlling the remote control.

Namely, the script control module 211, when having executed the script program wherein the stream switching instruction is described, supplies a message for requesting stream switching, to the player control module 212. In addition, when having received a stream switching instruction signal from the remote control by the user having controlled the remote control, the input interface 115 supplies a message for requesting stream switching, to the player control module 212.

Let it now be supposed, e.g., that a subtitle stream switching message being a message for requesting subtitle stream switching is supplied to the player control module 212. Then, the player control module 212 checks, in step S191, the number of subtitle streams it has recognized at the time of the determination of the elementary streams for playback performed in step S125 of FIG. 30.

In a case where the checking result as to the number of subtitle streams indicates one or less, the player control module 212 neglects the subtitle stream switching message, and therefore, the subsequent steps S192 to S194 are not performed.

Meanwhile, in a case where the number of subtitle streams is two or more, the process proceeds to steps S192 to S194 sequentially, thereby a subtitle stream being currently played back is switched to another subtitle stream.

Namely, in step S192, the player control module 212 specifies the subtitle stream currently being played back, on a clip information file. Specifically, let it now be supposed that the subtitle stream whose stream_id is 0xBD and private_stream_id is 0x80, multiplexed into the clip stream file "00002.PS" by the second PlayItem#1 forming the first PlayList#0 explained above with reference to FIG. 25 is being played back. Then, in step S192, it is specified that the subtitle stream currently being played back is the stream#2 being the third subtitle stream on the clip information file "00002.CLP" of FIG. 26, of the two subtitle streams multiplexed into the clip stream file "00002.PS".

Then, the process proceeds to step S193, where the player control module 212 recognizes (specifies) a subtitle stream next to the subtitle stream specified in step S192, on the clip information file, as a subtitle stream to be played back next. In FIG. 26, the subtitle stream next to the third subtitle stream stream#2 is the fourth subtitle stream stream#3 on the clip information file "00002.CLP", and thus, in step S193, the fourth subtitle stream stream#3 is recognized as the subtitle stream to be played back next.

Note that in a case where it has been specified that the subtitle stream currently being played back is the stream#3 being the fourth subtitle stream on the clip information file "00002.CLP" of FIG. 26, of the two subtitle streams multiplexed into the clip stream file "00002.PS", then, e.g., the third subtitle stream stream#2 is recognized as the subtitle stream to be played back next.

Thereafter, the process proceeds to step S194, where the player control module 212 gives the stream_id and private_stream_id of the subtitle stream to be played back next recognized in step S193, to the subtitle reading function section 235 of the buffer control module 215 (FIG. 3), to instruct the subtitle reading function section 235 to use the stream_id and private_stream_id for subsequent reading of a subtitle access unit from the buffer 215A.

The subtitle reading function section 235 of the buffer control module 215 (FIG. 3) newly sets, in step S194, the stream_id and private_stream_id given by the player control module 212, to the stream_id register 263 and the private_stream_id register 264, respectively, and the subsequent reading from the buffer 215A is performed on the subtitle access unit specified by the stream_id and the private_stream_id newly set in the stream_id register 263 and the private_stream_id register 264, respectively.

In a manner as described above, the subtitle streams to be played back are switched from the subtitle stream currently being played back to another subtitle stream.

[Processing by the Buffer Control Module 215]

Referring next to FIGS. 34 to 38, processing by the buffer control module 215 (FIG. 3), i.e., writing of data to the buffer 215A and reading of data from the buffer 215A will be described.

The buffer control module 215 has the five pointers for reading/writing data with respect to the buffer 215A, as explained above with reference to FIG. 3.

Figure 34:
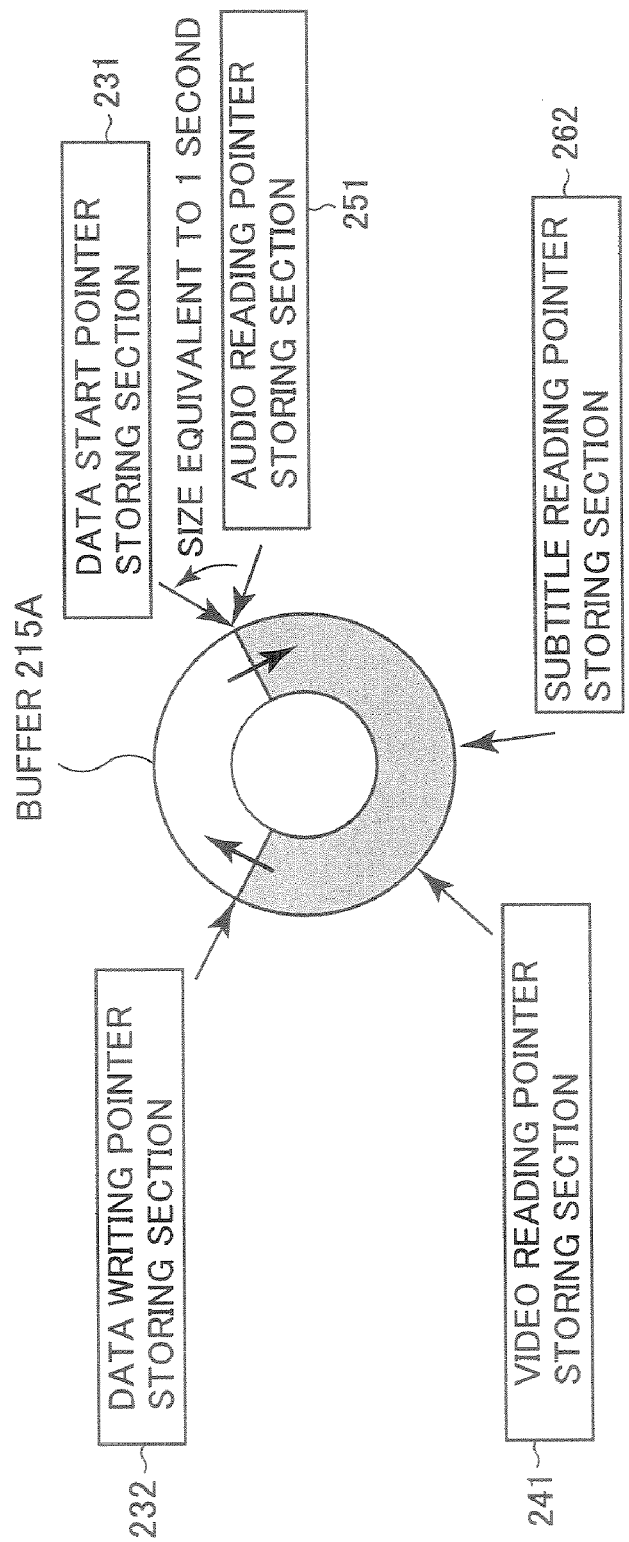
FIG. 34 is a flowchart for explaining processing by the buffer control module 215.
Figure 35:
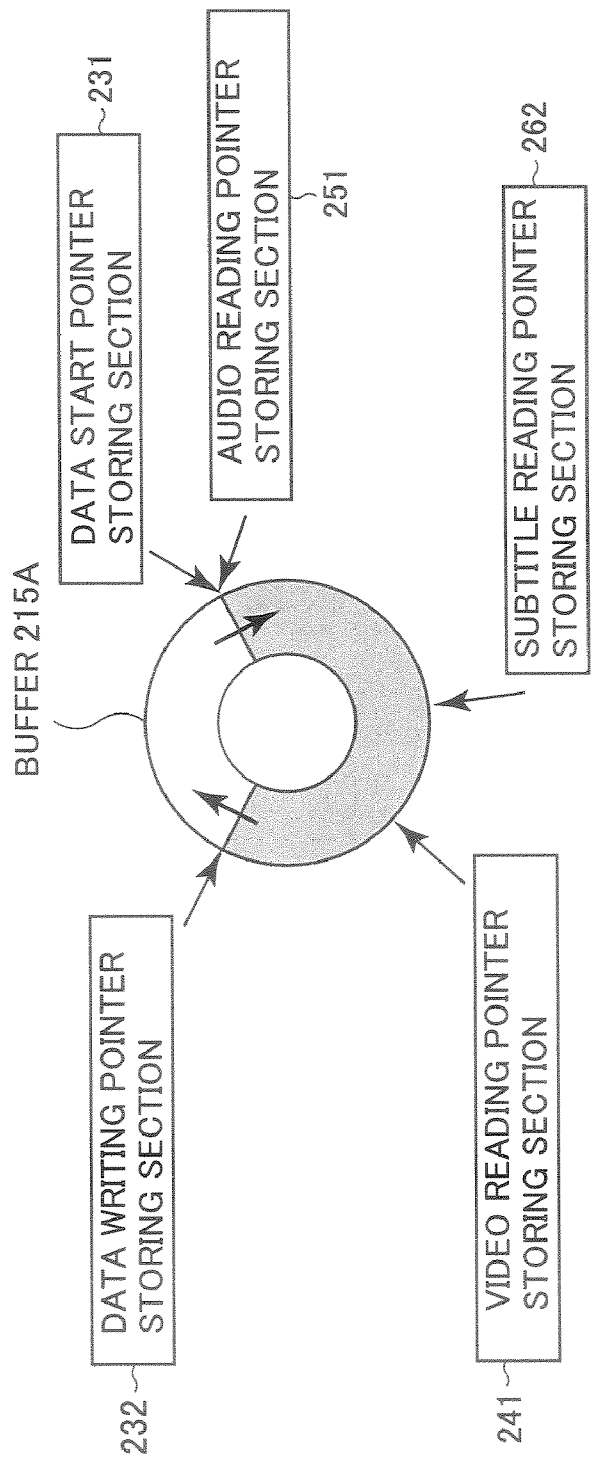
FIG. 35 is a flowchart for explaining processing by the buffer control module 215.

Namely, as shown in FIGS. 34 and 35, the buffer control module 215 has the data start pointer stored in the data start pointer storing section 231, the data writing pointer to be stored in the data writing pointer storing section 232, the video reading pointer to be stored in the video reading pointer storing section 241, the audio reading pointer to be stored in the audio reading pointer storing section 251, and the subtitle reading pointer to be stored in the subtitle reading pointer storing section 262.

Note that in FIGS. 34 and 35, the stream_id register 242 and the au_information( ) register 243 of the video reading function section 233, the stream_id register 252 and the private_stream_id register 253 of the audio reading function section 234, and the subtitle reading function flag storing section 261, the stream_id register 263, and the private_stream_id register 264 of the subtitle reading function section 235 in FIG. 3 are not shown.

The data start pointer stored in the data start pointer storing section 231 represents the position of the oldest data (the oldest data of data which needs to be read and has not been read yet) remaining in the buffer 215A. The data writing pointer stored in the data writing pointer storing section 232 points to a position for writing data to the buffer 215A, and this is the position at which the newest data in the buffer 215A is written.

The video reading pointer stored in the video reading pointer storing section 241 represents the position of a video stream to be read from the buffer 215A. In addition, the audio reading pointer stored in the audio reading pointer storing section 251 represents the position of an audio stream to be read from the buffer 215A, and the subtitle reading pointer stored in the subtitle reading pointer storing section 262 represents the position of a subtitle stream to be read from the buffer 215A.

Note that as explained above with reference to FIG. 3, all of the data start pointer, the data writing pointer, the video reading pointer, the audio reading pointer, and the subtitle reading pointer move clockwise along the buffer 215A.

Furthermore, in the present embodiment, the data start pointer is configured to be constantly updated such that, as shown in FIG. 35, it points at the same position as the position of the oldest data pointed to by any of the video reading pointer, the audio reading pointer, and the subtitle reading pointer. Here, in FIG. 35, among the video reading pointer, the audio reading pointer, and the subtitle reading pointer, the audio reading pointer points at the position of the oldest data, and thus the data start pointer points at the same position as the audio reading pointer.

In the buffer control module 215 having the data start pointer, data writing pointer, video reading pointer, audio reading pointer, and subtitle reading pointer such as in the above, when new data has been read from the disc 101 and written to the buffer 215A, the data writing pointer is updated clockwise so as to point at a position immediately behind that newly written data.

Furthermore, when a video stream, an audio stream, or a subtitle stream has been read from the buffer 215A, the video reading pointer, audio reading pointer, or subtitle reading pointer is updated clockwise by a portion proportional to the amount of data read, respectively. Here, the portion proportional to the amount of data read means the sum of a portion corresponding to the amount of video, audio or subtitle data actually read and a data portion of another stream included between the read data but skipped during the reading.

In addition, when the video reading pointer, audio reading pointer, or subtitle reading pointer has been updated, the data start pointer is updated so as to point at the same position as the oldest data position pointed to by any of the video reading pointer, the audio reading pointer, or the subtitle reading pointer.

Here, the buffer control module 215 controls writing of data to the buffer 215A such that the data writing pointer does not pass the data start pointer.

Namely, unless the data writing pointer passes the data start pointer, in the buffer control module 215, data read from the disc 101 is written to the position in the buffer 215A pointed to by the data writing pointer, and the data writing pointer is updated accordingly. Meanwhile, when the data writing pointer is about to pass the data start pointer, in the buffer control module 215, stoppage (interruption) of reading data from the disc 101 is requested to the content data supply module 213, and further writing of data to the buffer 215A is also stopped. As a result, overflow of the buffer 215A can be prevented.

As in the above, writing of data read from the disc 101 to the buffer 215A is controlled only by the positional relationship between the two pointers, i.e., the data start pointer and the data writing pointer.

Meanwhile, as to the reading of data from the buffer 215A, the buffer control module 215 controls the reading of data from the buffer 215A such that the video reading pointer, the audio reading pointer, and the subtitle reading pointer, as well as the data start pointer do not pass the data writing pointer.

Namely, unless the video reading pointer, the audio reading pointer, or the subtitle reading pointer passes the data writing pointer, in the buffer control module 215, as requested by the video decoder control module 216, the audio decoder control module 217, or subtitle decoder control module 218, data is read from the position in the buffer 215A pointed at by the video reading pointer, the audio reading pointer, or the subtitle reading pointer; the video reading pointer, audio reading pointer, or subtitle reading pointer is updated; and also the data start pointer is updated, as necessary. Meanwhile, when the video reading pointer, audio reading pointer, or subtitle reading pointer is about to pass the data writing pointer, in the buffer control module 215, the request from the video decoder control module 216, audio decoder control module 217, or subtitle decoder control module 218 is, e.g., frozen, until a sufficient amount of data becomes available. As a result, underflow of the buffer 215A can be prevented.

From the above, in the buffer 215A, the data to be supplied to the video decoder control module 216, audio decoder control module 217, and subtitle decoder control module 218 is stored clockwise within the range from the position pointed to by the data start pointer to the position pointed to by the data writing pointer (a shaded portion in FIGS. 34 and 35), and further, the video reading pointer, audio reading pointer, and subtitle reading pointer stay within that range.

Note that it is configured to update the data start pointer so as to point to the oldest data position of the positions pointed at by the video reading pointer, the audio reading pointer, and the subtitle reading pointer in the above-mentioned case. However, it can alternatively be configured such that the data start pointer points at a data position a predetermined time (e.g., 1 second) past that oldest data position, for example.

Namely, it is generally expected that, among the video reading pointer, the audio reading pointer, and the subtitle reading pointer, the video reading pointer and the audio reading pointer often point at the oldest data position.

Therefore, in a case where the data start pointer is updated so as to point at a data position, e.g., one second past the oldest data position pointed at by the video reading pointer or the audio reading pointer, data whose size equals one second past the oldest data position pointed at by the video reading pointer or the audio reading pointer can be left in the buffer 215A. Here, in FIG. 34, the audio reading pointer points at the oldest data position, and the data start pointer points at the data position one second past that position.

As described above, by updating the data start pointer so as to point at the position of the past data which is equivalent to one second, the responsiveness of the disc apparatus can be enhanced.

Namely, as shown in FIG. 35, in a case where the data start pointer is updated so as to point at the oldest data position pointed at by the audio reading pointer, e.g., when a special playback in the reverse direction is instructed, it is necessary to re-read data, the reading of which from the buffer 215A has ended, and thus some time elapses from when the special playback has been instructed, before the special playback is enabled.

By contrast, as shown in FIG. 34, in a case where the data start pointer is updated so as to point at the data position one second past the oldest data position pointed at by the audio reading pointer, when a special playback in the reverse direction is instructed, if the data necessary to start the special playback is the past data which is equivalent to one second stored in the buffer 215A, the special playback can be started instantly, without involving the above-mentioned re-reading of the data from the disc 101.

Note that even in a case where the data start pointer is updated so as to point at the data position one second past the oldest data position pointed at by the audio reading pointer, the data necessary to start the special playback may not be stored in the buffer 215A in some case. In this case, the data necessary to start the special playback is re-read from the disc 101.

Next, details of the reading of each of a video stream, an audio stream, and a subtitle stream from the buffer 215A will be explained.

As explained above with reference to step S127 of FIG. 30, when playback of a clip stream file is started, in the buffer control module 215, all of the data start pointer, data writing pointer, video reading pointer, audio reading pointer, and subtitle reading pointer are initialized to point at the same position on the buffer 215A.

And when a program stream (MPEG2-System Program Stream) stored in the clip stream file has been read from the disc 101 for supply to the buffer control module 215, in the buffer control module 215, the program stream is stored at the position pointed at by the data writing pointer of the buffer 215A, and also the data writing pointer is updated clockwise.

Furthermore, in the buffer control module 215 (FIG. 3), the video reading function section 233 analyzes the syntax of the program stream stored in the buffer 215A, and reads a video stream (video access unit) by extraction (separation) from the program stream stored in the buffer 215A as requested by the video decoder control module 216, for supply to the video decoder control module 216.

Similarly, also the audio reading function section 234 analyzes the syntax of the program stream stored in the buffer 215A, and extracts and reads an audio stream (audio access unit) from the program stream stored in the buffer 215A as requested by the audio decoder control module 217, for supply to the audio decoder control module 217. Also the subtitle reading function section 235 analyzes the syntax of the program stream stored in the buffer 215A, and extracts and reads a subtitle stream (subtitle access unit) from the program stream stored in the buffer 215A as requested by the subtitle decoder control module 218, for supply to the subtitle decoder control module 218.

[Reading of a Video Stream]

Referring next to a flowchart of FIG. 36, details of processing of reading a video stream from the buffer 215A performed by the video reading function section 233 (FIG. 3) will be explained.

First, in step S211, the video reading function section 233 searches to find a private_stream_2 PES_packet( ) in a program stream stored in the buffer 215A. Namely, the stream_id of the private_stream_2 PES_packet( ) is, as explained above with reference to FIG. 20, 10111111B (=0xBF), and the video reading function section 233 searches to find the PES_packet( ) whose stream_id is set to 10111111B.

Here, let it now be supposed, e.g., that as described above, the elementary streams multiplexed into the program stream stored in the clip stream file "00001.PS" are the playback target elementary streams. At the time of reading the program stream from the disc 101 for storage in the buffer 215A, in step S122 of FIG. 30, the sector 305 is determined as the playback start position from the decode startable point information described in the EP_map( ) (FIG. 27) of the clip stream file "00001.PS", and further, in step S128 of FIG. 30, the sector 305 being the playback start position is designated, thereby the operating system 201 is requested to read the program stream stored in the clip stream file "00001.PS".

In addition, as to a video stream, the decode startable point information described in the EP_map( ) represents the position of a private_stream_2 PES_packet immediately ahead of the actual decode startable point.

Therefore, immediately behind the program stream stored in the clip stream file "00001.PS" has been read and stored in the buffer 215A, it is the private_stream_2 PES_packet( ) that is stored at the buffer 215A whose position is pointed at by the data start pointer and the video reading pointer.

When having found the private_stream_2 PES_packet( ) in step S211, the process proceeds to step S212, where the video reading function section 233 extracts the video_stream_id described in the private_stream2_PES_payload( ) (FIG. 23) being the PES_packet_data_byte of the private_stream_2 PES_packet( ), to determine whether or not the video_stream_id coincides with the stream_id of the video stream for playback stored in the stream_id register 242 (FIG. 3) in step S127 of FIG. 30.

In a case where it has been determined in step S212 that the video_stream_id described in the private_stream2_PES_payload( ) does not coincide with the stream_id of the playback target video stream stored in the stream_id register 242, i.e., a case where the private_stream_2 PES_packet( ) found in the immediately preceding step S211 is not arranged at the decode startable point of the playback target video stream, the process returns to step S211, where the video reading function section 233 searches for another private_stream_2 PES_packet( ) in the program stream stored in the buffer 215A, after which similar processing is repeated.

Meanwhile, in a case where it has been determined in step S212 that the video_stream_id described in the private_stream2_PES_payload( ) coincides with the stream_id of the playback target video stream stored in the stream_id register 242, i.e., a case where the private_stream_2 PES_packet( ) found in the immediately preceding step S211 is arranged at the decode startable point of the playback target video stream, the process proceeds to step S213, where the video reading function section 233 reads the au_information( ) described in the private_stream2_PES_payload( ) of the private_stream_2 PES_packet( ), from the buffer 215A, for storage in the au_information( ) register 243 (FIG. 3), after which the process proceeds to step S214.

In step S214, the video reading function section 233 updates the video reading pointer stored in the video reading pointer storing section 231 by a size equivalent to the private_stream_2 PES_packet( ) (the private_stream_2 PES_packet( ) whose video_stream_id (FIG. 23) coincides with the stream_id stored in the stream_id register 242 (FIG. 3)), found in the immediately preceding step S211.

Namely, in the clip stream file, the private_stream_2 PES_packet( ) is immediately followed by the video stream (PES_packet( )), whose stream_id coincides with its video_stream_id, and therefore, in step S214, the video reading pointer is updated so as to point at the actual decode startable point position for the video stream.

Thereafter, the process proceeds from step S214 to step S215, where the video reading function section 233 determines whether or not data is requested by the video decoder control module 216, and if not, the process returns to step S215, to repeat similar processing.

In addition, in a case where it has been determined in step S215 that data is requested by the video decoder control module 216, the process proceeds to step S216, where the video reading function section 233 reads data by a size equivalent to the number of bytes described in the AU_length of the au_information( ) stored in the au_information( ) register 243, i.e., one video access unit, for supply to the video decoder control module 216, while analyzing the syntax of the program stream from the buffer 215A whose position is pointed at by the video reading pointer, and also updates the video reading pointer by the size equivalent to the one video access unit read from the buffer 215A.

Namely, in the au_information( ), as explained above with reference to FIG. 24, the number_of_access_unit representing the number of video access units (pictures) included between a private_stream_2 PES_packet( ) including itself and a next private_stream_2PES_packet( ) is described.

Furthermore, in the au_information( ), as explained above with reference to FIG. 24, the pic_struct_copy, the au_ref_flag, and the AU_length as information about each of as many video access units as the number_of access unit represents, are described.

Each of as many AU_length's as the number_of access unit represents described in the au_information( ) represents, as explained above with reference to FIG. 24, the size of each of as many video access units as the number_of_access_unit represents included between a private_stream_2PES_packet including itself to a next private_stream_2PES_packet( ), and thus, by using the AU_length, the video reading function section 233 can clip an access unit without analyzing the syntax of the video stream.

Namely, in a case of clipping an MPEG2-Video and MEPG4-AVC access unit, it has been required to analyze the syntax of a video stream after having learned the syntax of the video stream. However, a program stream stored in a clip stream file recorded on the disc 101 includes a private_stream_2 PES_packet( ) in which the AU_length representing the size of a video access unit is described, immediately ahead of each of one or more actual decode startable points in a video access unit-based video stream. Therefore, the video reading function section 233 can read the video access unit (-based video stream) from the buffer 215A without analyzing the syntax of the video stream, on the basis of the AU_length described in the private_stream_2 PES_packet, for supply to the video decoder control module 216.

Note that at the time of supplying the video access unit to the video decoder control module 216 in step S216, the video reading function section 233 supplies also the pic_struct_copy, the au_ref_flag, and the AU_length described in the au_information( ) as information about that video access unit, and further, the time stamp (PTS, DTS) added in units of video access units, to the video decoder control module 216.

After one video access unit has been read from the buffer 215A for supply to the video decoder control module 216 in step S216, the process proceeds to step S217, where the video reading function section 233 determines whether or not as many access units as the number_of_access_unit of the au_information( ) (FIG. 24) stored in the au_information( ) register 243 represents, have been processed.

In a case where it has been determined in step S217 that as many access units as the number_of_access_unit represents have not been processed yet, i.e., a case where as many access units as the number_of_access_unit represents have not been read from the buffer 215A for supply to the video decoder control module 216, the process returns to step S215, where similar processing is repeated thereafter.

In addition, in a case where it has been determined in step S217 that as many access units as the number_of_access_unit represents have been processed, i.e., a case where as many access units as the number_of_access unit represents have been read from the buffer 215A for supply to the video decoder control module 216, the process returns to step S211, where a next private_stream_2 PES_packet( ) is searched, and similar processing is repeated thereafter.

[Reading of an Audio Stream]

Figure 37:
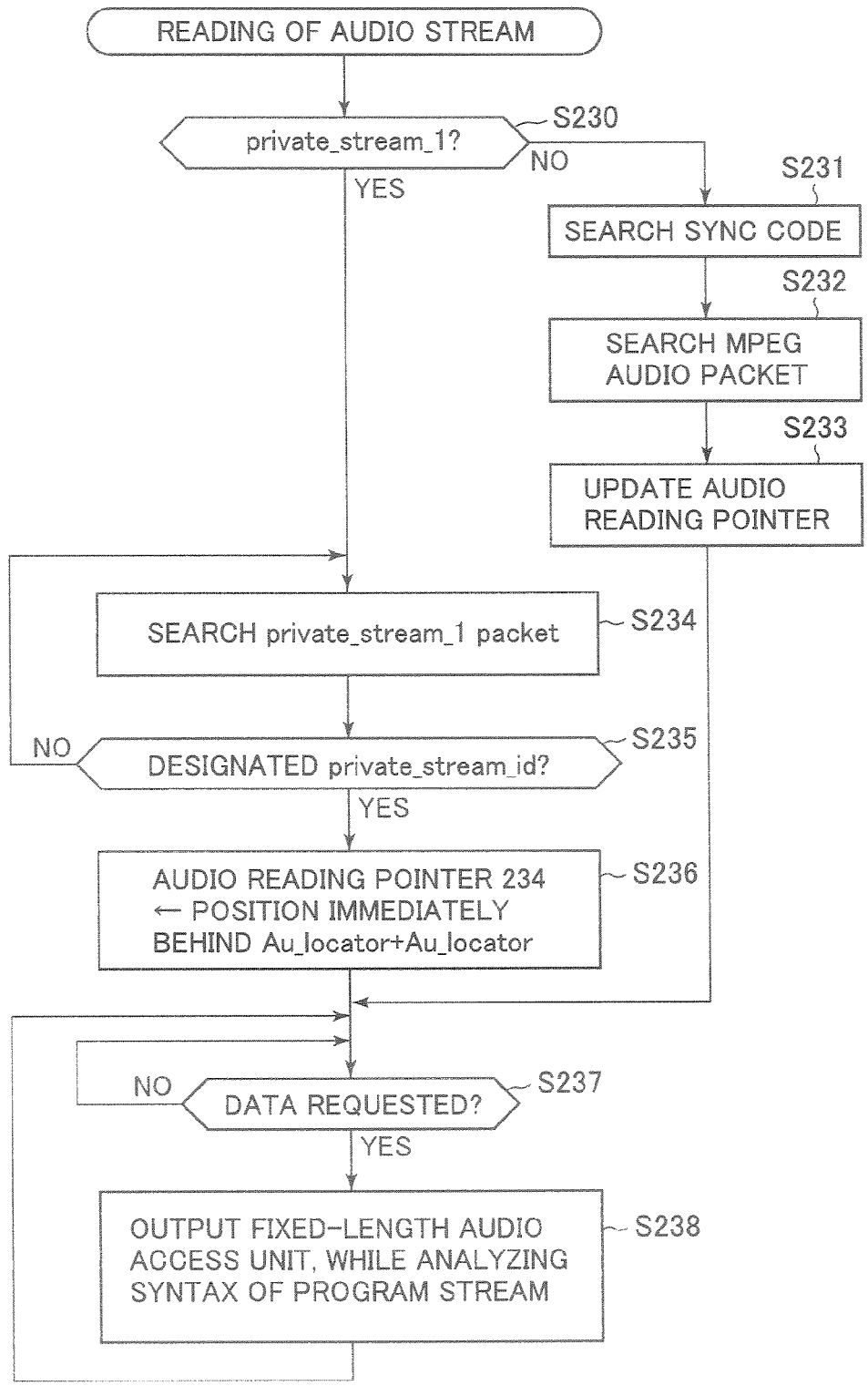
FIG. 37 is a flowchart for explaining audio stream reading processing.

Referring next to a flowchart of FIG. 37, details of processing of reading an audio stream from the buffer 215A performed by the audio reading function section 234 (FIG. 3) will be explained.

First, in step S230, the audio reading function section 234 determines whether or not the stream_id of the playback target audio stream stored in the stream_id register 252 (FIG. 3) in step S127 represents a private_stream_1 PES_packet( ).

In a case where it has been determined in step S230 that the stream_id stored in the stream_id register 252 does not represent a private_stream_1 PES_packet( ), i.e., a case where the stream_id stored in the stream_id register 252 is 110xxxxxB assigned to an audio stream coded in conformity with the MPEG standard, as explained above with reference to FIG. 20, the process proceeds to step S231, where the audio reading function section 234 searches through the program stream stored in the buffer 215A for a sync code representing the audio frame start defined by the MPEG Audio. Since the sync code position coincides with the audio frame start, the audio reading function section 234 updates the audio reading pointer so as to point at the audio frame start position, after which the process proceeds from step S231 to step S232.

In step S232, the audio reading function section 234 searches to find a PES_packet( ) coinciding with the stream_id stored in the stream_id register 252, in the program stream stored in the buffer 215A, after which the process proceeds to step S233.

In step S233, the audio reading function section 234 updates the audio reading pointer to point at the start of the PES_packet_data_byte (FIGS. 16 to 18) of the PES_packet( ) found in the immediately preceding step S232, after which the process proceeds to step S237.

In step S237, the audio reading function section 234 determines whether or not data is requested by the audio decoder control module 217, and if not, the process returns to step S237, to repeat similar processing.

In addition, in a case where it has been determined in step S237 that data is requested by the audio decoder control module 217, the process proceeds to step S238, where the audio reading function section 234 reads one audio access unit having the known fixed length from the buffer 215A, for supply to the audio decoder control module 217, together with the time stamp (PTS, DTS) added to the audio access unit, while analyzing the syntax of the program stream from the buffer 215A whose position is pointed at by the audio reading pointer.

And the audio reading function section 234 updates the audio reading pointer by a size equivalent to the one audio access unit read from the buffer 215A, after which the process returns to step S237, where similar processing is repeated thereafter.

Meanwhile, in a case where it has been determined in step S230 that the stream_id stored in the stream_id register 252 represents a private_stream_1 PES_packet( ), i.e., a case where the stream_id stored in the stream_id register 252 is 10111101B (=0xBD) to represent a private_stream_1 PES_packet( ) as explained above with reference to FIG. 20, the process proceeds to step S234, where the audio reading function section 234 searches to find a private_stream_1 PES_packet( ) in the program stream stored in the buffer 215A. Namely, the audio reading function section 234 searches to find a PES_packet( ) whose stream_id is set to 10111101B.

When having found the private_stream_1 PES_packet( ) in step S234, the process proceeds to step S235, where the audio reading function section 234 extracts the private_stream_id described in the private_stream1_PES_payload( ) (FIG. 21) being the PES_packet_data_byte of that private_stream_1 PES_packet( ), to determine whether or not that private_stream_id coincides with the private_stream_id of the playback target audio stream, stored in the private_stream_id register 253 (FIG. 3) in step S127 of FIG. 30.

In a case where it has been determined in step S235 that the private_stream_id does not coincide with the private_stream_id stored in the private_stream_id register 253, i.e., a case where the private_stream_1 PES_packet( ) found in the immediately preceding step S234 is not the playback target audio stream, the process returns to step S234, where the audio reading function section 234 searches for another private_stream_1 PES_packet( ) in the program stream stored in the buffer 215A, after which similarly processing is repeated.

Meanwhile, in a case where it has been determined in step S235 that the private_stream_id coincides with the private_stream_id stored in the private stream_id register 253, i.e., a case where the private_stream_1 PES_packet( ) found in the immediately preceding step S234 is the playback target audio stream, the process proceeds to step S236, where the audio reading function section 234 reads the AU_locator described in the private_stream1_PES_payload( ) (FIG. 21) of that private_stream_1 PES_packet( ) from the buffer 215A, and adds the position immediately behind the AU-locator and a value represented by the AU_locator together to obtain the start position of the audio access unit.

Namely, the AU_locator represents the start position of an audio access unit (or a subtitle access unit) stored in the private_payload( ) of the private_stream_PES_payload( ), using the position immediately behind that AU_locator as a reference, and thus, by adding, to the position immediately behind the AU_locator, the value represented by that AU_locator, the (absolute) start position of the audio access unit can be obtained.

Furthermore, in step S236, the audio reading function section 234 updates the audio reading pointer stored in the audio reading pointer storing section 251 to point at the start position of the audio access unit thus obtained, after which the process proceeds to step S237.

In step S237, the audio reading function section 234 determines whether or not data is requested by the audio decoder control module 217, and if not, the process returns to step S237 to repeat similar processing.

In addition, in a case where it has been determined in step S237 that data is requested by the audio decoder control module 217, the process proceeds to step S238, where the audio reading function section 234 reads one audio access unit having the known fixed length from the buffer 215A, for supply to the audio decoder control module 217, together with the time stamp added to that audio access unit, while analyzing the syntax of the program stream from the buffer 215A whose position is pointed at by the audio reading pointer.

And the audio reading function section 234 updates the audio reading pointer by a size equivalent to the one audio access unit read from the buffer 215A, after which the process returns to step S237, after which similar processing is repeated.

[Reading of a Subtitle Stream]

Figure 38:
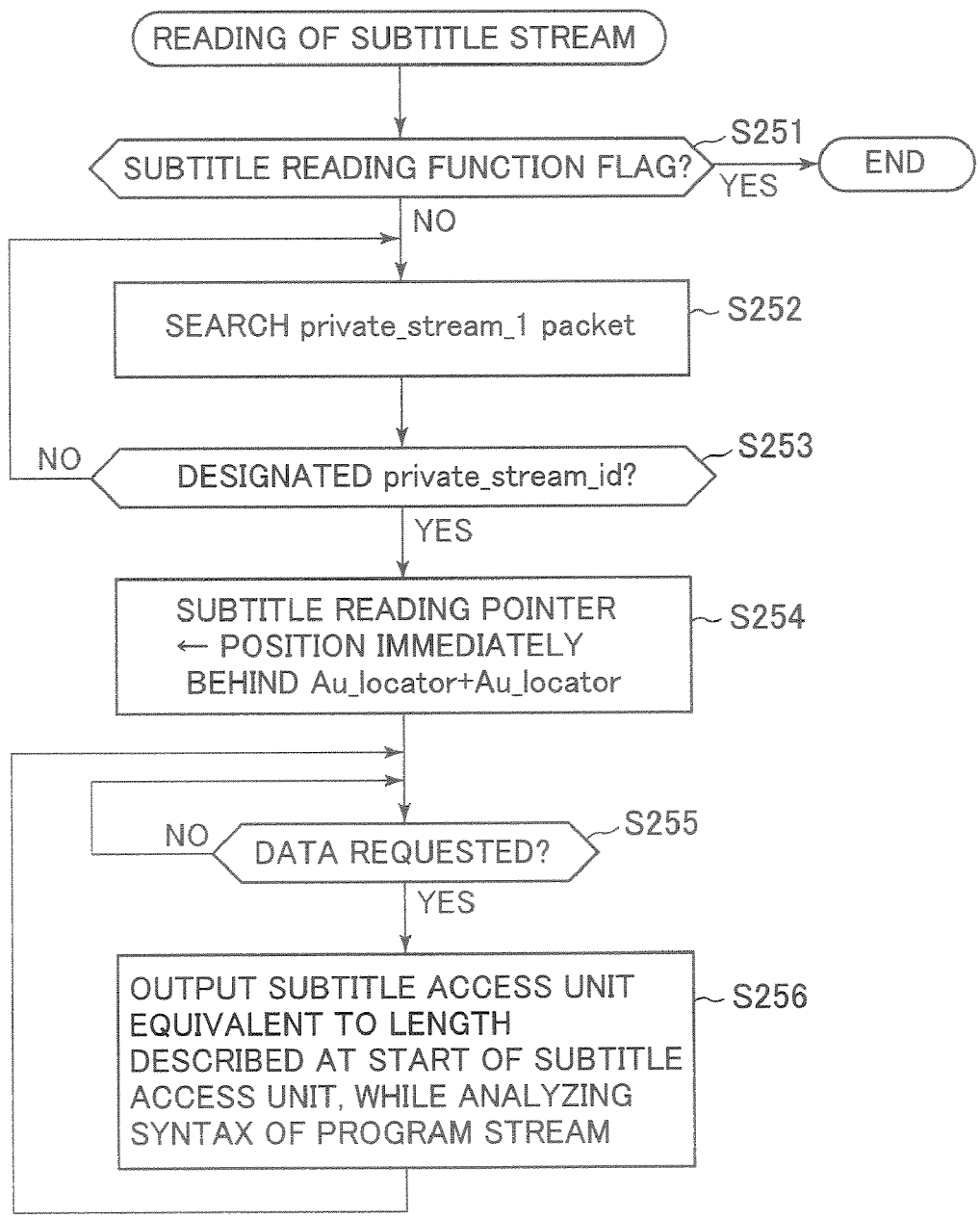
FIG. 38 is a flowchart for explaining subtitle stream reading processing.

Referring next to a flowchart of FIG. 38, details of processing of reading a subtitle stream from the buffer 215A performed by the subtitle reading function section 235 (FIG. 3) will be explained.

First, in step S251, the subtitle reading function section 235 determines the subtitle reading function flag stored in the subtitle reading function flag storing section 261 in step S127 of FIG. 30. In a case where it has been determined in step S251 that the subtitle reading function flag is set to 0, i.e., a case where, e.g., no subtitle stream is included in a clip stream file into which elementary streams for playback are multiplexed, and thus 0 has been set in the subtitle reading function flag storing section 261 in step S127 of FIG. 30, the subtitle reading function section 235 performs no processing in particular.

Meanwhile, in a case where it has been determined in step S251 that the subtitle reading function flag is set to 1, i.e., a case where, e.g., a subtitle stream is included in a clip stream file into which the playback target elementary streams are multiplexed, and thus 1 has been set in the subtitle reading function flag storing section 261 in step S127 of FIG. 30, the process proceeds to step S252, where the subtitle reading function section 235 searches through the program stream stored in the buffer 215A for a PES_packet( ) coinciding with the stream_id of the playback target subtitle stream stored in the stream_id register 264 (FIG. 3).

Here, while the stream_id of a playback target subtitle stream is stored in the stream_id register 263 (FIG. 3) as explained above with reference to step S127 of FIG. 30, the stream_id of a subtitle stream is 10111101B (=0xBD) representing a private_stream_1 PES_packet( ), as explained above with reference to FIG. 20.

Therefore, in step S252, a private_stream_1 PES_packet( ) in the program stream stored in the buffer 215A is to be searched.

When search for a private_stream_1 PES_packet( ) has been performed in step S252 and a private_stream_1 PES_packet( ) has been found, the process proceeds to step S253, where the subtitle reading function section 235 extracts the private_stream_id described in the private_stream1_PES_payload( ) (FIG. 21) being the PES_packet_data_byte of the private_stream_1 PES_packet( ), to determine whether or not that private_stream_id coincides with the private_stream_id of the playback target subtitle stream, stored in the private_stream_id register 264 (FIG. 3) in step S127 of FIG. 30.

In a case where it has been determined in step S253 that the private_stream_id described in the private_stream1_PES_payload( ) does not coincide with the private_stream_id stored in the private_stream_id register 264, i.e., a case where the private_stream_1 PES_packet( ) found in the immediately preceding step S252 is not the subtitle stream for playback, the process returns to step S252, where the subtitle reading function section 235 searches for another private_stream_1 PES_packet( ) in the program stream stored in the buffer 215A, after which similar processing is repeated.

Meanwhile, in a case where it has been determined in step S253 that the private_stream_id described in the private_stream1_PES_payload( ) coincides with the private_stream_id stored in the private_stream_id register 264, i.e., a case where the private_stream_1 PES_packet( ) found in the immediately preceding step S252 is the playback target subtitle stream, the process proceeds to step S254, where the subtitle reading function section 235 reads the AU_locator described in the private_stream1_PES_payload( ) (FIG. 21) of that private_stream_1 PES_packet( ) from the buffer 215A, and add the position immediately behind that AU_locator and a value represented by that AU_locator together to obtain the start position of a subtitle access unit.

Namely, the AU_locator represents the start position of a subtitle access unit (or an audio access unit) stored in the private_payload( ) of the private_stream1_PES_payload( ), using the position immediately behind that AU_locator as a reference, by adding, to the position immediately behind the AU_locator, the value represented by that AU_locator, the (absolute) start position of the subtitle access unit can be obtained.

Furthermore, in step S254, the subtitle reading function section 235 updates the subtitle reading pointer stored in the subtitle reading pointer storing section 262 to point at the start position of the subtitle access unit thus obtained, after which the process proceeds to step S255.

In step S255, the subtitle reading function section 235 determines whether or not data is requested by the subtitle decoder control module 218, and if not, the process returns to step S255 to repeat similar processing.

Furthermore, in a case where it has been determined in step S255 that data is not requested by the subtitle decoder control module 218, the process proceeds to step S256, where the subtitle reading function section 235 reads one subtitle access unit equaling a size described at the start of the subtitle access unit from the buffer 215A, for supply to the subtitle decoder control module 218, together with the time stamp added to that subtitle access unit, while analyzing the syntax of the program stream from the position in the buffer 215A pointed to by the subtitle reading pointer. Namely, as explained above with reference to FIG. 2, the size of the subtitle access unit is described at the start of the subtitle access unit, and the subtitle reading function section 235 reads data equivalent to the size from the buffer 215A position pointed to by the subtitle reading pointer, and supplies the subtitle access unit being the read data to the subtitle decoder control module 218, together with the time stamp added to that subtitle access unit.

And the subtitle reading function section 235 updates the subtitle reading pointer by a size equivalent to the one subtitle access unit read from the buffer 215A, after which the process returns to step S255, where similar processing is repeated thereafter.

[Re-synchronizing Processing]

Next, synchronization control between video data and audio data by the decode control module 214 of FIG. 2 will be explained.

As explained above with reference to step S130 of FIG. 30, the decode control module 214 instructs the video decoder control module 216, the audio decoder control module 217, and the subtitle decoder control module 218 to start decoding, with timings shifted, if necessary, for ensuring their synchronization. However, e.g., depending on the degree to which the decoding processing proceeds thereafter in the video decoder 116 and the audio decoder 117, output of video data, and output of audio data as output data to be outputted in synchronism with the video data, may run out of synchronism in some cases.

Therefore, the decode control module 214 performs re-synchronizing processing in which the out-of-synchronism occurring between output of video data and output of audio data as output data to be outputted in synchronism with the video data is corrected, thereby outputting the video data and the audio data in synchronism with each other.

Figure 39:
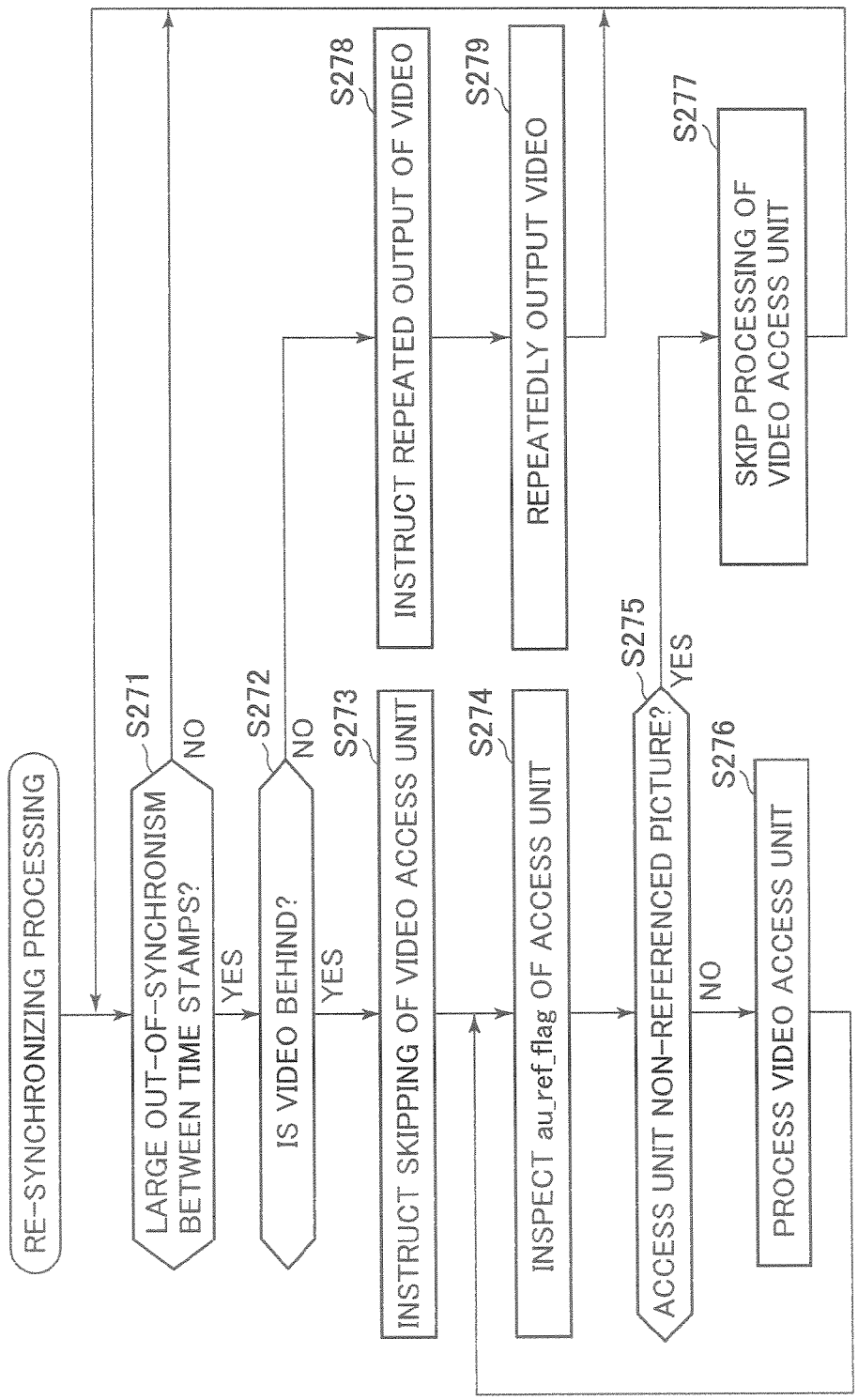
FIG. 39 is a flowchart for explaining re-synchronizing processing.

Referring to a flowchart of FIG. 39, the re-synchronizing processing will be explained.

In the re-synchronizing processing, first, in step S271, the decode control module 214 determines whether or not the time stamp of a video access unit from the video decoder control module 216 largely runs out of synchronism with the time stamp of an audio access unit from the audio decoder control module 217.

Namely, as described above with reference to step S129 of FIG. 30, every time a video access unit is acquired from the buffer control module 215, the video decoder control module 216 supplies the time stamp of the video access unit to the decode control module 214. Similarly, every time a audio access unit is acquired from the buffer control module 215, also the audio decoder control module 217 supplies the time stamp of the audio access unit to the decode control module 214.

In step S271, the decode control module 214 compares the time stamps supplied at the same timing (within a certain time interval which could be deemed to be the same timing) from both the video decoder control module 216 and the audio decoder control module 217, to determine whether or not the out-of-synchronism between these time stamps is large.

In a case where it has been determined in step S271 that the time stamp of the video access unit from the video decoder control module 216 does not run out of synchronism with the time stamp of the audio access unit from the audio decoder control module 217 so largely, i.e., a case where the out-of-synchronism between the time stamp of the video access unit and the time stamp of the audio access unit equals, e.g., two video frames (approximately 66 milliseconds) which is within the prescribed range in which they can be deemed to be in synchronism with each other, the process returns to step S271, where the decode control module 214 continues determining (monitoring) the out-of-synchronism between the time stamps.

Meanwhile, in a case where it has been determined in step S271 that the time stamp of the video access unit from the video decoder control module 216 runs out of synchronism with the time stamp of the audio access unit from the audio decoder control module 217 largely, i.e., a case where the out-of-synchronism between the time stamp of the video access unit and the time stamp of the audio access unit is beyond the prescribed range in which they can be deemed to be in synchronism with each other, the process proceeds to step S272, where the decode control module 214 compares the time stamp of the video access unit from the video decoder control module 216 with the time stamp of the audio access unit from the audio control module 217, thereby determining which one of the output (decoding) of the video data and the output of the audio data is behind.

In a case where it has been determined in step S272 that the output of the video data is behind the output of the audio data, the process proceeds to step S273, where the decoder control module 214 instructs the video decoder control module 216 not to decode and output (display) the video access unit, i.e., to skip its processing on the video access unit, in order to move forward its video access unit processing by one video access unit, after which the process proceeds to step S274.

In step S274, the video decoder control module 216 receives the skip instruction from the decode control module 214, and inspects the au_ref_flag (FIG. 24) supplied thereto from the buffer control module 215 together with the video access unit, in accordance with that skip instruction.

Figure 36:
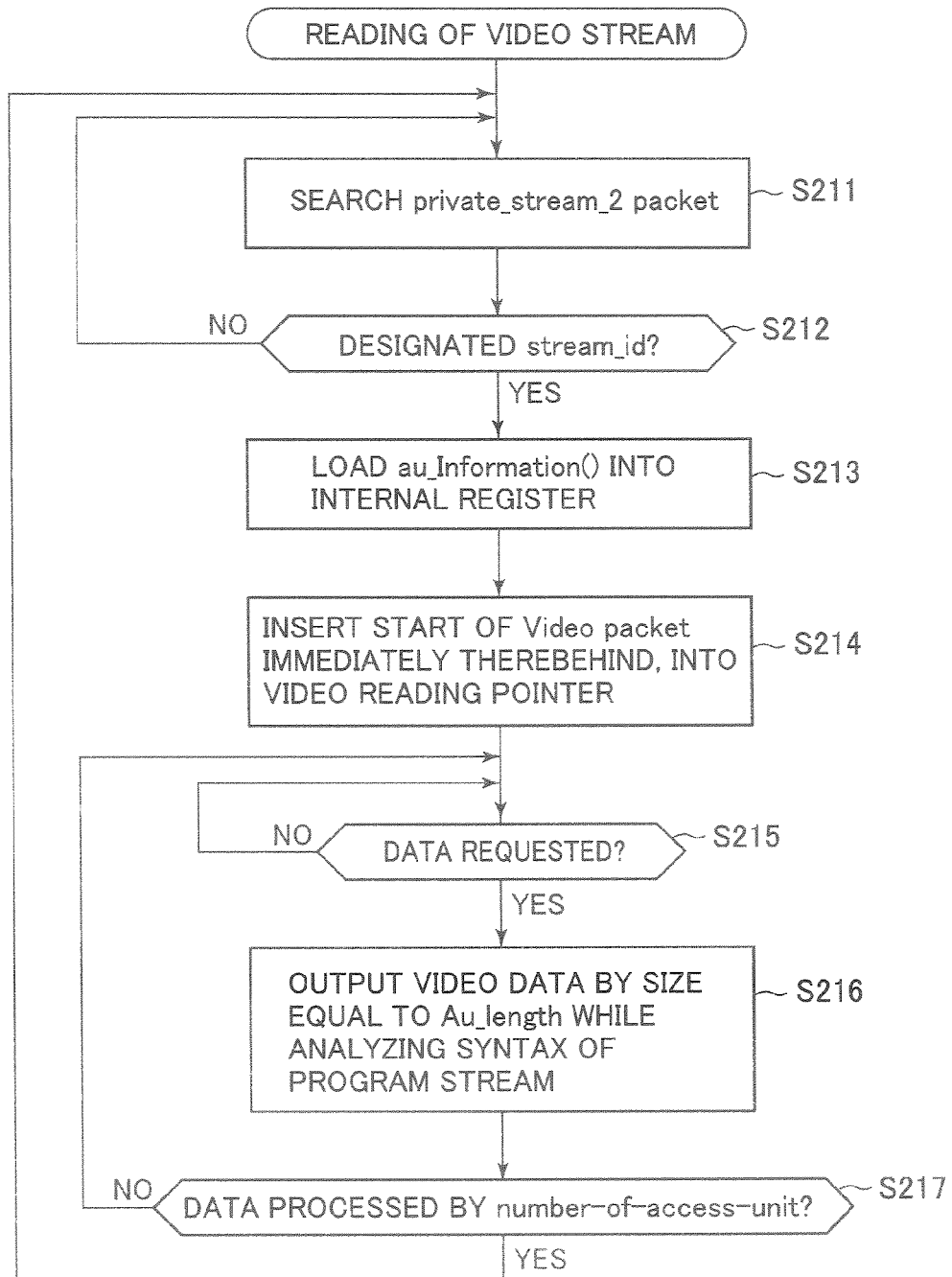
FIG. 36 is a flowchart for explaining video stream reading processing.

Namely, in the au_information( ) (FIG. 24) arranged in the private_stream2_PES_payload( ) (FIG. 23) of the private_stream_2 PES_packet, the au_ref_flag as access unit information is included, and the buffer control module 215 supplies, together with the video access unit, the au_ref_flag of that video access unit to the video decoder control module 216, as explained above with reference to step S129 of FIG. 30 and step S216 of FIG. 36.

In step S274, the au_ref_flag of the access unit thus supplied together with the access unit is inspected.

And the process proceeds from step S274 to step S275, where the video decoder control module 216 determines whether or not that video access unit is a non-reference picture which is not referred to in decoding other pictures, on the basis of the inspection result of the au_ref_flag of the video access unit supplied thereto from the buffer control module 215.

Here, as explained above with reference to FIG. 24, the au_ref_flag of a video access unit indicates whether the access unit is a reference picture or not, and if it is a reference picture, 1 is set, and if it is not a reference picture, 0 is set.

In a case where it has been determined in step S275 that the video access unit supplied from the buffer control module 215 is not (a video access unit which is) a non-reference picture, i.e., a case where the video access unit supplied from the buffer control module 215 is a reference picture, the process proceeds to step S276, where the video decoder control module 216 causes the video decoder 116 to process that video access unit as usual, after which the process returns to step S274, where the video decoder control module 216 waits until a next video access unit is supplied thereto from the buffer control module 215.

In addition, where it has been determined in step S275 that the video access unit supplied from the buffer control module 215 is a non-reference picture, the process proceeds to step S277, where the video decoder control module 216 allows the video decoder 116 to skip processing of that video access unit, after which the process returns to step S271, where the video decoder control module 216 waits until a next video access unit is supplied thereto from the buffer control module 215.

In this manner, by skipping processing of the video access unit, the video access unit processing is moved ahead approximately one video access unit (the processing time is reduced). As a result, the output of the video data which has been behind the output of the audio data is quickened.

Meanwhile, in a case where it has been determined in step S272 that the output of the video data is not behind the output of the audio data, i.e., a case where the output of audio data is behind output of video data, the process proceeds to step S278, where the decode control module 214 outputs an output repeating instruction for repeatedly outputting the video data corresponding to the video access unit currently being decoded, to the video decoder control module 216 in order to keep the video access unit processing from advancing, after which the process proceeds to step S279.

In step S279, the video decoder control module 216 receives the output repeating instruction from the decode control module 214, and, as so instructed, outputs the video data corresponding to the video access unit currently being decoded by the video decoder 116, repeatedly to the graphics processing module 219, after which the process returns to step S271, where the video decoder control module 216 waits until a next video access unit is supplied thereto from the buffer control module 215.

As in the above, the decode control module 214 determines whether or not output of video data is behind output of audio data, and if output of video data is behind output of audio data, instructs the video decoder control module 216 to skip processing one access unit. And the video decoder control module 216 determines whether the access unit is a reference picture or a non-reference picture on the basis of the au_ref_flag of that access unit for which skipping has been instructed, and if it is a non-reference picture, causes the video decoder 116 to skip processing the access unit for which the skipping has been instructed. Therefore, the output of the video data and the output of the audio data can be easily synchronized.

Namely, in a case where the access unit whose processing is to be skipped is a reference picture, the video data corresponding to that access unit needs to be decoded for reference during decoding of another access unit to be decoded thereafter. Therefore, in the synchronization control for synchronizing output of video data with output of audio data, once processing of an access unit being a reference picture has been skipped, another access unit referring to the reference picture cannot be decoded. Thus, the synchronization control results in noise in displaying the video data.

Therefore, it is desirable that an access unit be skipped which is not a reference picture, i.e., an access unit being a non-reference picture.

Meanwhile, in order to search for an access unit being a non-reference picture in a conventional elementary stream, the syntax of the elementary stream must be analyzed. For example, an elementary stream obtained by an encoding scheme conforming to the MPEG4-AVC has an extremely complicated syntax, and thus entails huge costs for syntax analysis.

By contrast, into a program stream stored in a clip stream file recorded on the disc 101, a private_stream_2 PES_packet( ) in which the private_stream2_PES_payload( ) (FIG. 23) being an extension of the PES_packet_data_byte is arranged, is multiplexed, besides a PES_packet( ) (FIGS. 16 to 18) in which a video access unit is arranged in the PES_packet_data_byte. And in the au_information( ) (FIG. 24) of the private_stream2_PES_payload( ), the au_ref_flag is described which indicates, for each of video access units therein, whether the video access unit is a reference picture or a non-reference picture. And the au_ref_flag is supplied to the video decoder control module 216 from the buffer control module 215, together with the corresponding video access unit. Therefore, the video decoder control module 216 inspects the au_ref_flag of a video access unit supplied thereto together with the video access unit, thereby it can recognize whether the video access unit is a reference picture or a non-reference picture with few costs.

[Mark Processing]

Figure 40:
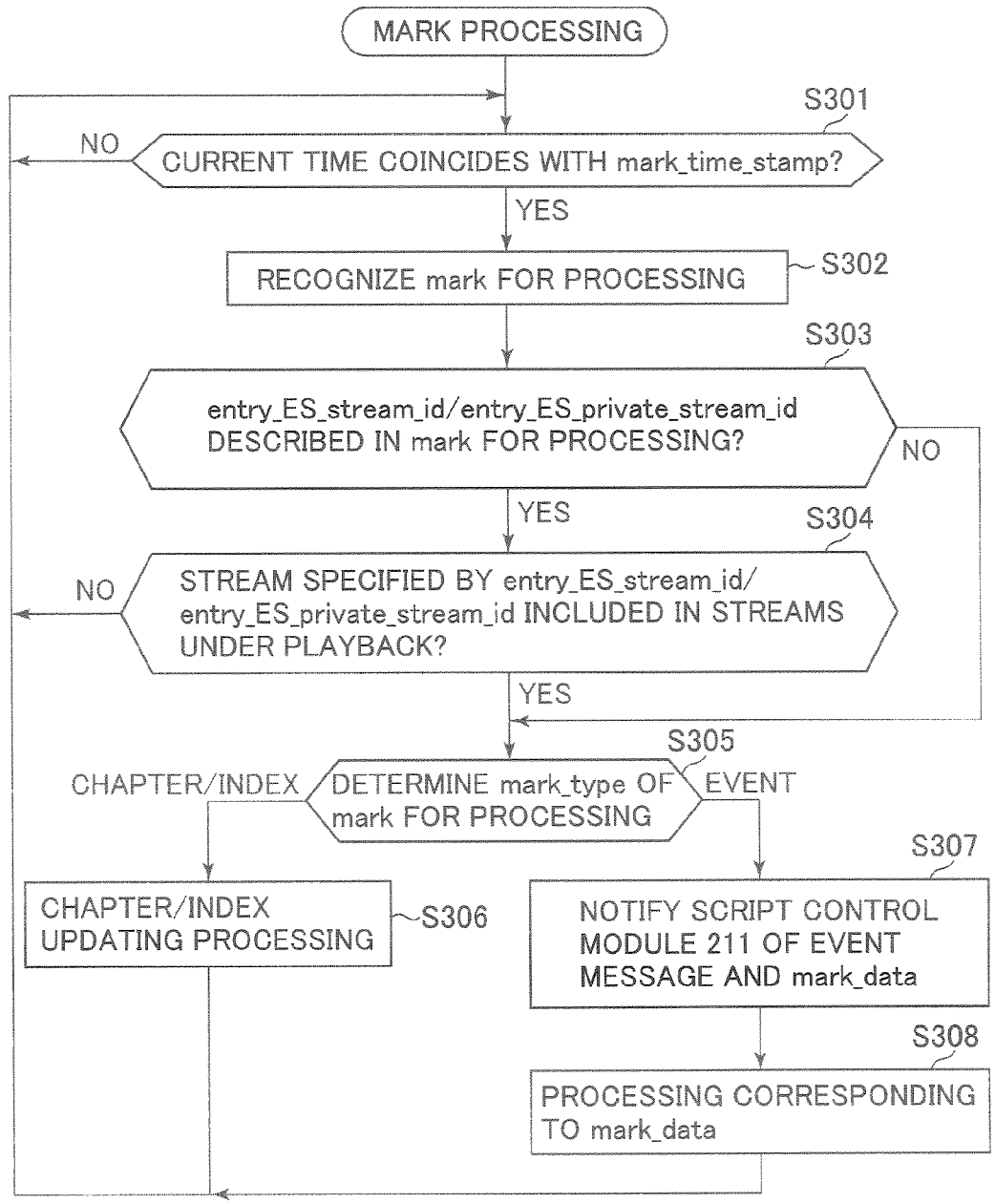
FIG. 40 is a flowchart for explaining mark processing.

Referring next to a flowchart of FIG. 40, mark processing performed on the basis of Mark( )'s described in a PlayListMark( ) (FIG. 7) will be explained.

The decode control module 214 constantly monitors a current time measured by the built-in time measuring section 214A, and determines in step S301 whether or not the current time coincides with the mark_time_stamp in either one of the Mark( )'s described in the PlayListMark( ) (FIG. 7).

Namely, as explained above with reference to step S124 of FIG. 30, the player control module 212 recognizes, when it is about to play back the first PlayItem#0 of the first PlayList#0 shown in FIG. 25, that the four Mark( )'s being the first to fourth ones of the seven Mark( )'s included in the PlayListMark( ) shown in the upper side of FIG. 28 belong to the first PlayItem#0 of the first PlayList#0, and delivers times {180, 090}, {5,580,090}, {10,980,090}, and {16,380,090} respectively being the mark_time_stamp's of those four Mark( )'s, to the decode control module 214, together with a message to the effect that the times represented by these mark_time_stamp's have the attribute "mark processing".

In step S301, the decode control module 214 determines whether or not the current time coincides with any of the times (mark_time_stamp's) whose attribute is "mark processing" supplied thereto from the player control module 212 in a manner such as mentioned above.

In a case where it has been determined in step S301 that the current time does not coincide with any of the times whose attribute is "mark processing", the process returns to step S301, where similar processing is repeated.

In addition, where it has been determined in step S301 that the current time coincides with any of the times whose attribute is "mark processing", the decode control module 214 supplies a message to the effect that the current time has reached a time whose attribute is "mark processing", and the time whose attribute is "mark processing" and which has coincided with the current time, to the player control modules 212, after which the process proceeds to step S302.

In step S302, the player control module 212 receives the message to the effect that the current time has reached a time whose attribute is "mark processing", and the time (mark_time_stamp) whose attribute is "mark processing" and which has coincided with the current time, from the decode control module 214, thereby recognizing a Mark( ) for which the mark_time_stamp has coincided with the current time, as a Mark( ) for the mark processing (hereinafter called "processing target mark" whenever appropriate).

Namely, the player control module 212 has recognized a PlayItem( ) of a PlayList( ) currently being played back, and thus recognizes a processing target mark by referring to a PlayListMark( ) (FIG. 7) in the "PLAYLIST.DAT" (FIG. 5) on the basis of both those PlayList( ) and PlayItem( ) and a time (mark_time_stamp) (hereinafter called "mark time") whose attribute is "mark processing" and which has coincided with a current time from the decode control module 214.

Specifically, let it now be supposed, e.g., that the first PlayItem#0 of the first PlayList#0 shown in FIG. 25 is under playback. Then, from this fact, the player control module 212 recognizes that the mark time is any of the mark_time_stamp's of the four Mark( )'s being the first to fourth ones of the seven Mark( )'s included in the PlayList Mark( ) shown in the upper side of FIG. 28.

And if it is supposed that the mark time supplied to the player control module 212 from the decode control module 214 is, e.g., 16,380,090, the player control module 212 recognizes the fourth Mark( ) whose mark_time_stamp coincides with 16,380,090 being the mark time, of the four Mark( )'s being the first to fourth Mark( )'s included in the PlayListMark( ) shown in the upper side of FIG. 28, as the processing target mark.

When the player control module 212 has thus recognized the processing target mark, the process proceeds from step S302 to step S303, where the player control module 212 determines whether or not the entry_ES_stream_id and the entry_ES_private_stream_id (FIG. 7) for specifying an elementary stream are described in the processing target mark.

In a case where it has been determined in step S303 that the entry_ES_stream_id and the entry_ES_private_stream_id (FIG. 7) for specifying an elementary stream are not described in the processing target mark, i.e., a case where both the entry_ES_stream_id and the entry_ES_private_stream_id are set to 0x00, the process skips step S304 to proceed to step S305, where the processing corresponding to the processing target mark is thereafter performed.

In addition, in a case where it has been determined in step S303 that the entry_ES_stream_id and the entry_ES_private_stream_id (FIG. 7) for specifying an elementary stream are described in the processing target mark, the process proceeds to step S304, where the player control module 212 determines whether or not the elementary stream specified by that entry_ES_stream_id, and further, if necessary, the entry_ES_private_stream_id is included in the elementary streams under playback.

In a case where it has been determined in step S304 that the elementary stream specified by the entry_ES_stream_id and the entry_ES_private_stream_id is not included, the process returns to step S301. Namely, in a case where the elementary stream specified by the entry_ES_stream_id and the entry_ES_private_stream_id of the processing target mark is not being played back, the processing target mark is neglected.

Meanwhile, in a case where it has been determined in step S304 that the elementary stream specified by the entry_ES_stream_id and the entry_ES_private_stream_id of the processing target mark is included, i.e., a case where the elementary stream specified by the entry_ES_stream_id and the entry_ES_private_stream_id of the processing target mark is being played back, the process, deeming the processing target mark to be valid, proceeds to step S305, where the processing corresponding to the processing target mark is performed thereafter.

Namely, in step S305, the player control module 212 refers to the mark_type (FIG. 7) of the processing target mark, whereby to determine that processing target mark.

In a case where it has been determined in step S305 that the processing target mark is a chapter mark or an index mark, i.e., a case where the mark_type of the processing target mark is 'Chapter' or 'Index', the process proceeds to step S306, where the player control module 212 instructs the graphics processing module 219 to update display of a chapter or index number with a chapter or index number represented by the chapter or index mark being the processing target mark, after which the process returns to step S301.

In addition, in a case where it has been determined in step S305 that the processing target mark is an event mark, i.e., the mark_type of the processing target mark is 'Event', the process proceeds to step S307, where the player control module 212 sends (supplies) an event message representing occurrence of an event, and the mark_data of the processing target mark, to the script control module 211, after which the process proceeds to step S308.

In step S308, the script control module 211 receives the event message and the mark_data from the player control module 212, and performs a series of processing described beforehand in the "SCRIPT.DAT" file using the event message as an interrupt request and using the mark_data as an argument, after which the process returns to step S301.

Namely, in the script control module 211, the processing corresponding to the mark_data is performed.

Specifically, e.g., in the PlayListMark( ) of the PlayList#1 shown in the lower side of FIG. 28, both the second Mark( ) (Mark#1) and the third Mark( ) (Mark#2) have their mark_type set to 'Event', but have their mark_data set to different values, i.e., 1 (Mark#1) and 2 (Mark#2), respectively.

In both of a case where having received the event message corresponding to the second Mark( ) and a case where having received the event message corresponding to the third Mark( ), the script control module 211 performs processing using the same event handler (an interrupt processing routine) in response to the event messages. By inspecting the mark_data's respectively supplied together with the event messages, within the event handler, the script control module 211 performs different processing on the event message for each mark_data.

Specifically, e.g., in a case where the mark_data is 1, the script control module 211 controls the graphics processing module 219 to display a first type of icon. In addition, e.g., in a case where the mark_data is 2, the script control module 211 controls the graphics processing module 219 to display a second type of icon.

Note that the mark_data is not limited to 1 and 2. Likewise, the processing performed so as to correspond to the mark_data is not limited to those above-mentioned, simple display of icons.

Namely, e.g., in a case where the mark_data is any of values ranging from 3 to 18, the script control module 211 controls the graphics processing module 219 to display the first type of icon under the luminance corresponding to a value (from 1 to 16) obtained by subtracting 2 from the mark_data. In addition, e.g., in a case where the mark_data is any of values ranging from 19 to 34, the script control module 211 controls the graphics processing module 219 to display the second type of icon under the luminance corresponding to a value (from 1 to 16) obtained by subtracting 18 from the mark_data.

In another case, e.g., where a controller controlled by the user is connected to the input interface 115 (FIG. 1) and further the controller incorporates therein a vibrating motor with decentered weight attached to the shaft of its DC (Direct Current) motor thereby causing vibrations upon operation of the DC motor, when the mark_data takes any of values ranging from 35 to 42, the vibrating motor can be caused to operate as long as the operating time corresponding to a value (from 1 to 8) obtained by subtracting 34 from the mark_data.

The mark_data is a numerical value, and its method of use and algorithm can be described by the script program executed by the script control module 211. Therefore, it is possible to use the mark_data not only in compliance with prescribed rules, but also rules independently set by the manufacturer of the disc 101, or a content provider or the like which provides data recorded on the disc 101.

As in the above, in the mark processing, when a current time coincides with a time whose attribute is "mark processing", a processing target mark is recognized from a mark time being the time whose attribute is "mark processing". Furthermore, where the entry_ES_stream_id and the entry_ES_private_stream_id for specifying an elementary stream are not described in the processing target mark, the processing corresponding to the mark_type of the processing target mark is performed. In addition, even where the entry_ES_stream_id and the entry_ES_private_stream_id for specifying an elementary stream are described in the processing target mark, if the elementary stream specified by those entry_ES_stream_id and entry_ES_private_stream_id is under playback, the processing corresponding to the mark_type of the processing target mark is performed.

Therefore, supposing, e.g., that the second PlayList#1 shown in FIG. 25 is now being played back, below-described mark processing is performed.

Namely, in the PlayListMark( ) of the second PlayList#1, as shown in the lower side of FIG. 28, the first Mark( ) (Mark#0), the second Mark( ) (Mark#1), and the third Mark( ) (Mark#2), whose mark_time_stamp's are set to 90,000, 27,090,000, and 27,540,000, are described, respectively.

Furthermore, in the PlayListMark( ) of the lower side of FIG. 28, 0xE0 and 0xE1 are described in the entry_ES_stream_id's of the second Mark( ) and the third Mark( ), respectively, and thus, elementary streams whose stream_id's are specified by 0xE0 and 0xE1 are associated with the second Mark( ) and the third Mark( ).

Here, as explained above with reference to FIG. 25, only one PlayItem( ) (PlayItem#0) is described in the second PlayList#1, and according to the PlayItem#0, the clip stream file "00003.PS" is to be played back. And, into the clip stream file "00003.PS", the three elementary streams, i.e., the video stream stream#0 specified by the stream_id being set to 0xE0, the video stream stream#1 specified by the stream_id being set to 0xE1, and the audio stream stream#2 specified by the stream_id being set to 0xBD and the private_stream_id being set to 0x00, are multiplexed, as explained above with reference to the clip information file "000003.CLP" of FIG. 26 corresponding to that clip stream file "00003.PS".

Therefore, with the second Mark( ) of the PlayListMark( ) of the lower side of FIG. 28, the video stream stream#0 whose stream_id is set to 0xE0, multiplexed into the clip stream file "000003.PS" is associated, whereas with the third Mark( ), the video stream stream#1 whose stream_id is set to 0xE1, multiplexed into the clip stream file "00003.PS" is associated.

In a case where playback of the PlayItem#0 of the second PlayList#1 of FIG. 25 is to be started, the player control module 212 recognizes, in a manner such as explained above with reference to step S124 of FIG. 30, that the three Mark( )'s included in the PlayListMark( ) shown in the lower side of FIG. 28 belong to the PlayItem#0 of the PlayList#1, and deliver the times {90,000}, {27,090,000}, and {27,540,000} being the mark_time_stamp's of the three mark( )'s, to the decode control module 214, together with a message to the effect that the times represented by these mark_time_stamp's have the attribute "mark processing".

In the mark processing, the decode control module 214 is constantly checking if the current time measured by the time measuring section 214A coincides with any of the times {90,000}, {27,090,000}, and {27,540,000}, all having the attribute "mark processing", during playback of the PlayItem#0 of the PlayList#1 (step S301), and when the current time coincides with a time whose attribute is "mark processing", supplies the mark time being the time whose attribute is "mark processing" and which has coincided with the current time, and a message to the effect that the current time has reached the time whose attribute is "mark processing", to the player control module 212.

Namely, let it now be supposed, e.g., that the current time coincides with the time 27,090,000, of the times {90,000}, {27,090,000}, and {27,540,000}, all having the attribute "mark processing". Then, the decode control module 214 supplies the mark time 27,090,000 being the time whose attribute is "mark processing" and which has coincided with the current time, and a message to the effect that the current time has reached the time whose attribute is "mark processing", to the player control module 212.

The player control module 212 has recognized that the PlayItem#0 of the PlayList#1 is currently being played back, and thus, by comparing each of the times {90,000}, {27,090,000}, and {27,540,000} being the mark_time_stamp's of the three Mark( )'s belonging to the PlayItem#0, among the Mark( )'s described in the PlayListMark( ) shown in the lower side of FIG. 28, of that PlayList#1, with the time 27,090,000 being the mark time from the decode control module 214, the player control module 212 recognizes a Mark( ) whose mark_time_stamp coincides with that mark time 270,090,000, i.e., the second Mark( ) (Mark#1) described in the PlayList Mark( ) of the lower side of FIG. 28, as the processing target mark (step S302).

In the second Mark( ) being the processing target mark, described in the PlayListMark( ) in the lower side of FIG. 28, 0xE0 is designated as the entry_ES_stream_id. This entry_ES_stream_id set to 0xE0 represents the video stream stream#0 (FIG. 26) whose stream_id is set to 0xE0, multiplexed into the clip stream file "00003.PS", according to what has been mentioned above. Thus, the player control module 212 determines whether or not that video stream stream#0 is included in the elementary streams under playback (steps S303, S304).

And in a case where the video stream stream#0 is not included in the elementary streams under playback, the processing target mark is neglected (step S304).

Meanwhile, in a case where the video stream stream#0 is included in the elementary streams under playback, the processing target mark is deemed to be valid, and thus the processing according to the processing target mark is performed (steps S305 to S308).

Namely, in the present case, the second Mark( ) being the processing target mark, described in the PlayListMark( ) in the lower side of FIG. 28 has its mark_type set to 'Event', and thus is an event mark. Therefore, the player control module 212 supplies an event message representing occurrence of an event, and the mark_data of the processing target mark, to the script control module 211 (steps S305, S307). And the script control module 211 performs a series of processing described beforehand in the "SCRIPT.DAT" file using the event message from the player control module 212 as an interrupt request, and using the mark_data supplied together with that event message as the argument (step S308).

As in the above, according to the mark processing, it is determined whether or not a current time, which is a playback time of a clip steam file being played back according to a PlayList( ) (FIG. 5) including a PlayListMark( ) (FIG. 7) having zero or more mark( )'s, each including the mark_time_stamp representing a single playback time on the time axis of the PlayList( ), the mark_type representing the type of the Mark( ), and the mark_data serving as the argument of an event mark, coincides with the mark_time_stamp, and in a case where the current time coincides with the mark_time_stamp, a Mark( ) having the mark_time_stamp equaling the mark time being the current time which has coincided therewith, is recognized as the processing target mark. Furthermore, in a case where the mark_type of the processing target mark represents a type for causing an event to occur, i.e., a case where the processing target mark is an event mark, the mark_data of the processing target mark and an event message are sent, thereby the processing corresponding to the mark_data is executed. Therefore, the processing corresponding to a mark_data can be executed, according to a playback time of a clip stream file.

[Output Attribute Control Processing]

Referring next to a flowchart of FIG. 41, details of the output attribute control processing performed in, e.g., step S126 of FIG. 30 will be explained.

As explained above with reference to step S126 of FIG. 30, the player control module 212 first examines the number_of_DynamicInfo (FIG. 10) representing the number of DynamicInfo( )'s (FIG. 13), in each of which the output attribute is described, as to each of one or more playback target elementary streams, i.e., one or more elementary streams to be played back determined in step S125 of FIG. 30.

And where the number_of_DynamicInfo is set to 0 as to all of the one or more playback target elementary streams, the player control module 212 performs no processing in particular.

Figure 41:
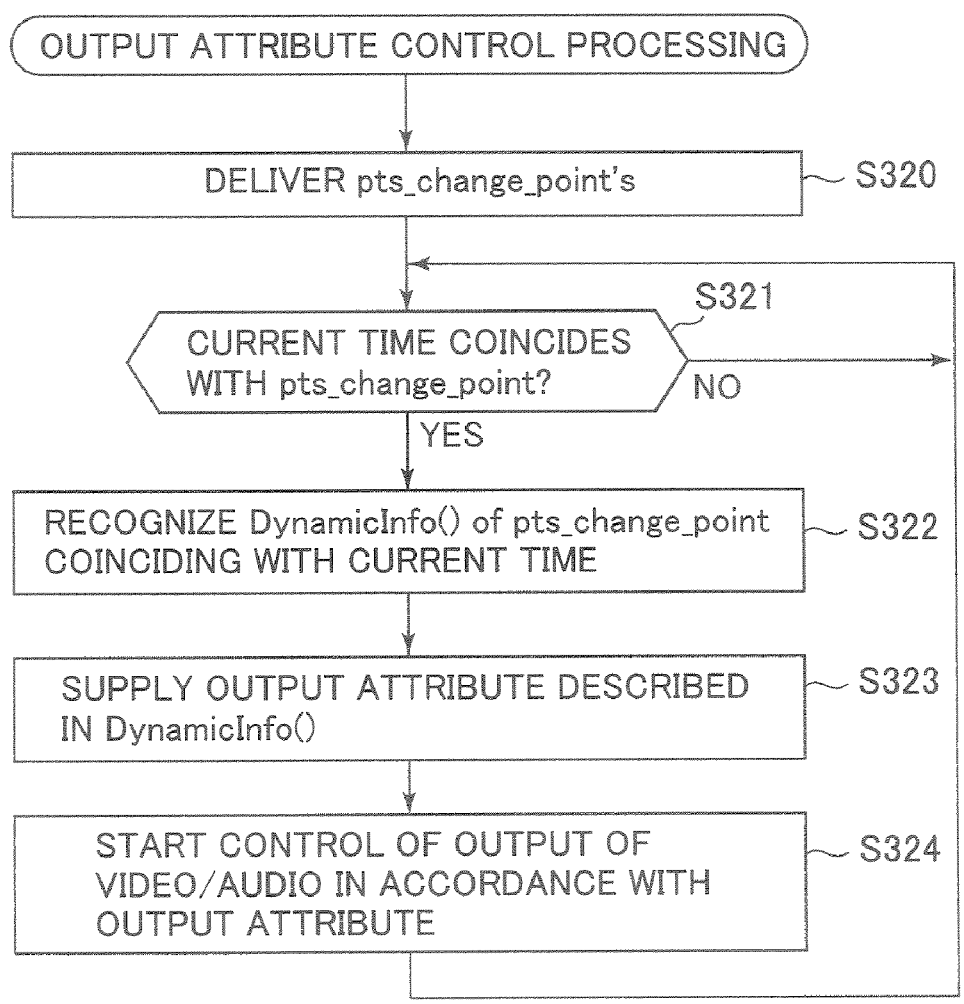
FIG. 41 is a flowchart for explaining output attribute control processing.

Meanwhile, where the number_of_DynamicInfo as to the playback target elementary stream(s) is not 0, the player control module 212 performs the output attribute control processing according to the flowchart of FIG. 41.

Therefore, in a case where the three clip information files "00001.CLP", "00002.CLP", and "00003.CLP" recorded on the disc 101 are so configured as shown in, e.g., FIG. 26, when (the first PlayItem#0 of the first PlayList#0 for playing back) the clip stream file "00001.PS" corresponding to the clip information file "00001.CLP" is to be played back, the output attribute control processing is not performed, since in the clip information file "00001.CLP" (FIG. 26), the number_of_DynamicInfo is set to 0 as to all the four elementary streams stream#0 to stream#3 multiplexed into the clip stream file "00001.PS".

Similarly, when (the second PlayItem#1 of the first PlayList#0 for playing back) the clip stream file "00002.PS" corresponding to the clip information file "00002.CLP" is to be played back, the output attribute control processing is not performed, either, since in the clip information file "00002.CLP" (FIG. 26), the number_of_DynamicInfo is set to 0 as to all the four elementary streams stream#0 to stream#3 multiplexed into the clip stream file "00002.PS".

Meanwhile, when (the PlayItem#0 of the second PlayList#1 for playing back) the clip stream file "00003.PS" corresponding to the clip information file "00003.CLP" is to be played back, the output attribute control processing is performed, since in the clip information file "00003.CLP" (FIG. 26), the number_of_DynamicInfo's are set to 2 and 3, not 0, as to the video stream stream#0 being the first elementary stream and the audio stream stream#2 being the third elementary stream, of the three elementary streams stream#0 to stream#2 multiplexed into the clip stream file "00003.PS".

Namely, in the output attribute control processing, first, in step S320, the player control module 212 delivers pts_change_point's described in the clip information file Clip( ) (FIG. 10) corresponding to a playback target clip stream file, to the decode control module 214, together with a message to the effect that they are times whose attribute is "DynamicInfo( ) processing", and the decode control module 214 receives these pts_change_point's being the times whose attribute is "DynamicInfo( ) processing", after which the process proceeds to step S321.

In step S321, the decode control module 214 determines whether or not the current time being measured by the time measuring section 214A coincides with (any of) the pts_change_point's being the times whose attribute is "DynamicInfo( ) processing", and if it is determined that they do not coincide with each other, the process returns to step S321.

Furthermore, in a case where it has been determined in step S321 that the current time coincides with (any of) the times whose attribute is "DynamicInfo( ) processing", the decode control module 214 supplies a message to the effect that the current time has reached a time whose attribute is "DynamicInfo( ) processing", and the time whose attribute is "DynamicInfo( ) processing" and which has coincided with the current time (hereinafter called "DynamicInfo time" whenever appropriate), to the player control module 212, after which the process proceeds to step S322.

In step S332, the player control module 212 receives the message to the effect that the current time has reached a time whose attribute is "DynamicInfo( ) processing", and the DynamicInfo time, from the decode control module 214, and recognizes the DynamicInfo( ) paired with the pts_change_point (FIG. 10) which has coincided with the DynamicInfo time, as a processing target DynamicInfo( ) being a DynamicInfo( ) to be processed, after which the process proceeds to step S323.

In step S323, the player control module 212 supplies the output attribute described in the DynamicInfo( ) (FIG. 13), recognized as the processing target DynamicInfo( ), to the graphics processing module 219 or the audio output module 221, after which the process proceeds to step S324.

In step S324, the graphics processing module 219 or the audio output module 221 starts controlling output of video data or audio data, in accordance with the output attribute supplied thereto from the player control module 212 in the immediately preceding step S323, respectively, after which the process returns to step S321.

As a result, the video data is outputted in accordance with, e.g., the aspect ratio described as an output attribute (display mode), or the audio data is outputted according to, e.g., 'Stereo' or 'Dual' (bilingual) described as an output attribute (output mode).

Referring next to FIG. 42, details of the output attribute control processing will further be explained.

Namely, FIG. 42 shows pts_change_point/DynamicInfo( ) sets (FIG. 10) described in the clip information file "00003.CLP" of FIG. 26.

Here, as mentioned above, as to the video stream stream#0 being the first elementary stream and the audio stream stream#2 being the third elementary stream, of the three elementary streams stream#0 to stream#2 multiplexed into the clip stream file "00003.PS", their number_of_DynamicInfo's are set to 2 and 3, respectively, in the clip information file "00003.CLP" of FIG. 26. Therefore, in the clip information file "000003.CLP", two pts_change_point/DynamicInfo( ) sets are described in the first video stream stream#0, and three pts_change_point/DynamicInfo( ) sets are described in the third audio stream stream#2, of the clip stream file "00003.PS".

The upper side of FIG. 42 shows the two pts_change_point/DynamicInfo( ) sets described in the first video stream stream#0 of the clip stream file "00003.PS", and the lower side of FIG. 42 shows the three pts_change_point/DynamicInfo( ) sets described in the third audio stream stream#2 of the clip stream file "00003.PS".

Note that in the upper side of FIG. 42, besides the two pts_change_point/DynamicInfo( ) sets described in the first video stream stream#0, the stream_id (=0xE0), the private_stream_id (=0x00), and the number_of_DynamicInfo (=2) described in the clip information file "00003.CLP" of FIG. 26 are also shown, as to that video stream stream#0. Similarly, in the lower side of FIG. 42, besides the three pts_change_point/DynamicInfo( ) sets described in the third audio stream stream#2, the stream_id (=0xBD), the private_stream_id (=0x00), and the number_of_DynamicInfo (=3) described in the clip information file "00003.CLP" of FIG. 26 are also shown, as to that audio stream stream#2.

In the upper side of FIG. 42, in the first one of the two pts_change_point/DynamicInfo( ) sets described in the video stream stream#0, the pts_change_point is set to 90,000, and the display_aspect_ratio (FIG. 13) of the DynamicInfo( ) to '4:3'. Furthermore, in the second set, the pts_change_point is set to 54,090,000, and the display_aspect_ratio of the DynamicInfo( ) to '16:9'.

Meanwhile, in the lower side of FIG. 42, in the first one of the three pts_change_point/DynamicInfo( ) sets described in the video stream stream#2, the pts_change_point is set to 90,000, and the channel_assignment (FIG. 13) of the DynamicInfo( ) to 'Dual'. Furthermore, in the second set, the pts_change_point is set to 27,090,000, and the channel_assignment of the DynamicInfo( ) to 'Stereo'. Furthermore, in the third set, the pts_change_point is set to 32,490,000, and the channel_assignment of the DynamicInfo( ) to 'Dual'.

Let it now be supposed, e.g., that the first video stream stream#0 specified by the stream_id being set to 0xE0 and the third audio stream stream#2 specified by the stream_id being set to 0xBD and the private_stream_id being set to 0x00, of the clip stream file "00003.PS" have been determined in step S125 of FIG. 30 as playback target streams.

In this case, the player control module 212 examines the pts_change_point's in the two pts_change_point/DynamicInfo( ) sets in the upper side of FIG. 42, described as to the video stream stream#0 specified by the stream_id being set to 0xE0, and the pts_change_point's in the three pts_change_point/DynamicInfo( ) sets in the lower side of FIG. 42, described as to the audio stream stream#2 specified by the stream_id being set to 0xE0 and the private_stream_id being set to 0x00, to recognize an initial value.

Namely, in the first one of the two pts_change_point/DynamicInfo( ) sets in the upper side of FIG. 42, described as to the video stream stream#0 specified by the stream_id being set to 0xE0, the pts_change_point is set to 90,000. And this time being 90,000 coincides with the time 90,000 described in the presentation_start_time representing the start time of the clip stream file "00003.PS", in the clip information file "00003.CLP" of FIG. 26 corresponding to the clip stream file "00003.PS" into which the video stream stream#0 is multiplexed.

Similarly, in the first one of the three pts_change_point/DynamicInfo( ) sets in the lower side of FIG. 42, described as to the audio stream stream#2 specified by the stream_id being set to 0xE0 and the private_stream_id being set to 0x00, the pts_change_point is set to 90,000. And this time being 90,000 coincides with the time 90,000 described in the presentation_start_time representing the start time of the clip stream file "00003.PS", in the clip information file "00003.CLP" of FIG. 26 corresponding to the clip stream file "00003.PS" into which the audio stream stream#2 is multiplexed.

The player control module 212 recognizes, as the initial value, the pts_change_point which coincides with the time 90,000 described in the presentation_start_time representing the start time of the clip steam file "00003.PS". Therefore, the pts_change_point in the first one of the two pts_change_point/DynamicInfo( ) sets in the upper side of FIG. 42, and the pts_change_point in the first one of the three pts_change_point/DynamicInfo( ) sets in the lower side of FIG. 42 are recognized as the initial point.

And the player control module 212 designates, in accordance with the DynamicInfo( ) paired with the pts_change_point recognized as the initial value, the output attribute of each of the corresponding elementary streams (in step S126 of FIG. 30), before starting playback of the clip stream file "00003.PS".

Namely, as to the video stream stream#0 specified by the stream_id being set to 0xE0, the display_aspect_ratio is set to '4:3' in the DynamicInfo( ) paired with the pts_change_point being set to 90,000 as the initial value in the upper side of FIG. 42. In this case, the player control module 212 controls the graphics processing module 219, using output attribute information to the effect that the display_aspect_ratio is '4:3', i.e., that the video stream#0 is video data whose aspect ratio is '4:3'.

Furthermore, as to the audio stream stream#2 specified by the stream_id being set to 0xBD and the private_stream_id being set to 0x00, the channel_assignment is set to 'Dual' in the DynamicInfo( ) paired with the pts_change_point being set to 90,000 as the initial value in the lower side of FIG. 42. In this case, the player control module 212 supplies output attribute information to the effect that the channel_assignment is 'Dual', i.e., that the audio stream#2 is audio data whose channel assignment is 'Dual', to the audio output module 221.

Here, in step S126 of FIG. 30, the output attribute control processing for a pts_change_point as an initial value, such as mentioned above, is performed.

Thereafter, the player control module 212 delivers the times {27,090,000}, {32,490,000}, and {54,090,000} being the times other than the initial value 90,000, of the times 90,0000 and 54,090,000 being the two pts_change_point's in the upper side of FIG. 42 as to the video stream stream#0, and the times 90,0000, 27,090,000, and 32,490,000 being the three pts_change_point's in the lower side of FIG. 42 as to the audio stream stream#2, to the decode control module 214, together with a message to the effect that these are the times whose attribute is "DynamicInfo( ) processing" (step S320).

The decode control module 214 receives the times {27,090,000}, {32,490,000}, and {54,090,000} whose attribute is "DynamicInfo( ) processing", from the player control module 212, and further, after starting playback of the video stream stream#0 and the audio stream stream#2 (playback of the PlayItem#0 of the second PlayList#1 for playing back the clip stream file "00003.PS"), starts monitoring the current time being measured by the time measuring section 214A.

And in a case where the current time coincides with any of the times {27,090,000}, {32,490,000}, and {54,090,000} whose attribute is "DynamicInfo( ) processing", the decode control module 214 supplies the DynamicInfo time being the time whose attribute is "DynamicInfo( ) processing" which has coincided with that current time, to the player control module 212 (step S321).

Namely, let it be supposed, e.g., that the current time has reached 27,090,000. Then, the decode control module 214 supplies the time 27,090,000 coinciding with the current time, of the times whose attribute is "DynamicInfo( ) processing", to the player control module 212, as the DynamicInfo time.

The player control module 212 receives the time 27,090,000 being the DynamicInfo time from the decode control module 214, and then examines a pts_change_point coinciding with the time 27,090,000 being the DynamicInfo time, from among the two pts_change_point's in the upper side of FIG. 42 as to the video stream stream#0 and the three pts_change_point's in the lower side of FIG. 42 as to the audio stream stream#2, to recognize the DynamicInfo( ) paired with the pts_change_point coinciding with the time 27,090,000, i.e., the second DynamicInfo( ) in the lower side of FIG. 42 as to the audio stream stream#2, as the processing target DynamicInfo( ) (step S322).

In a case where the DynamicInfo( ) is the DynamicInfo( ) as to the video stream, the player control module 212 supplies the output attribute described in the processing target DynamicInfo( ), to the graphics processing module 219 (step S323). Furthermore, in a case where the processing target DynamicInfo( ) is the DynamicInfo( ) as to the audio stream, the player control module 212 supplies the output attribute described in the processing target DynamicInfo( ), to the audio output module 221 (step S323).

If the output attribute is supplied thereto from the player control module 212, the graphics processing module 219 starts controlling output of the video data, in accordance with that output attribute (step S324).

Namely, the graphics processing module 219 converts the aspect ratio of the video data to be outputted to the video output module 220, on the basis of, e.g., the aspect ratio designation (display_aspect_ratio (FIG. 13)) for the video data, represented by the output attribute from the player control module 212, and the aspect ratio of the video output apparatus connected to the video output terminal 120 of FIG. 1.

Specifically, e.g., in a case where the aspect ratio of the video output apparatus is 16:9, when the aspect ratio designation for the video data as the output attribute represents 4:3, the graphics processing module 219 squeezes the video data to be outputted to the video output module 220 lengthwise, for output, leaving both left and right sides in black. In addition, e.g., in a case where the aspect ratio of the video output apparatus is 4:3, when the aspect ratio designation for the video data as the output attribute represents 16:9, the graphics processing module 219 squeezes the video data to be outputted to the video output module 220 heightwise, for output, leaving both upper and lower sides in black. Furthermore, e.g., in a case where both the aspect ratio of the video output apparatus and the aspect ratio designation for the video data as the output attribute are the same as being 4:3 or 16:9, the graphics processing module 219 directly outputs the video data to be outputted to the video output module 220, without squeezing.

Here, according to the two pts_change_point/DynamicInfo( ) sets described as to the video stream stream#0 specified by the stream_id being set to 0xE0 in the upper side of FIG. 42, video data whose aspect ratio is 4:3 is obtained from the video stream stream#0, from the time 90,000 being the playback start time of the video stream stream#0 to a time immediately ahead of the time 54,090,000. And after the time 54,090,000 on, video data whose aspect ratio is 16:9 is obtained from the video stream stream#0.

Therefore, if the aspect ratio of the video output apparatus connected to the video output terminal 120 of FIG. 1 is 4:3, in the graphics processing module 219, the video data whose aspect ratio is 4:3 obtained from the video stream stream#0 is directly supplied to the video output apparatus whose aspect ratio is 4:3 for display thereon, from the time 90,000 to the time immediately ahead of the time 54,090,000.

And after the time 54,090,000 on, the video data whose aspect ratio is 16:9 obtained from the video stream stream#0 is squeezed heightwise, and furthermore converted into a video signal by which the video data is to be displayed in an aspect ratio of 4:3 with both upper and lower sides in black, for supply to and display on the video output apparatus whose aspect ratio is 4:3.

Meanwhile, when having been supplied with the output attribute from the player control module 212, the audio output module 221 starts controlling output of the audio data in accordance with that output attribute.

Namely, the audio output module 221 processes the audio data from the audio decoder control module 217, on the basis of, e.g., the channel assignment designation (channel_assignment (FIG. 13)) for the audio data, represented by the output attribute from the player control module 212, and the audio output mode supplied thereto from the player control module 212 via the input interface 115 (FIG. 1) by the user having controlled the remote control, for output to the audio output terminal 121 (FIG. 1).

Specifically, e.g., in a case where the channel assignment designation for the audio data represented by the output attribute represents the 'Dual' (bilingual) mode in which the left channel carries the "main audio" audio data and the right channel carries the "sub audio" audio data, the audio output module 221 processes the audio data from the audio decoder control module 217 in accordance with the audio output mode supplied thereto from the player control module 212, for output to the audio output terminal 121.

Namely, when, e.g., the "main audio" is designated as the audio output mode, the audio output module 221 copies the left-channel audio data of the audio data from the audio decoder control module 217 as the right-channel audio data, and outputs the resultant left- and right-channel audio data ("main audio" audio data) to the audio output terminal 121. Furthermore, when the "sub audio" is designated as the audio output mode, the audio output module 221 copies the right-channel audio data of the audio data from the audio decoder control module 217 as the left-channel audio data, and outputs the resultant left-channel and right-channel audio data ("sub audio" audio data) to the audio output terminal 121. Furthermore, when the "main/sub audio" is designated as the audio output mode, the audio output module 221 outputs the audio data from the audio decoder control module 217 to the audio output terminal 121 without further processing.

Furthermore, in a case where the channel assignment designation for the audio data represented by the output attribute represents the 'Stereo' mode, the audio output module 221 outputs the audio data from the audio decoder control module 217, to the audio output terminal 121 without further processing, irrespective of the audio output mode supplied thereto from the player control module 212.

Here, according to the three pts_change_point/DynamicInfo( ) sets described as to the audio stream stream#2 specified by the stream_id being set to 0xBD and the private_stream_id being set to 0x00 in the lower side of FIG. 42, the 'Dual' audio data is obtained from the audio stream stream#2, from the time 90,000 being the playback start time of the audio stream stream#2 to a time immediately ahead of the time 27,090,000. In addition, the 'Stereo' audio data is obtained from the audio stream stream#2, from the time 27,090,000 to a time immediately ahead of the time 32,490,000, and after the time 32,490,000 on, the 'Dual' audio data is obtained from the audio stream stream#2.

Therefore, if the "main audio" is designated as the audio output mode, in the audio output module 221, the left-channel audio data of the 'Dual' audio data obtained from the audio stream stream#2 is copied as the right-channel audio data, from the time 90,000 to the time immediately ahead of the time 27,090,000, and the resultant left-channel and right-channel audio data is outputted to the audio output terminal 121.

Furthermore, the 'Stereo' audio data obtained from the audio stream stream#2 is outputted to the audio output terminal 121 without further processing, from the time 27,090,000 to the time immediately ahead of the time 32,490,000.

And after the time 32,490,000 on, the left-channel audio data of the dual audio data obtained from the video stream stream#2 is copied as the right-channel audio data, and the resultant left-channel and right-channel audio data is outputted to the audio output terminal 121.

As in the above, in the output attribute control processing, it is determined, for each of elementary streams multiplexed into the clip stream file, whether or not the playback time of the elementary stream under playback coincides with any pts_change_point, on the basis of a description in a clip information file Clip( ) (FIG. 10) including zero or more sets, each composed of a pts_change_point representing the playback time of the elementary stream, and a DynamicInfo( ) including the output attribute of the elementary stream. And in a case where the playback time of the elementary stream under playback coincides with a pts_change_point, the DynamicInfo( ) paired with the pts_change_point is recognized, and according to the output attribute included in the recognized DynamicInfo( ), output of the elementary stream under playback is controlled. Therefore, it becomes possible to control output of an elementary stream in accordance with the playback time and output attribute of the elementary stream.

[Subtitle Display Control Processing]

Referring next to a flowchart of FIG. 43, subtitle display control processing for controlling display of the subtitle data corresponding to a subtitle stream will be explained.

Upon start of playback of (a PlayItem( ) in) a PlayList( ) (FIG. 5), the player control module 212 initializes, in step S341, the subtitle data display mode instruction to the graphics processing module 219. Namely, the player control module 212 controls the graphics processing module 219 to set the subtitle data display mode to the default display mode. Note that the initialization of the display mode instruction performed in step S341 corresponds to the initialization of the display mode instruction described above with reference to step S127 of FIG. 30.

After the processing of step S341, the process proceeds to step S342, where the player control module 212 determines whether or not a new display mode instruction has been given via the input interface 115 by the user having controlled the remote control, as to display of subtitle data.

In a case where it has been determined in step S342 that a new display mode instruction has been given, the process proceeds to step S343, where the player control module 212 determines whether or not (the subtitle data corresponding to) a subtitle stream is currently being played back.

In a case where it has been determined in step S343 that a subtitle stream is not being played back, the process goes back to step S342.

In addition, in a case where it has been determined in step S343 that a subtitle stream is being played back, the process proceeds to step S345, where the player control module 212 determines whether or not the new display mode instruction is a default display mode instruction. In a case where it has been determined in step S343 that the new display mode instruction is a default display mode instruction, the process returns to step S341, where the player control module 212 controls the graphics processing module 219 to set the subtitle display mode to the default display mode, as mentioned above.

Meanwhile, in a case where it has been determined in step S345 that the new display mode instruction is not a default display mode instruction, i.e., a case where the new display mode instruction is a non-default display mode instruction, such as, e.g., displaying the subtitle data as enlarged or reduced, improving viewing conditions by changing the luminance, or the like, the process proceeds to step S346, where the player control module 212 acquires the Static Info( ) about the subtitle stream it is currently playing back, of the StaticInfo( )'s (FIG. 12) in the clip information file Clip( ) (FIG. 10) corresponding to a clip stream file into which the subtitle stream it is currently playing back is multiplexed, after which the process proceeds to step S347.

In step S347, the player control module 212 determines the configurable_flag of the StaticInfo( ) acquired in step S346.

In a case where it has been determined in step S347 that the configurable_flag is set to 0 meaning that it is not permitted to change the subtitle data display mode, the process proceeds to step S348, where the player control module 212 controls the graphics processing module 219 to overlay an error message to the effect that the subtitle data display mode cannot be changed, on the output video data, after which the process returns to step S342. As a result, the error message is displayed.

Meanwhile, in a case where it has been determined in step S347 that the configurable_flag is set to 1 meaning that it is permitted to change the subtitle data display mode, the process proceeds to step S349, where the player control module 212 supplies the new display mode instruction supplied thereto from the input interface 115 by the user having controlled the remote control, to the graphics processing module 219, after which the process proceeds to step S350.

In step S350, the graphics processing module 219 starts processing, such as enlarging or reducing, or changing the luminance of, the subtitle data supplied thereto from the subtitle decoder control module 218, according to the display mode instruction supplied thereto from the player control module 212 in the immediately preceding step S349, after which the process returns to step S342. As a result, the subtitle data is displayed, e.g., in the display size, position, and color corresponding to the display mode instructed by the user having controlled the remote control.

Meanwhile, in a case where it has been determined in step S342 that a new display mode instruction is not given, the process proceeds to step S351, where the player control module 212 determines whether or not change of PlayItem( )'s explained above with reference to FIG. 31 has been made, and if not, the process returns to step S342.

Furthermore, in a case where it has been determined in step S351 that change of PlayItem's is made, the process returns to step S341, where the player control modules 212 controls the graphics processing module 219 so as to set the subtitle data display mode to the default display mode, as mentioned above. Namely, in this case, when change of PlayItem( )'s has been made, the subtitle data display mode is put back to the default display mode.

As in the above, in the subtitle display control processing, only in the case where the configurable_flag of a subtitle stream is set to 1 meaning that it is permitted to change its display mode, the subtitle display mode corresponding to the subtitle stream is changed according to a display mode instruction inputted, e.g., by the user having controlled the remote control.

Therefore, according to, e.g., the clip information file "00001.CLP" shown in FIG. 26, the configurable_flag as to the subtitle stream stream#2 being the third elementary stream, of the four elementary streams multiplexed into the corresponding clip stream file "00001.PS" is set to 0 meaning that it is not permitted to change the display mode, and thus, even when the user controls the remote control so as to change subtitle display with the subtitle stream stream#2 displayed, that display is not changed.

Meanwhile, the configurable_flag as to the subtitle stream stream#3 being the fourth elementary stream, of the four elementary streams multiplexed into the corresponding clip stream file "00001.PS" is set to 1 meaning that it is permitted to change the display mode, and thus, when the user controls the remote control so as to change display of the subtitle with the subtitle stream stream#3 displayed, the display size and the like of the subtitle is changed in response to the control.

Namely, let it now be supposed, e.g., that the clip stream file "00001.PS" is being played back, in accordance with the first PlayItem#0 of the first PlayList#0 of FIG. 25. Furthermore, let it be supposed, as explained above with reference to the clip information file "00001.CLP" of FIG. 26, that, while the third and fourth ones of the four elementary streams multiplexed into the clip stream file "00001.PS" are subtitle streams, of the third subtitle stream stream#2 and the fourth subtitle stream stream#3, e.g., the third subtitle stream stream#2 is currently being played back.

When the user inputs a subtitle display mode instruction by controlling the remote control (step S342), the display mode instruction is supplied to the player control module 212 from the input interface 115 (FIG. 1). When having been supplied with the display mode instruction, the player control module 212 searches through the clip information file for the StaticInfo( ) (FIG. 10) corresponding to the subtitle stream under playback (step S346).

Namely, in the present case, the subtitle stream under playback is the third subtitle stream stream#2 multiplexed into the clip stream file "00001.PS", and thus, the player control module 212 searches through the corresponding clip information file "00001.CLP" for the StaticInfo( ) as to the third subtitle stream stream#2.

Furthermore, the player control module 212 determines the configurable_flag being set to 0, described in the StaticInfo( ) as to the third subtitle stream stream#2 in FIG. 26 (step S347), thereby recognizing that it is not permitted to change the display mode as to the third subtitle stream stream#2.

In this case, the player control module 212, judging that (the subtitle data corresponding to) the subtitle stream under playback is not ready for enlargement/reduction and the like, controls the graphics processing module 219 such that the graphics processing module 219 generates an error message to that effect (step S348) and overlays the error message on the video data for output.

Meanwhile, in a case where the fourth subtitle stream stream#3, not the third subtitle stream stream#2, is currently being played back, of the third subtitle stream stream#2 and the fourth subtitle stream stream#3 in the four elementary streams multiplexed into the clip stream file "00001.PS", the player control module 212 having been supplied with a display mode instruction by the user having controlled the remote control, searches through the corresponding clip information file "00001.CLP" for the StaticInfo( ) as to the fourth subtitle stream stream#3.

Furthermore, the player control module 212 judges the configurable_flag being set to 1, described in the StaticInfo( ) as to the fourth subtitle stream stream#3 in FIG. 26 (step S347), thereby recognizing that it is permitted to change the display mode as to the fourth subtitle stream stream#3.

In this case, the player control module 212, judging that (the subtitle data corresponding to) the subtitle stream under playback is ready for enlargement/reduction and the like, supplies the display mode instruction supplied thereto by the user having controlled the remote control, to the graphics processing module 219 (step S349).

As a result, the graphics processing module 219 thereafter, e.g., enlarges or reduces the subtitle data from the subtitle decoder control module 218, in accordance with the display mode instruction from the player control module 212, and overlays the resultant subtitle data on the video data from the video decoder control module 216, for output.

Note that the player control module 212 initializes the subtitle data display mode instruction to the graphics processing module 219 at the time of starting playback of a first PlayItem( ) of a PlayList( ) (step S341). Namely, the player control module 212 controls the graphics processing module 219 such that the subtitle data display mode is set to the default display mode.

Furthermore, the player control module 212 initializes the subtitle data display mode instruction to the graphics processing module 219, also at the time of changing PlayItem( )'s (steps S341, S351).

However, at the time of changing PlayItem( )'s, the player control module 212 examines the configurable_flag as to a new subtitle stream to be played back in accordance with a PlayItem( ) to be newly played back thereafter, and in a case where the configurable_flag is 0, the player control module 212 can initialize the subtitle data display mode instruction to the graphics processing module 219, whereas in a case where the configurable_flag is 1, the player control module 212 can leave the display mode instruction to the graphics processing module 219 as it is before changing PlayItem( )'s.

Furthermore, in the subtitle display control processing of FIG. 43, in a case where a new display mode instruction has been inputted by the user having controlled the remote control, it is configured to supply the new display mode instruction to the graphics processing module 219 (step S349). However, it can be configured such that, e.g., the display mode instruction is stored in a nonvolatile memory forming the memory 113 (FIG. 1) and the display mode instruction stored in the nonvolatile memory is supplied to the graphics processing module 219.

Namely, e.g., in a case where a user-defined display mode instruction is stored in the nonvolatile memory as the initial setting of the disc apparatus of FIG. 1 and a new display mode instruction has been inputted by the user having controlled the remote control, it can be configured such that the display mode instruction stored in the nonvolatile memory is updated with the new display mode instruction on one hand, and the display mode instruction stored in the nonvolatile memory is supplied to the graphics processing module 219 on the other. In this case, the display mode instruction at the time of the last playback end is held in the nonvolatile memory, and thus, at the time of playback of a next PlayList( ), the user can start displaying subtitle data in that display mode without having to input the display mode instruction at the time of the last playback end, again by controlling the remote control.

Note that in this case, the display mode instruction for storage in the nonvolatile memory is supposed to include, e.g., an enlargement ratio or a reduction ratio for enlargement or reduction of the subtitle data, and the like.

As in the above, according to the subtitle display control processing, a StaticInfo( ) as to subtitle data is acquired, which is the StaticInfo( ) of each of elementary streams included in a clip information file Clip( ) (FIG. 10) and which does not change during playback of the elementary stream, and it is determined whether or not it is permitted to change display of subtitle data under playback from the default display mode, on the basis of the configurable_flag indicating whether or not it is permitted to change display of subtitle data from the default display mode. And in a case where it is permitted to change display of subtitle data under playback from the default display mode, processing of displaying the subtitle data is performed according to the subtitle display mode changing instruction; i.e., for example, processing of displaying the subtitle data as enlarged or reduced, or with its display color changed is performed. Therefore, change of the subtitle data display mode can be controlled.

[Capture Control Processing]

Referring next to a flowchart of FIG. 44, capture control processing for controlling capture of the video data corresponding to a video stream will be explained. Note that in FIG. 44, along with the flowchart for explaining the capture control processing, a flowchart for explaining background/screen saver processing, which is an example of processing performed for secondary use of video data captured by the capture control processing is also shown.

When, e.g., the user controls the remote control to thereby supply a capture instruction for instructing capture of video data, to the player control module 212 via the input interface 115 (FIG. 1), the capture control processing is started.

Namely, in the capture control processing, first, in step S317, it is determined whether or not the player control module 212 is playing back a video stream, and if not, the capture control processing ends.

Meanwhile, in a case where it has been determined in step S371 that the player control module 212 is playing back a video stream, the process proceeds to step S372, where the player control module 212 acquires the capture_enable_flag_PlayList from the PlayList( ) (FIG. 5) corresponding to the video stream under playback, and also acquires the capture_enable_flag_Clip from the clip information file Clip( ) (FIG. 10) corresponding to the video stream under playback.

Here, the capture_enable_flag_PlayList in a PlayList( ) indicates whether or not secondary use is permitted of the video data (video data belonging to the PlayList( )) corresponding to a video stream to be played back by the PlayList( ), as explained above with reference to FIG. 5. Furthermore, the capture_enable_flag_Clip in a clip information file Clip( ) indicates whether or not secondary use is permitted of the video data corresponding to a video stream stored in the clip stream file corresponding to the clip information file Clip( ), as explained above with reference to FIG. 10.

After the processing of step S372, the process proceeds to step S373, where the player control module 212 determines whether or not capture is enabled of the picture of video data having been played back when the capture instruction has been inputted from the input interface 115 (FIG. 1), on the basis of the capture_enable_flag_PlayList and the capture_enable_flag_Clip acquired in the immediately preceding step S372.

In a case where it has been determined in step S373 that capture is disabled of the picture of video data having been played back when the capture instruction has been inputted from the input interface 115 (FIG. 1), i.e., a case where at least one of the capture_enable_flag_PlayList and the capture_enable_flag_Clip acquired in the immediately preceding step S372 is set to 0 meaning that secondary use of the video data is not permitted, the process proceeds to step S374, where the player control module 212 controls the graphics processing module 219 to overlay an error message to the effect that capture of the video data is disabled, and ends the capture control processing. As a result, the error message is displayed.

Meanwhile, in a case where it has been determined in step S373 that capture is enabled of the picture of the video data having been played back when the capture instruction has been inputted from the input interface 115, i.e., a case where both of the capture_enable_flag_PlayList and the capture_enable_flag_Clip acquired in the immediately preceding step S372 is set to 1 meaning that secondary use of the video data is permitted, the process proceeds to step S375, where the player control module 212 supplies an instruction for capturing the picture of the video data having been played back when the capture instruction has been inputted from the input interface 115, to the graphics processing module 219, after which the process proceeds to step S376.

In step S376, the graphics processing module 219 captures the picture of the video data from the video decoder control module 216, according to the capture instruction from the player control module 212, for storage in the memory 113 (FIG. 1), and thereafter ends the capture control processing. Note that in a case where the capture_enable_flag is formed of a plurality of bits to impose access restrictions, such restrictions are properly handled at this point of the processing. Namely, in a case where a restriction is imposed on the size of a picture captured, a reduced picture is captured at this point of the processing.

In addition, where a restriction is imposed on usable applications, a flag for informing the user to that effect is recorded simultaneously.

As in the above, in the capture control processing, only in a case where the capture_enable_flag_PlayList of the PlayList( ) (FIG. 5) and the capture_enable_flag_Clip of the clip information file Clip( ) (FIG. 10), corresponding to a video stream being played back when the user has given a capture instruction are ANDed and the result is 1, i.e., only in a case where both the capture_enable_flag_PlayList and the capture_enable_flag_Clip are set to 1 meaning that secondary use is permitted, secondary use of the video data is judged to be enabled, and thus, capture is performed.

Therefore, e.g., in a case where the video stream is being played back in accordance with the first PlayItem#0 of the first PlayList#0 in FIG. 25, i.e., the video stream multiplexed into the clip stream file "00001.PS" is being played back, when the user has given a capture instruction, the capture_enable_flag_PlayList in the first PlayList#0 is 1, and the capture_enable_flag_Clip in the clip information file "00001.CLP" of FIG. 26 corresponding to the clip stream file "00001.PS" to be played back by that first PlayItem#0 is 1, and thus, secondary use of the video data under playback (the video data corresponding to the video stream multiplexed into the clip stream file "00001.PS") is judged to be enabled. Therefore, capture is performed.

In addition, e.g., in a case where the video stream is being played back in accordance with the second PlayItem#1 of the first PlayList#0 in FIG. 25, i.e., the video stream multiplexed into the clip stream file "00002.PS" is being played back, when the user has given a capture instruction, the capture_enable_flag_PlayList in the first PlayList#0 is 1, and the capture_enable_flag_Clip in the clip information file "00002.CLP" of FIG. 26 corresponding to the clip stream file "00002.PS" to be played back by that second PlayItem#1 is 0, and thus, secondary use of the video data under playback (the video data corresponding to the video stream multiplexed into the clip stream file "00002.PS") is judged to be disabled. Therefore, capture is not performed.

Furthermore, e.g., in a case where the video stream is being played back in accordance with the PlayItem#0 of the second PlayList#1 in FIG. 25, i.e., the video stream multiplexed into the clip stream file "00003.PS" is being played back, when the user has given a capture instruction, the capture_enable_flag_PlayList in the second PlayList#0 is 0, and the capture_enable_flag_Clip in the clip information file "00003.CLP" of FIG. 26 corresponding to the clip stream file "00003.PS" to be played back by that PlayItem#0 of the second PlayList#1 is 1, and thus, secondary use of the video data under playback (the video data corresponding to the video stream multiplexed into the clip stream file "00003.PS") is judged to be disabled. Therefore, capture is not performed.

Note that in this case, upon confirmation that the capture_enable_flag_PlayList in the second PlayList#1 is 0, it can be judged that second use of the video data is disabled, and thus, confirmation of the capture_enable_flag_Clip in the clip information file "00003.CLP" of FIG. 26 corresponding to the clip stream file "00003.PS" to be played back by the PlayItem#0 of the second PlayList#1 can be omitted.

The picture captured by the capture control processing and stored in the memory 113 can be subjected to secondary use in the background/screen saver processing.

The background/screen saver processing is performed, e.g., when the player control module 212 is operating, but elementary streams are not being played back, i.e., for example, when the disc 101 is not inserted into the disc drive 102 (FIG. 1), or when playback of elementary streams has ended.

Namely, in the background/screen saver processing, in step S381, the player control module 212 controls the graphics processing module 219 to display the picture stored in the memory 113 by the capture control processing. The graphics processing module 219 displays the picture stored in the memory 113 by the capture control processing, in accordance with control by the player control module 212.

Here, if the graphics processing module 219 displays the picture stored in the memory 113 as a still picture, so-called wallpaper (background) can be realized. And, if the picture is displayed as, e.g., enlarged, reduced, moved at a predetermined cycle, a screen saver is realized. Alternatively, the background/screen saver processing for displaying a picture stored in the memory 113 by the capture control processing can be performed, not by the player control module 212, but by another independent application.

Furthermore, in a case where a flag representing an access restriction is added on a picture stored in the memory 113, the background/screen saver processing abides by the restriction.

As in the above, the capture_enable_flag_PlayList and the capture_enable_flag_Clip for video data under playback, which represent whether or not secondary use is permitted of the video data being in a unit larger than video access units and thus corresponding to, e.g., a PlayList( ) or a PlayItem( ) is permitted, are acquired, and it is determined whether or not secondary use of the video data under playback is permitted, on the basis of these capture_enable_flag_PlayList and capture_enable_flag_Clip. And in a case where it has been determined that secondary use of the video data under playback is permitted, the video data under playback is captured, and the background/screen saver processing is executed in which the captured video data is used. Therefore, it becomes possible to control secondary use of video data.

Note that, in the capture control processing of FIG. 44, the capture_enable_flag_PlayList is provided in a PlayList( ) (FIG. 5), and also the capture_enable_flag_Clip is provided in the clip information file Clip( ) (FIG. 10) corresponding to a clip stream file to be played back by a PlayItem( ), thereby both the capture_enable_flag_PlayList and the capture_enable_flag_Clip are used to determine whether secondary use is permitted (or not). However, it can alternatively be configured such that only the capture_enable_flag_PlayList is provided in a PlayList( ) (FIG. 5), or only the capture_enable_flag_Clip is provided in the clip information file Clip( ) (FIG. 10) corresponding to a clip stream file to be played back by a PlayItem( ), thereby either the capture_enable_flag_PlayList or the capture_enable_flag_Clip is used to determine whether secondary use is permitted or not.

In addition, in the capture control processing of FIG. 44, the graphics processing module 219 captures, in step S376, the picture of video data from the video decoder control module 216, i.e., only one picture, in response to the capture instruction from the player control module 212. In addition, a plurality of pictures can also be captured. Namely, a plurality of pictures (a sequence of a plurality of pictures as moving pictures) which the video decoder control module 216 outputs time-sequentially can be captured. In this case, the number of pictures to be captured at once may be, e.g., determined beforehand. Alternatively, by increasing the number of bits for forming the capture_enable_flag_PlayList or the capture_enable_flag_Clip, information representing the number of pictures capturable at once may be included in the capture_enable_flag_PlayList or the capture_enable_flag_Clip.

Furthermore, in the above-mentioned case, access permission information (the capture_enable_flag_PlayList, the capture_enable_flag_Clip) as to whether or not secondary use of video data is permitted is described in a PlayList( ) or a clip information file Clip( ), thereby the access permission information is used to determine whether or not secondary use is permitted as to the whole video data to be played back by the PlayList( ) or the whole video data corresponding to the video stream multiplexed into the clip stream file corresponding to the clip information file Clip( ) However, the access permission information can be described as to video data in another arbitrary unit, thereby the access permission information can be used to determine whether or not secondary use is permitted of the video data in such arbitrary unit.

Namely, FIG. 45 shows a syntax of a private_stream2_PES_payload( ) in which access permission information is arranged, and FIG. 45 shows a syntax of an au_information( ) in which access permission information is arranged.

Note that the private_stream2_PES_payload( ) of FIG. 45 is configured similarly to the case in FIG. 23 except that a capture_enable_flag_ps2 as the access permission information is arranged immediately ahead of the video_stream_id. The au_information of FIG. 46 is configured similarly to the case in FIG. 24 except that a capture_enable_flag_AU as the access permission information is arranged immediately ahead of the pic_struct_copy.

The capture_enable_flag_ps2 included in the private_stream2_ES_payload( ) of FIG. 45 indicates whether or not secondary use is permitted of the video data corresponding to a video stream arranged between a private_stream_2 PES_packet( ) including that private_stream2_PES_payload( ) and a position immediately ahead of a next private_stream_2 PES_packet( ). Therefore, according to the capture_enable_flag_ps2 included in the private_stream2_PES_payload( ) of FIG. 45, it can be determined, as to video data between a certain decode startable point and a next decode startable point, whether or not its secondary use is permitted.

In addition, the capture_enable_flag_AU included in the au_information( ) of FIG. 46 indicates whether or not secondary use is permitted of the video access unit-based video data corresponding to that capture_enable_flag_AU. Therefore, according to the capture_enable_flag_AU included in the au_information( ) of FIG. 46, it can be determined, as to video access unit-based video data, whether or not its secondary use is permitted.

Here, as to the capture_enable_flag_PlayList as the access permission information in a PlayList( ) (FIG. 5), the capture_enable_flag_Clip as the access permission information in a clip information file Clip( ) (FIG. 10), the capture_enable_flag_ps2 as the access permission information in a private_stream2_PES_payload( ) (FIG. 45), and the capture_enable_flag_AU as the access permission information in an au_information( ) (FIG. 46), two or more of them can be adopted together. In this case, whether or not secondary use of the picture of certain video data is permitted can be determined on the basis of the ANDing or the like of the two or more pieces of access permission information adopted together.

Furthermore, a private_stream_2 PES_packet( ) including the private_stream2_PES_payload( ) of FIG. 23 or FIG. 45 in which the au_information( ) of FIG. 46 is arranged is searched, as explained above with reference to step S211 of FIG. 36, by the video reading function section 233 of the buffer control module 215 (FIG. 3) through a program stream stored in the buffer 215A. Therefore, in a case where the private_stream2_PES_payload( ) of FIG. 45 in which the capture_enable_flag_ps2 is arranged and the au_information( ) of FIG. 46 in which the capture_enable_flag_AU is arranged are to be adopted, the player control module 212 needs to inquire about the capture_enable_flag_ps2 and the capture_enable_flag_AU to the video reading function section 233 when determining whether or not secondary use of video data is permitted.

Note that, in the present embodiment, the above-mentioned series of processing is performed by software. However, the above-mentioned series of processing can also be performed by dedicated hardware.

Furthermore, in the present embodiment, a hardware decoder is adopted as the video decoder 116 (FIG. 1). However, as the video decoder 116, a software decoder can also be adopted. This applies similarly to the audio decoder 117 (FIG. 1).

Furthermore, in the present embodiment, the software decoder is adopted as the subtitle decoder. However, as the subtitle decoder, a hardware decoder can also be adopted.

The invention claimed is:

1. A data processing device for processing recorded data recorded on a data recording medium,
    said recorded data includes,
        a plurality of files of multiplexed data into each of which a plurality of streams of data are multiplexed, and
        a plurality of metadata files including metadata about said multiplexed data, the plurality of metadata files corresponding in number to the plurality of files of multiplexed data, wherein
        each of said plurality of metadata files include first identification information that identifies one of the plurality of streams of data in a multiplexed file and second identification information that identifies another one of the plurality of streams of data in the multiplexed file,
        the first identification information identifying an encoding format defined by MPEG-2 (ISO/IEC 13818-1), and
        the second identification information identifying an encoding format not defined by MPEG-2 (ISO/IEC 13818-1), and
    said data processing device comprising:
    reading means for reading said metadata;
    specifying means for specifying data multiplexed into the multiplexed data on a basis of said first and second identification information included in said metadata; and
    processing means for processing the data specified by said specifying means.

2. The data processing device of claim 1, wherein the first identification information identifies the MPEG encoding format.

3. The data processing device of claim 2, wherein the second identification information identifies an ATRAC encoding format.

4. The data processing device of claim 2, wherein the second identification information identifies an LPCM encoding format.

5. The data processing device of claim 2, wherein the second identification information identifies an encoded subtitle stream.

6. A data processing method for processing recorded data recorded on a data recording medium,
    said recorded data includes,
        a plurality of files of multiplexed data into each of which a plurality of streams of data are multiplexed, and
        a plurality of metadata files including metadata about said multiplexed data, the plurality of metadata files corresponding in number to the plurality of files of multiplexed data, wherein
        each of said plurality of metadata files include first identification information that identifies one of the plurality of streams of data in a multiplexed file and second identification information that identifies another one of the plurality of streams of data in the multiplexed file,
        the first identification information identifying an encoding format defined by MPEG-2 (ISO/IEC 13818-1), and
        the second identification information identifying an encoding format not defined by MPEG-2 (ISO/IEC 13818-1), and
    said data processing method comprises:
    a reading step of reading said metadata;
    a specifying step of specifying data multiplexed into the multiplexed data on the basis of said first and second identification information included in said metadata; and
    a processing step of processing the data specified in said specifying step.

7. A program for causing a computer to execute data processing for processing recorded data recorded on a data recording medium,
    said recorded data includes,
        a plurality of files of multiplexed data into each of which a plurality of streams of data are multiplexed, and
        a plurality of metadata files including metadata about said multiplexed data, the plurality of metadata files corresponding in number to the plurality of files of multiplexed data, wherein
        each of said plurality of metadata files include first identification information that identifies one of the plurality of streams of data in a multiplexed file and second identification information that identifies another one of the plurality of streams of data in the multiplexed file,
        the first identification information identifying an encoding format defined by MPEG-2 (ISO/IEC 13818-1), and
        the second identification information identifying an encoding format not defined by MPEG-2 (ISO/IEC 13818-1), and
    said program is characterized by comprising:
    a reading step of reading said metadata;
    a specifying step of specifying data multiplexed into said multiplexed data on the basis of said first and second identification information included in said metadata; and a processing step of processing the data specified in said specifying step.

8. A program recording medium having recorded thereon a program for causing a computer to execute data processing for processing recorded data recorded on a data recording medium, said recorded data includes,
- a plurality of files of multiplexed data into each of which a plurality of streams of data are multiplexed, and
- a plurality of metadata files including metadata about said multiplexed data, the plurality of metadata files corresponding in number to the plurality of files of multiplexed data, wherein
- each of said plurality of metadata files include first identification information that identifies one of the plurality of streams of data in a multiplexed file and second identification information that identifies another one of the plurality of streams of data in the multiplexed file,
- the first identification information, identifying an encoding format defined by MPEG-2 (ISO/IEC 13818-1), and
- the second identification information identifying an encoding format not defined by MPEG-2 (ISO/IEC 13818-1), and said program recording medium is characterized by including:
- a reading step of reading said metadata;
- a specifying step of specifying data multiplexed into said multiplexed data on the basis of said first and second identification information included in said metadata; and
- a processing step of processing the data specified in said specifying step.

9. A data recording medium that has data recorded thereon, wherein the recorded data includes,
- a plurality of files of multiplexed data into each of which a plurality of streams of data are multiplexed, and
- a plurality of metadata files including metadata about said multiplexed data, the plurality of metadata files corresponding in number to the plurality of files of multiplexed data, wherein
- each of said plurality of metadata files include first identification information that identifies one of the plurality of streams of data in a multiplexed file and second identification information that identifies another one of the plurality of streams of data in the multiplexed file,
- the first identification information, identifying an encoding format defined by MPEG-2 (ISO/IEC 13818-1), and
- the second identification information identifying an encoding format not defined by MPEG-2 (ISO/IEC 13818-1).

10. A non-transitory computer readable medium having stored therein a data structure readable by a computer processor, the data structure comprising:
- a first area for storing a plurality of files of multiplexed data into each of which a plurality of streams of data are multiplexed, and
- a second area for storing a plurality of metadata files including metadata about said multiplexed data, the plurality of metadata files corresponding in number to the plurality of files of multiplexed data, wherein
- each of said plurality of metadata files include first identification information that identifies one of the plurality of streams of data in a multiplexed file and second identification information that identifies another one of the plurality of streams of data in the multiplexed file,
- the first identification information identifying an encoding format defined by MPEG-2 (ISO/IEC 13818-1), and
- the second identification information identifying an encoding format not defined by MPEG-2 (ISO/IEC 13818-1), and
- said computer processor when reading said first identification information processes metadata associated with MPEG-2 (ISO/IEC 13818-1), and when reading said second information processes metadata not associated with MPEG-2 (ISO/IEC 13818-1).

* * * * *